United States Patent
Ohta et al.

(10) Patent No.: US 10,160,876 B2
(45) Date of Patent: *Dec. 25, 2018

(54) INK JET RECORDING METHOD, INK JET RECORDING APPARATUS, AND RECORDED MATTER

(71) Applicant: Seiko Epson Corporation, Tokyo (JP)

(72) Inventors: Hitoshi Ohta, Shiojiri (JP); Kazuaki Tsukiana, Azumino (JP)

(73) Assignee: Seiko Epson Corporation (JP)

( * ) Notice: Subject to any disclaimer, the term of this patent is extended or adjusted under 35 U.S.C. 154(b) by 1 day.

This patent is subject to a terminal disclaimer.

(21) Appl. No.: 15/450,554

(22) Filed: Mar. 6, 2017

(65) Prior Publication Data

US 2017/0173988 A1 Jun. 22, 2017

Related U.S. Application Data

(62) Division of application No. 14/589,225, filed on Jan. 5, 2015.

(30) Foreign Application Priority Data

Jan. 6, 2014 (JP) .................................. 2014-000134
Mar. 25, 2014 (JP) .................................. 2014-061546

(51) Int. Cl.
*B41J 2/21* (2006.01)
*C09D 11/30* (2014.01)
(Continued)

(52) U.S. Cl.
CPC ............. *C09D 11/30* (2013.01); *B41J 2/2114* (2013.01); *B41J 11/0015* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,376,434 A 12/1994 Ogawa et al.
2005/0074601 A1 4/2005 Onishi
(Continued)

FOREIGN PATENT DOCUMENTS

JP 2004-001446 A 1/2004
JP 2005-239778 A 9/2005
(Continued)

*Primary Examiner* — Manish S Shah
(74) *Attorney, Agent, or Firm* — Harness, Dickey & Pierce, P.L.C.

(57) ABSTRACT

An ink jet recording method includes recording an image by discharging an ink composition which contains water and a coloring material on a recording surface of a recording medium having low absorbency or non-absorbency to ink, and forming a protective layer, which contains first resin particles where a glass transition temperature is 50° C. or higher and second resin particles where a glass transition temperature is less than 50° C. and which substantially does not contain a coloring material, on the image.

9 Claims, 6 Drawing Sheets

(51) Int. Cl.

| | | |
|---|---|---|
| *B41M 7/00* | (2006.01) | |
| *B41M 5/00* | (2006.01) | |
| *C09D 11/10* | (2014.01) | |
| *C09D 11/322* | (2014.01) | |
| *C09D 11/40* | (2014.01) | |
| *B41J 11/00* | (2006.01) | |
| *C09D 11/03* | (2014.01) | |
| *C09D 11/102* | (2014.01) | |
| *C09D 11/107* | (2014.01) | |
| *C09D 11/12* | (2006.01) | |
| *C09D 11/36* | (2014.01) | |

(52) U.S. Cl.
CPC ........ *B41M 5/0011* (2013.01); *B41M 5/0047* (2013.01); *B41M 5/0064* (2013.01); *B41M 7/0027* (2013.01); *B41M 7/0036* (2013.01); *C09D 11/03* (2013.01); *C09D 11/10* (2013.01); *C09D 11/102* (2013.01); *C09D 11/107* (2013.01); *C09D 11/12* (2013.01); *C09D 11/322* (2013.01); *C09D 11/36* (2013.01); *C09D 11/40* (2013.01); *Y10T 428/24901* (2015.01)

(58) Field of Classification Search
CPC ...... B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04586; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | | |
|---|---|---|---|
| 2005/0233119 A1 | 10/2005 | Mizutani et al. | |
| 2009/0233061 A1* | 9/2009 | Irita | B41J 11/0015 428/195.1 |
| 2010/0103236 A1 | 4/2010 | Komatsu | |
| 2010/0104758 A1 | 4/2010 | Komatsu | |
| 2012/0038702 A1 | 2/2012 | Kagata et al. | |
| 2012/0287190 A1* | 11/2012 | Shimada | B41J 2/2114 347/12 |
| 2013/0182057 A1 | 7/2013 | Koase | |
| 2013/0202861 A1* | 8/2013 | Ohta | B41J 2/2107 347/100 |
| 2013/0258015 A1* | 10/2013 | Mizutaki | B41J 2/2107 347/102 |
| 2013/0286069 A1 | 10/2013 | Aoyama et al. | |
| 2013/0335495 A1 | 12/2013 | Umebayashi | |
| 2014/0240419 A1 | 8/2014 | Matsuhashi et al. | |
| 2014/0349037 A1 | 11/2014 | Matsubara et al. | |

FOREIGN PATENT DOCUMENTS

| | | | |
|---|---|---|---|
| JP | 2009-148904 | A | 7/2009 |
| JP | 2010-105187 | A | 5/2010 |
| JP | 2010-105228 | A | 5/2010 |
| JP | 2010-221670 | A | 10/2010 |
| JP | 2011-105899 | A | 6/2011 |
| JP | 2011-194719 | A | 10/2011 |
| JP | 2011-194826 | A | 10/2011 |
| JP | 2012-035590 | A | 2/2012 |
| JP | 2012-040817 | A | 3/2012 |
| JP | 2012-210764 | A | 11/2012 |
| JP | 2013-086461 | A | 5/2013 |
| JP | 2013-103357 | A | 5/2013 |
| JP | 2013-146925 | A | 8/2013 |
| JP | 5286247 | B2 | 9/2013 |
| JP | 2013-199094 | A | 10/2013 |
| JP | 2013-230578 | A | 11/2013 |

* cited by examiner

INK JET RECORDING METHOD, INK JET RECORDING APPARATUS, AND RECORDED MATTER

This is a Divisional Application of U.S. application Ser. No. 14/589,225, filed Jan. 5, 2015, which claims priority to Japanese Patent Application Nos. 2014-061546, filed Mar. 25, 2014 and 2014-000134, filed Jan. 6, 2014, all of which are hereby expressly incorporated by reference herein in their entireties.

BACKGROUND

1. Technical Field

The present invention relates to an ink jet recording method, an ink jet recording apparatus, and recorded matter.

2. Related Art

In the related art, so-called ink jet recording methods which record images using minute ink droplets which are discharged from nozzles of a head for ink jet recording are known. In recent years, ink jet recording methods have been used for recording images with respect to various types of recording media in various fields.

For example, Japanese Patent No. 5286247 discloses an ink jet recording method with respect to a recording medium having absorbency to ink such as PPC paper (plain paper). Japanese Patent No. 5286247 discloses that the image is covered by a resin film which is formed by a treatment liquid (which contains a resin with a high glass transition temperature, a resin with a low glass transition temperature, and an inorganic filler) in order to solve the problem of images recorded on PPC paper becoming attached to a discharge roller.

On the other hand, since a recording medium having low absorbency or non-absorbency to ink has a low ink absorbency compared to the recording medium having the ink absorbency described above, it is easy for the fixing property and scratch resistance of obtained images to become problems. Therefore, for example, JP-A-2013-146925 discloses covering the obtained image with a coating liquid in order to solve the problem of the fixing property of images recorded on a recording surface which includes polyolefin decreasing. In addition, JP-A-2011-194826 discloses that the image is covered with a liquid composition which includes polymer particles without including a coloring agent in order to solve the problem of the scratch resistance of images recorded on a recording medium having low absorbency or non-absorbency to ink decreasing.

As described above, in a case of using a recording medium having low absorbency or non-absorbency to ink, there is a demand for recording an image which has an excellent fixing property and scratch resistance on the recording medium. However, it is not yet possible to say that images which are obtained using the ink jet recording methods according to JP-A-2013-146925 and JP-A-2011-194826 described above have sufficient scratch resistance and adhesion.

In particular, in a case of improving the adhesion of an image using a resin component which is included in a clear ink composition or the like which does not contain a coloring material, there are times when the tackiness of the image increases along with improvement in the adhesion of the image, and the scratch resistance decreases. On the other hand, in a case of improving the scratch resistance of an image using a resin component which is included in a clear ink composition, there may be problems in that the image is easily detached along with improvement in the scratch resistance of the image, and the adhesion of the image decreases. In this manner, it is difficult to satisfy both of the properties of the scratch resistance and adhesion of images in a well-balanced manner.

On the other hand, a recording medium having low absorbency and non-absorbency to ink is used for various purposes and there are cases where the recording medium is used for wrapping for a container, for example, for food or cosmetics. In this case, when an organic solvent such as alcohol is attached to an image which is recorded on a recording medium, there may be problems with the elution of the images.

SUMMARY

An advantage of some aspects of the invention is that it provides an ink jet recording method which is able to record an image which has excellent solvent resistance while having excellent scratch resistance and adhesion, an ink jet recording apparatus which executes this method, and recorded matter which is obtained by the apparatus. In addition, as described above, in a case of using a recording medium having low absorbency or non-absorbency to ink, there is a demand for recording an image which has an excellent fixing property and scratch resistance on the recording medium. However, it is not yet possible to say that images which are obtained using the ink jet recording methods according to JP-A-2013-146925 and JP-A-2011-194826 described above have sufficient scratch resistance and adhesion.

In addition, in a case of improving adhesion of an image using a resin component which is included in an ink composition, there are times when the tackiness of the image increases along with improvement in the adhesion of the image, and the scratch resistance decreases. On the other hand, in a case of improving the scratch resistance of an image using a resin component which is included in an ink composition, there may be problems in that the image is easily detached along with improvement in the scratch resistance of the image, and the adhesion of the image decreases. In this manner, it is difficult to satisfy both of the properties of the scratch resistance and adhesion of images in a well-balanced manner.

An advantage of some aspects of the invention is that it provides an ink jet recording method which is able to record an image which has excellent scratch resistance and adhesion, an ink jet recording apparatus which executes this method, and recorded matter which is obtained by the apparatus.

A first embodiment according to the invention can be realized in the following forms or application examples.

Application Example 1

According to an aspect of the invention, there is provided an ink jet recording method including recording an image by discharging an ink composition which contains water and a coloring material on a recording surface of a recording medium having low absorbency or non-absorbency to ink and forming a protective layer, which contains first resin particles where a glass transition temperature is 50° C. or higher and second resin particles where a glass transition temperature is less than 50° C. and which substantially does not contain a coloring material, on the image.

According to the ink jet recording method of application example 1, it is possible to record an image which has excellent solvent resistance while having excellent scratch resistance and adhesion.

In the invention, "substantially does not contain A" has the meaning that A is not intentionally added when manufacturing the ink and a small amount of A which is inevitably mixed or generated while manufacturing or storing the ink may be included. Specific examples of "substantially does not contain" are, for example, not including 1.0 mass % or more, preferably not including 0.5 mass % or more, more preferably not including 0.1 mass % or more, even more preferably not including 0.05 mass % or more, and particularly preferably not including 0.01 mass % or more.

In addition, "image" in the invention indicates a printing pattern which is formed of a dot group and also includes text printing and solid printing.

Application Example 2

In application example 1, the forming a protective layer may be performed by discharging a first clear ink composition which contains the first resin particles and substantially does not contain a coloring material and a second clear ink composition which contains the second resin particles and substantially does not contain a coloring material from a recording head.

Application Example 3

In application example 1 or application example 2, the forming a protective layer may include forming a first protective layer which contains the first resin particles and forming a second protective layer which contains the second resin particles.

Application Example 4

In application example 3, the forming a first protective layer may be forming the first protective layer on the second protective layer.

Application Example 5

In the ink jet recording method according to application example 3 or application example 4, a relationship of A>B is satisfied in a case where a weight where the first resin particles, which are included in each unit area of a region in which the first protective layer is formed, are converted into a solid content is set as A $(g/cm^2)$ and a weight where the second resin particles, which are included in each unit area of a region in which the second protective layer is formed, are converted into a solid content is set as B $(g/cm^2)$.

Application Example 6

In any one example of application example 1 to application example 5, the protective layer may be formed so as to continuously cover a surface of the image and a recording surface of the recording medium where the image is not recorded.

Application Example 7

In any one example of application example 1 to application example 6, the image and the protective layer may be obtained using an ink composition which does not contain a water-soluble organic solvent where a normal boiling point is 280° C. or higher.

Application Example 8

In any one example of application example 1 to application example 7, at least one type which is selected from an anti-fogging agent, an antistatic agent, and an antioxidant may be present on the recording surface of the recording medium.

Application Example 9

In any one example of application example 1 to application example 8, a material which configures the recording surface of the recording medium may include at least one type of resin which is selected from an olefin-based resin, an ester-based resin, a vinyl chloride-based resin, and an amide-based resin.

Application Example 10

According to an aspect of the invention, there is provided recorded matter which may be obtained using the ink jet recording method according to any one example of application example 1 to application example 9.

According to the recorded matter of application example 10, an image which has excellent solvent resistance while having excellent scratch resistance and adhesion is provided.

Application Example 11

According to an aspect of the invention, there is provided an ink jet recording apparatus in which recording may be performed using the ink jet recording method according to any one example of application example 1 to application example 9.

According to the ink jet recording apparatus of application example 11, it is possible to record an image which has excellent solvent resistance while having excellent scratch resistance and adhesion.

The second embodiment according to the invention can be realized in the following forms or application examples.

Application Example 12

According to an aspect of the invention, there is provided an ink jet recording method including forming an adhesive layer by discharging a second clear ink composition which contains second resin particles where a glass transition temperature is less than 50° C. and substantially does not contain a coloring material on a recording surface of a recording medium having low absorbency or non-absorbency to ink, recording an image on the adhesive layer by discharging an ink composition which contains water and a coloring material, and forming a protective layer, which contains first resin particles where a glass transition temperature is 50° C. or higher and substantially does not contain a coloring material, on the image.

According to the ink jet recording method of application example 12, it is possible to record an image which has excellent scratch resistance and adhesion.

In the invention, "substantially does not contain A" has the meaning that A is not intentionally added when manufacturing the ink and a small amount of A which is inevitably mixed or generated while manufacturing or storing the ink may be included. Specific examples of "substantially does not contain" are, for example, not including 1.0 mass % or more, preferably not including 0.5 mass % or more, more preferably not including 0.1 mass % or more, even more preferably not including 0.05 mass % or more, and particularly preferably not including 0.01 mass % or more.

In addition, "image" in the invention indicates a printing pattern which is formed of a dot group and also includes text printing and solid printing.

Application Example 13

In application example 12, the protective layer may further contain the second resin particles.

Application Example 14

In application example 13, the forming a protective layer may include forming a first protective layer by discharging a first clear ink composition, which contains the first resin particles and substantially does not contain a coloring material, from a recording head, and forming a second protective layer by discharging the second clear ink composition from a recording head, in which the first protective layer may be formed on the second protective layer.

Application Example 15

In any one example of application example 12 to application example 14, the recording an image may be performed using at least one out of a background ink composition which contains a background coloring material as the coloring material and a color ink composition which contains a colored coloring material as the coloring material.

Application Example 16

In any one example of application example 12 to application example 15, the image may be recorded inside a region in which the adhesive layer is formed when viewing the recording surface of the recording medium in a plan view and may be recorded so as to be smaller than an area of the adhesive layer inside the region.

Application Example 17

In application example 16, the protective layer may be formed so as to cover the image and an upper surface of the adhesive layer when viewing the recording surface of the recording medium in a plan view.

Application Example 18

In any one example of application example 12 to application example 17, the adhesive layer, the image, and the protective layer may be formed using an ink composition which does not contain a water-soluble organic solvent where a normal boiling point is 280° C. or higher.

Application Example 19

In any one example of application example 12 to application example 18, at least one type which is selected from an anti-fogging agent, an antistatic agent, and an antioxidant may be present on the recording surface of the recording medium.

Application Example 20

In any one example of application example 12 to application example 19, a material which configures the recording surface of the recording medium may include at least one type of resin which is selected from an olefin-based resin, an ester-based resin, a vinyl chloride-based resin, and an amide-based resin.

Application Example 21

According to an aspect of the invention, there is provided recorded matter which may be obtained using the ink jet recording method according to any one example of application example 12 to application example 20.

According to the recorded matter of application example 21, an image which has excellent scratch resistance and adhesion is provided.

Application Example 22

According to an aspect of the invention, there is provided an ink jet recording apparatus which may perform recording using the ink jet recording method according to any one example of application example 12 to application example 20.

According to the ink jet recording apparatus of application example 22, it is possible to obtain an image which has excellent scratch resistance and adhesion.

BRIEF DESCRIPTION OF THE DRAWINGS

The invention will be described with reference to the accompanying drawings, wherein like numbers reference like elements.

DESCRIPTION OF EXEMPLARY EMBODIMENTS

Description will be given below of a first favorable embodiment of the invention. The embodiments described below describe examples of the invention. In addition, the invention is not limited to the below embodiments and also includes various types of modifications which are carried out within a range which does not depart from the gist of the invention.

1. Ink Jet Recording Method

An ink jet recording method according to one embodiment of the invention includes recording an image by discharging an ink composition which contains water and a coloring material on a recording surface of a recording medium having low absorbency or non-absorbency to ink and forming a protective layer, which contains first resin particles where a glass transition temperature is 50° C. or higher and second resin particles where a glass transition temperature is less than 50° C. and which substantially does not contain a coloring material, on the image. Due to this, it is possible to obtain recorded matter where an image is recorded on a recording surface of a recording medium.

Detailed description will be given below of each process in the ink jet recording method according to the present embodiment.

1.1. Image Recording Process

The ink jet recording method according to the present embodiment includes an image recording process. The image recording process records an image on a recording surface of a recording medium having low absorbency or non-absorbency to ink by discharging an ink composition which contains water and a coloring material.

Figure 1:
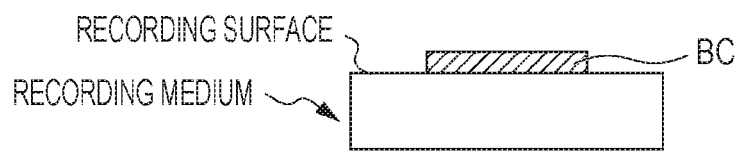
FIG. 1 is a diagram which schematically shows a side surface of a recording medium where an image is recorded by an image recording process of an ink jet recording method according to the present embodiment.

FIG. 1 is a diagram which schematically shows a side surface of a recording medium where an image BC is recorded. As shown in FIG. 1, the image BC is recorded in at least a part of a region of a recording surface of the recording medium by the image recording process. FIG. 1 shows a state where one image BC is formed in a part of a region of the recording medium; however, without being limited thereto, the image BC may be recorded on the whole surface of the recording surface of the recording medium, or two or more images BC may be recorded on the recording surface of the recording medium (that is, the two or more images BC are not continuous on the recording surface).

For the ink composition which is used in the image recording process, it is possible to use at least one of a background ink composition which contains a background coloring material as the coloring material and a color ink composition which contains a colored coloring material as the coloring material.

Here, the recording medium itself may be colored, semi-transparent, or transparent. In such a case, it is possible to use the background ink composition for recording a concealment layer which conceals the color of the recording medium itself. For example, when recording a color image using a color ink composition, there is an advantage in that it is possible to improve a coloring property of the color image when a background image is recorded in advance in the region in which the color image is to be recorded. From this point of view, it is preferable that the image recording process include a background image recording process which records a background image on the recording surface of the recording medium by discharging a background ink composition from a recording head and a color image recording process which records a color image on the background image by discharging a color ink composition from a recording head.

Figure 2:
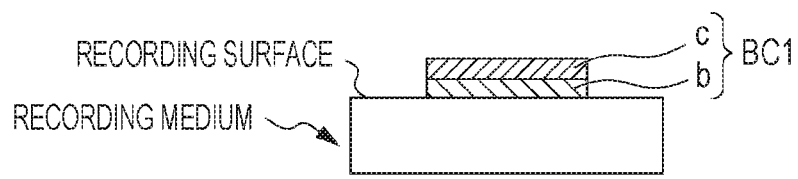
FIG. 2 is a diagram which schematically shows a side surface of a recording medium where an image is recorded by the image recording process of the ink jet recording method according to the present embodiment.

FIG. 2 is a diagram which schematically shows a side surface of a recording medium where an image BC1, which is formed of a background image b which is recorded on the recording surface of the recording medium and a color image c which is recorded on the background image b, is recorded. As shown in FIG. 2, the image BC1 is recorded in a region of at least a part of the recording surface of the recording medium by the image recording process. FIG. 2 shows that the color image c is recorded so as to cover the entire upper surface of the background image b; however, without being limited thereto, the color image c may be recorded on a part of the upper surface of the background image b, or two or more color images c may be recorded on the upper surface of the background image b (that is, the two or more color images c are not continuous on the upper surface of the background image b).

In a case of carrying out the background image recording process and the color image recording process, it is preferable that the weight of the background coloring material which is included in each unit area of the recorded background image be 0.05 mg/cm$^2$ or more to 0.5 mg/cm$^2$ or less and 0.1 mg/cm$^2$ or more to 0.3 mg/cm$^2$ or less is more preferable. Since it is possible to reduce the influence of the color of the recording medium or to suppress the transmission of a color image in a case of using a transparent film by setting the weight of the background coloring material to 0.05 mg/cm$^2$ or more, there are cases where it is possible to further improve the coloring property of the color image which is recorded on a background image. Here, since it is not possible to expect an improvement in the effect of concealing the color of the recording medium itself when the weight of the background coloring material exceeds 0.5 mg/cm$^2$, 0.5 mg/cm$^2$ or less is preferable from the point of view of saving ink.

1.2. Protective Layer (Upper Coating Layer) Forming Process

The ink jet recording method according to the present embodiment includes a protective layer forming process. The protective layer forming process forms a protective layer, which contains first resin particles where a glass transition temperature is 50° C. or higher and second resin particles where a glass transition temperature is less than 50° C. and which substantially does not contain a coloring material, on the image. Here, there are cases where the protective layer according to the present embodiment is referred to as an "upper coating layer" since the protective layer is provided on the image.

In this manner, since it is possible to reduce contact between the image and the solvent by providing the protective layer on the image, it is possible to improve resistance with respect to the solvent of the image (for example, an organic solvent such as alcohol, or the like), that is, the solvent resistance. In addition, details will be described below; however, the first resin particles out of the components which are included in the protective layer have an excellent effect which improves the heat resistance of the protective layer or an effect which improves the scratch resistance of the protective layer since the glass transition temperature (Tg) thereof is 50° C. or higher. Furthermore, details will be described below; however, second resin particles have an excellent effect which improves the adhesion between the protective layer and the image, the boiling resistance, and the solvent resistance since the Tg thereof is less than 50° C. In this manner, by providing a protective layer which contains both resin particles where the Tg is 50° C. or higher and resin particles where the Tg is less than 50° C. on the image, it is possible to obtain an image where the balance between the scratch resistance and adhesion is favorable in addition to having favorable solvent resistance and boiling resistance.

Figure 3:
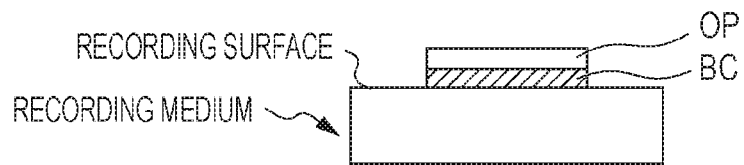
FIG. 3 is a diagram which schematically shows a side surface of a recording medium where a protective layer is formed by a protective layer forming process of the ink jet recording method according to the present embodiment.

FIG. 3 is a diagram which schematically shows a side surface of a recording medium where the protective layer OP is formed on the image BC. The protective layer OP is formed so as to cover at least the upper surface of the image BC by the protective layer forming process.

Figure 4:
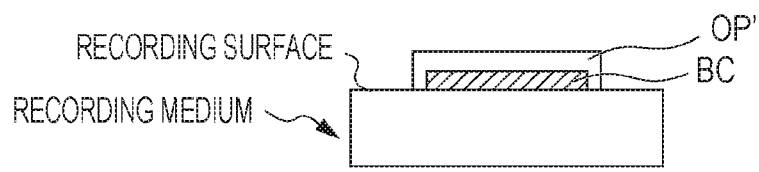
FIG. 4 is a diagram which schematically shows a side surface of a recording medium where a protective layer is formed by the protective layer forming process of the ink jet recording method according to the present embodiment.

FIG. 3 illustrates the protective layer OP being formed so as to cover the entire upper surface of the image BC; however, the protective layer OP is not limited thereto. For example, as shown in FIG. 4, it is possible to form a protective layer OP' so as to continuously cover a surface of the image BC (that is an upper surface and a side surface of the image BC) and the recording surface of the recording medium where the image BC is not recorded. In this manner, the adhesion and scratch resistance of the image BC with respect to the recording medium are further improved.

In the protective layer forming process, it is possible to use one type of clear ink composition which contains first resin particles and second resin particles and substantially does not contain a coloring material and it is also possible to perform the protective layer forming process using at least two types of clear ink compositions of a first clear ink composition which contains first resin particles and substantially does not contain a coloring material and a second clear ink composition which contains second resin particles and substantially does not contain a coloring material.

In a case of using one type of clear ink composition which contains first resin particles and second resin particles and substantially does not contain a coloring material, the first resin particles and the second resin particles are present in a mixed state in ink droplets which are discharged from a recording head. That is, the protective layer OP1 where the first resin particles and the second resin particles are uniformly dispersed is formed on the image plane.

On the other hand, in a case of using two types of clear ink compositions of a first clear ink composition and a second clear ink composition, it is possible to form protective layers in at least the following two patterns. The first is the protective layer OP2 which is formed by ink droplets formed of the first clear ink composition and ink droplets formed of the second clear ink composition being arranged on the same plane.

The second is the protective layer OP3 which is formed by a first protective layer formed of the first clear ink composition and a second protective layer formed of the second clear ink composition being laminated.

While the effects provided by each of the resin particles are exhibited in a case where the first resin particles and the second resin particles are present on the same plane (the protective layer OP1 and the protective layer OP2 described above), the functions thereof have a tendency to decrease compared to a case of being used individually. The tendency is more remarkable when the first resin particles and the second resin particles are more uniformly mixed on the same plane. Here, in comparison with the protective layer OP2, since the protective layer OP1 is formed by the first resin particles and the second resin particles being uniformly mixed, the functions of each of the resin particles decrease. From these points, it is preferable to perform the protective layer forming process using two or more types of clear ink compositions of the first clear ink composition and the second clear ink composition.

In addition, since the protective layer OP3 has a laminated structure of the first protective layer and the second protective layer, the functions of the resin particles which are included in each layer do not easily decrease. Therefore, in a case of forming the protective layer OP3, the functions of each of the resin particles are favorably exhibited. In addition, by setting the protective layer as a laminated structure, the effect of suppressing permeation of the solvent is further improved in comparison with the case of forming a protective layer with the same film thickness as this as a single layer. The details behind this mechanism are not yet clear; however, it is considered to be due to it being possible to block permeation of a solvent between layers. For this reason, it is more preferable to adopt the protective layer OP3 which has a laminated structure of the first protective layer and the second protective layer for the protective layer according to the present embodiment.

As described above, the protective layer OP3 is obtained by laminating the first protective layer and the second protective layer. In detail, the first protective layer which contains the first resin particles is obtained by a first protective layer forming process which discharges a first clear ink composition from a recording head. The second protective layer which contains the second resin particles is obtained by a second protective layer forming process which discharges a second clear ink composition from a recording head.

In a case of forming the protective layer OP3, it is preferable that the first protective layer forming process form the first protective layer on the second protective layer which is obtained by the second protective layer forming process. In other words, the first protective layer forming process is performed after the second protective layer forming process. In this manner, since it is definitely possible to improve adhesion of the first protective layer and the second resin particles which are included in the second protective layer easily permeate inside the image, the adhesion between the image and the recording medium also is improved. Furthermore, by the first protective layer being present on the uppermost surface, the exposure of the second protective layer, which has higher tackiness in comparison with the first protective layer, on the upper surface of the image decreases. Due to this, the scratch resistance function according to the first protective layer is more favorably exhibited and the scratch resistance of the image is excellent. In this manner, it is possible to exhibit the functions of scratch resistance and adhesion provided by the protective layer to a high standard and with excellent balance. In addition, details will be described below; however, by forming the first protective layer on the second protective layer, the function of boiling resistance provided by the first resin particles and the function of boiling resistance provided by the second resin particles act synergistically and the function of boiling resistance is more excellent.

When forming the protective layer OP3, in a case where a weight where the first resin particles, which are included in each unit area of the first protective layer, are converted into a solid content is set as A (mg/cm$^2$) and a weight where the second resin particles, which are included in each unit area of the second protective layer, are converted into a solid content is set as B (mg/cm$^2$), it is preferable that a relationship of B/A<1 (that is, B<A) be satisfied and it is more preferable that a relationship of 0.2≤B/A<1 be satisfied. By the weight ratio of both of the resin particles being B<A, the function where the scratch resistance is improved by the first resin particles is more favorably exhibited. In addition, by being within a range of 0.2≤B/A<1, there is a tendency for the balance between the scratch resistance and the adhesion to be favorable.

Figure 5:
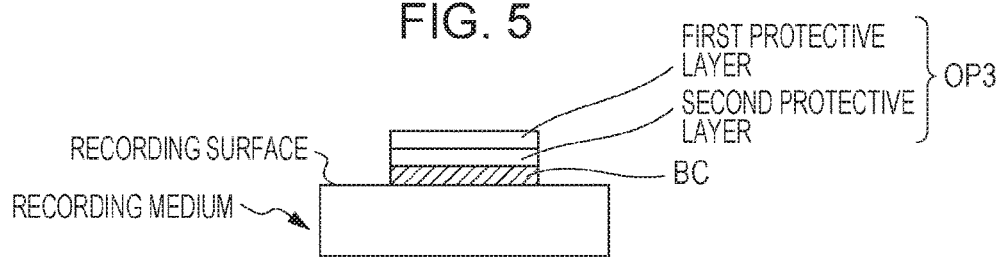
FIG. 5 is a diagram which schematically shows a side surface of a recording medium where a protective layer is formed by the protective layer forming process of the ink jet recording method according to the present embodiment.

FIG. 5 is a diagram which schematically shows a side surface of the recording medium where the protective layer OP3 is formed on the image BC. As shown in FIG. 5, by performing the second protective layer forming process and the first protective layer forming process in this order, the protective layer OP3 where the second protective layer and the first protective layer are laminated in this order on an upper surface of an image is obtained.

Figure 6:
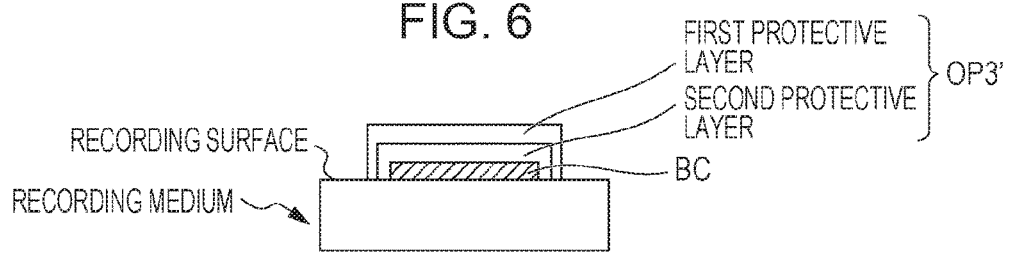
FIG. 6 is a diagram which schematically shows a side surface of a recording medium where a protective layer is formed by the protective layer forming process of the ink jet recording method according to the present embodiment.

FIG. 5 shows the first protective layer and the second protective layer formed so as to cover the entire upper surface of the image BC; however, the invention is not limited thereto. For example, the first protective layer and the second protective layer may be obtained by forming the first protective layer so as to cover at least the surface of the second protective surface (that is, the upper surface and the side surface of the second protective layer) after forming the second protective layer so as to cover at least the surface of the image BC (that is, the upper surface and the side surface of the image BC). Due to this, there are cases where the scratch resistance and adhesion of the image are further improved compared to only covering the upper surface of the image BC. Specific examples of such an aspect include the protective layer OP3' shown in FIG. 6. The protective layer OP3' is obtained by forming the first protective layer so as to continuously cover the surface of the second protective layer (that is, the upper surface and the side surface of the second protective layer) and a recording surface of a recording medium where the image BC and the second protective layer are not formed after forming the second protective layer so as to continuously cover the surface of the image BC (that is, the upper surface and the side surface of the image BC) and the recording surface of the recording medium where the image BC is not recorded.

Figure 7:
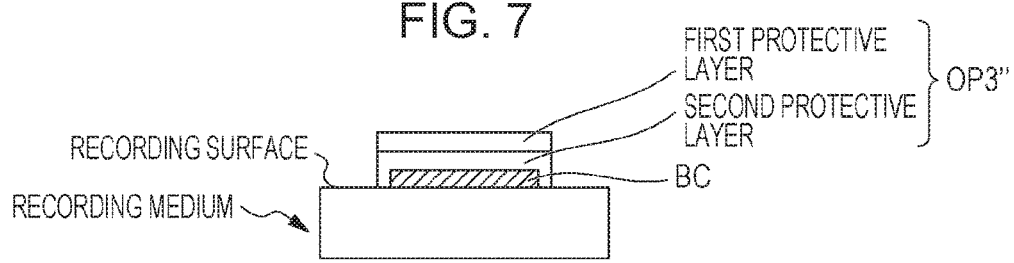
FIG. 7 is a diagram which schematically shows a side surface of a recording medium where a protective layer is formed by the protective layer forming process of the ink jet recording method according to the present embodiment.

From the point of view that it is possible to improve the forming speed of the first protective layer while having excellent functions such as scratch resistance, adhesion, and solvent resistance, the protective layer may be provided with a structure such as the protective layer OP3" shown in FIG. 7. The protective layer OP3" shown in FIG. 7 is obtained by forming the first protective layer only on the upper surface of the second protective layer after forming the second protective layer so as to continuously cover the surface of the image BC (that is, the upper surface and the side surface of the image BC) and the recording surface of the recording medium where the image BC is not recorded. According to the protective layer OP3", since the second protective layer with excellent adhesion is provided up to the side surface of the image, adhesion of the image improves. In addition, by the first protective layer being provided on the upper surface of the second protective layer, the scratch resistance of the image is sufficiently improved even when the first protective layer is not provided on the side surface of the second protective layer. Furthermore, by not providing the first protective layer up to the side surface of the second protective layer, it is possible to shorten the discharging time or drying time of the first clear ink composition.

In a case where the weight of the coloring material which is included in each unit area of an image is set as P (mg/cm$^2$) and a weight where the first resin particles, which are included in each unit area of the protective layer, are converted into a solid content is set as A (mg/cm$^2$), it is preferable that a relationship of 0.2≤A/P be satisfied and it is more preferable that a relationship of 0.2≤A/P≤1 be satisfied. Since it is possible to sufficiently cover the coloring material with the first resin particles by satisfying the relationship of 0.2≤A/P, it is possible to improve the scratch resistance of the image. In addition, by satisfying the relationship of A/P≤1, there are cases where it is possible to suppress decreases in the coloring property of the image due to an excess of the first resin particles.

In a case where the weight of a coloring material which is included in each unit area of an image is set as P (mg/cm$^2$) and a weight where the second resin particles, which are included in each unit area of the protective layer, are converted into a solid content is set as B (mg/cm$^2$), it is preferable that a relationship of 0.1≤B/P be satisfied and it is more preferable that a relationship of 0.1≤B/P≤0.7 be satisfied. Since it is possible to sufficiently cover the coloring material with the second resin particles by satisfying the relationship of 0.1≤B/P, it is possible to improve the adhesion of the image. In addition, by satisfying the relationship of B/P≤0.7, there are cases where it is possible to suppress decreases in the coloring property of the image due to an excess of the second resin particles.

1.3. Adhesive Layer (Lower Coating Layer) Forming Process

The ink jet recording method according to the present embodiment may include an adhesive layer forming process. The adhesive layer forming process is a process which is performed before the recording an image described above and which forms an adhesive layer formed of the second clear ink composition in advance in a region in which at least the image described above is recorded by discharging the second clear ink described above on the recording surface of a recording medium having low absorbency or non-absorbency to ink. Here, there are cases where the adhesive layer according to the present embodiment is referred to as a "lower coating layer" since the adhesive layer is provided between the recording surface of the recording medium and the image.

The second resin particles which are included in the adhesive layer have an excellent film-forming property and provide tackiness since the glass transition temperature (Tg) thereof is less than 50° C. Therefore, by providing the adhesive layer which contains the second resin particles between the recording medium and the recording surface, it is possible to improve the adhesion between the recording surface of the recording medium and the image.

Figure 8:
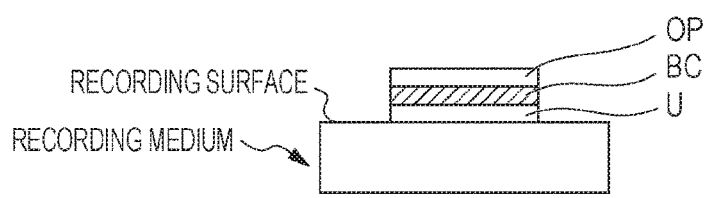
FIG. 8 is a diagram which schematically shows a side surface of a recording medium where an adhesive layer is formed by an adhesive layer forming process of the ink jet recording method according to the present embodiment.

FIG. 8 is a diagram which schematically shows a side surface of the recording medium where the adhesive layer U is formed between the recording surface and the image BC. As shown in FIG. 8, by performing the adhesive layer forming process before the image recording process, it is possible to form the adhesive layer U in advance in the region in which the image is formed.

In FIG. 8, forming is carried out such that the region in which the adhesive layer is formed and the region in which the image is recorded match when viewing the recording surface of the recording medium in plan view; however, the invention is not limited thereto. For example, the adhesive layer may be provided with a structure such as the adhesive layer U' in FIG. 9. The adhesive layer U' in FIG. 9 is obtained by being formed such that the area of the adhesive layer U' is larger than the image BC when viewing the recording surface in plan view and recording the image BC in a part in the region in which the adhesive layer U' is formed.

From the point of view that the recording is sped up by shortening the drying time of the second clear ink composition which is used for forming the adhesive layer, it is preferable to form the adhesive layer U in FIG. 8 described above. On the other hand, from the point of view that the scratch resistance and adhesion of the image are further improved, it is preferable to form the adhesive layer U' in FIG. 9 described above.

Figure 9:
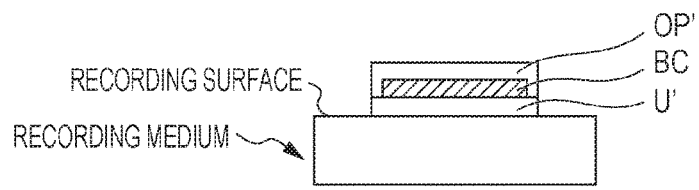
FIG. 9 is a diagram which schematically shows a side surface of a recording medium where an adhesive layer is formed by the adhesive layer forming process of the ink jet recording method according to the present embodiment.

In addition, as shown in FIG. 9, in a case of providing the protective layer OP' not only on the upper surface of the image BC, but also the side surface (refer to FIG. 4, FIG. 6, and FIG. 7), it is preferable that the protective layer OP' be provided so as to cover at least the upper surface of the adhesive layer U' when viewing the recording surface in plan view. Due to this, since the image BC is surrounded by the adhesive layer U' and the protective layer OP', the adhesion and scratch resistance are more excellent. In addition, since the upper surface of the adhesive layer U' is covered by the protective layer OP', it is possible to suppress decreases in the scratch resistance due to the exposed portion of the adhesive layer U'.

Here, in a case where the ink composition which forms the image contains the second resin particles, it is possible to improve adhesion of the image even without providing the adhesive layer; however, there is a tendency for the adhesion of the image to further improve when the adhesive layer is provided. Therefore, the adhesive layer may be provided in a case where further improvements in the adhesion are desired and the adhesive layer forming process may be omitted in a case where an increase in the speed of the recording is desired.

1.4. First Heating Process

The ink jet recording method according to the present embodiment may include a first heating process. The first heating process is performed after the protective layer forming process described above and heats the recording surface at the temperature of the glass transition temperature of the first resin particles or higher. Here, in a case where the ink jet recording method according to the present embodiment includes the adhesive layer forming process described above, the first heating process also heats the adhesive layer in addition to the protective layer and the image.

Film-forming of the protective layer and the image is promoted by performing the first heating process. Furthermore, due to the first resin particles and the second resin particles which are included in the protective layer dissolving, the dissolved resin particles easily permeate into the image or the mixing of the dissolved resin particles with the resin, which is included in the image in some cases, is promoted. As a result, it is possible to improve the adhesion between the image and the protective layer or the adhesion between the image and the recording medium.

It is necessary to perform heating of the recording surface in the first heating process at the glass transition temperature of the first resin particles or higher; however, the heating is preferably performed at 80° C. or higher and more preferably performed at 80° C. or higher to 150° C. or lower. Since the dissolving of the resin particles is promoted by heating the recording surface at the glass transition temperature of the first resin particles or higher, it is possible to improve the adhesion of each of the layers (the protective layer, the image, the recording surface, and the like). In addition, by heating the recording surface at 150° C. or lower, it is possible to suppress the generation of cracks due to the drying of the image and the protective layer from proceeding excessively.

In the invention, the heating temperature of the recording surface refers to the surface temperature of the recording surface and is able to be measured, for example, with a non-contact thermometer. Examples of non-contact thermometers include an infrared thermography apparatus H2640/H2630 (product name, manufactured by NEC Avio Infrared Technologies Co., Ltd.) and PT-2LD (product name, manufactured by Optex Co., Ltd.).

One second or more to ten seconds or less is preferable as the heating time and one second or more to five seconds or less is more preferable. By the heating time being within the range described above, it is possible to sufficiently promote the film-forming and mixing of the resin (the resin particles).

It is preferable that heating in the first heating process be carried out without ventilation. When ventilation is performed before the film-forming of the resin (the resin particles) proceeds, the evaporation of a solvent which is included in the protective layer or the image proceeds excessively and an effect of improving the fluidity of the resin with a liquid medium is not easily obtained. As a result, since permeation or mixing of the resin which is included in the protective layer and the image does not easily occur, there is a tendency for the adhesion of each of the layers (the protective layer, the image, and the recording medium) to decrease. From this point of view, it is preferable to perform the first heating process using a heating unit without ventilation such as a print heater mechanism which heats by bringing a heating source into contact with the recording medium, or a mechanism which irradiates infrared rays, microwaves (electromagnetic waves which have a very large wavelength of approximately 2,450 MHz), or the like.

1.5. First Drying Process

The ink jet recording method according to the present embodiment may include a first drying process. The first drying process is performed after the first heating process described above and performs ventilation while heating the recording surface at the heating temperature of the recording surface in the first heating process or less. Due to this, it is possible to dry the protective layer and the image by evaporating the liquid medium (water, an organic solvent, or the like) which is included in the protective layer and the image. Here, in a case where the ink jet recording method according to the present embodiment includes the adhesive layer forming process described above, the first drying process also dries the adhesive layer in addition to the protective layer and the image.

"Ventilation" in the present embodiment also includes blowing air to the protective layer or the image which is provided on the recording surface and also includes allowing air to pass over the surface of the recording surface without directly blowing air to the protective layer or the image (that is, generating an air current in the vicinity of the surface of the recording surface).

Since ventilation is performed in the first drying process, it is possible to effectively remove (volatilize) the liquid medium which is included in the protective layer or the image. Here, in a case of performing the drying of the protective layer or the image only with the first heating process described above without ventilation without performing the first drying process, the liquid medium which is evaporated in the vicinity of the surface of the protective layer or the image is stored and dryness is remarkably decreased. Therefore, it is preferable to perform the first drying process with ventilation after the first heating process. When the first drying process is performed after the first heating process, since the liquid medium is removed after each layer (the protective layer, the image, the adhesive layer, and the like) forms a favorable film, the dryness of each layer is excellent while the adhesion of each layer is excellent.

The first drying process is preferably performed when the heating temperature of the recording surface in the first drying process is the heating temperature of the recording surface in the first heating process or less and the first drying process is more preferably performed at less than the heating temperature of the recording surface during the first heating process. By setting the temperature to the heating temperature during the first heating process or less, it is possible to suppress the resin from flowing after the film-forming.

It is necessary for the heating temperature of the recording surface in the first drying process to be the heating temperature of the recording surface in the first heating process or less (preferably less than the heating temperature of the recording surface during the first heating process); however, it is possible to set the temperature to 60° C. or higher and it is also possible to set the temperature to 60° C. or higher to 150° C. or lower. The dryness of each of the layers becomes more favorable by setting the temperature to 60° C. or higher and it is possible to suppress the generation of cracks in each layer by setting the temperature to 150° C. or lower.

The first drying process may be performed by ventilation with heating (that is, warm air) or may be performed by combining the same heating unit for the recording surface as the first heating process with a ventilation unit. Examples of the ventilation unit include drying apparatuses which are known in the art such as dryers. In this manner, in the first drying process, the unit is not particularly limited as long as it is possible to perform ventilation while keeping the temperature of the recording surface within the range described above.

It is preferable that the drying time in the first drying process (that is, the time for carrying out ventilation and heating) be three times or more the heating time in the first heating process, and three times or more to 30 times or less is more preferable. In this manner, since the liquid medium is sufficiently evaporated by setting the drying time of the first drying process to three times or more the heating time of the first heating process, it is possible to obtain an image with excellent scratch resistance. In addition, by setting the drying time to 30 times or less, it is possible to shorten the drying time while sufficiently evaporating the liquid medium.

It is preferable to perform ventilation in the first drying process with an air speed of 6 m/sec or more and it is more preferable to perform the ventilation with an air speed of 6 m/sec or more to 50 m/sec or less. It is possible to improve the evaporation speed of the liquid medium by performing drying at an air speed of 6 m/sec or more and it is possible to prevent disturbances in the protective layer or the image due to the air while maintaining the dryness by performing the ventilation at 50 m/sec or less.

1.6. Second Drying Process

The ink jet recording method according to the present embodiment may include a second drying process. The second drying process is performed when carrying out the image recording process and the protective layer forming process and performs ventilation while heating the recording surface at less than the heating temperature of the recording surface in the first drying process. In more detail, the second drying process is performed before the first heating process and the first drying process described above and is able to be performed at at least one timing out of before discharging, during discharging, or after discharging each ink. In this manner, by performing the second drying process, it is possible to dry the image and the protective layer to a certain extent.

In the second drying process, since drying is performed when forming (recording) each layer, it is possible to suppress the ink droplets which form the layers from flowing. Due to this, since it is possible to keep the ink droplets at the place of attachment, it is possible to suppress the generation of printing unevenness or the like. In addition, in the second drying process, since it is possible to form the next layer after drying the previously formed layer to a certain extent, it is possible to suppress bleeding of the image caused by the components which are included in each layer being excessively mixed. Here, in a case where the ink jet recording method according to the present embodiment includes the adhesive layer forming process described above, the second drying process also dries the adhesive layer in addition to the protective layer and the image.

It is preferable that the heating temperature of the recording surface in the second drying process be less than the heating temperature of the recording surface in the first drying process. That is, the heating temperature of the recording surface in the second drying process is also less than the heating temperature of the recording surface in the first heating process. Due to this, since it is possible to suppress evaporation of the liquid medium or film-forming from proceeding excessively, it is possible to secure the fluidity of the resin particles during the first heating process.

From the point of view of suppressing the drying from proceeding excessively, it is preferable that the heating temperature of the recording surface in the second drying process be less than the heating temperature of the recording surface during the first drying process. In more detail, it is possible to set the heating temperature in the second drying process to 35° C. or higher to 80° C. or lower, more preferably 35° C. or higher to 60° C. or lower.

The second drying process may be performed by ventilation with heating (that is, warm air) or may be performed by combining the ventilation unit with the same heating unit for the recording surface as the first heating process. Examples of the ventilation unit include drying apparatuses which are known in the art such as dryers. In this manner, in the second drying process, the unit is not particularly limited as long as it is possible to perform ventilation while keeping the temperature of the recording surface within the range described above.

It is sufficient if the drying time in the second drying process (that is, the time for carrying out ventilation and heating) is set such that the drying rate of each layer is in a range which will be described below without being particularly limited. Here, it is possible to calculate the drying rate in the present embodiment based on the weight of a layer formed of the ink droplets which are attached on the recording surface at a specific time in a case where the weight of the ink droplets which are discharged in order to form a certain layer is set to 100% and the weight when the drying of the layer formed of the ink droplets which are attached on the recording surface is finished is set to 0%.

It is preferable that the second drying process be performed such that all of the drying rates of each layer are within a range of 30 mass % to 80 mass %, more preferably so as to be 35 mass % to 75 mass %, and even more preferably 40 mass % to 70 mass %. By setting the drying rate of each layer to 30 mass % or more, it is possible to suppress the ink droplets from flowing and the components which are included in the previously formed layer and the subsequently formed layer from being excessively mixed.

It is preferable to perform the ventilation in the second drying process at less than the air speed in the first drying process and for example, it is possible to set an air speed of 2 m/sec or more to 5 m/sec or less. Since it is possible to suppress the evaporation of the liquid medium from proceeding excessively in the second drying process by setting an air speed of less than the air speed in the first drying, it is possible for the adhesion between the layers to be favorable.

2. Ink

2.1. Clear Ink Composition

It is possible to perform the protective layer forming process in the ink jet recording method according to the present embodiment using a clear ink composition which substantially does not contain a coloring material. Since the clear ink composition substantially does not contain a coloring material, the clear ink composition is a liquid which is colorless and transparent or colorless and semi-transparent. Examples of this clear ink composition include a first clear ink composition and a second clear ink composition. Below, detailed description will be given of the components which are included or which may be included in each clear ink composition.

2.1.1. First Clear Ink Composition

The first clear ink composition contains first resin particles and substantially does not contain a coloring material. Since the first clear ink composition is used for forming the protective layer, it may be referred to as an ink composition for forming a protective layer.

First Resin Particles

The first resin particles are resin particles where a glass transition temperature (Tg) is 50° C. or higher. Since the first resin particles have a glass transition temperature of 50° C. or higher which is sufficiently higher than room temperature (25° C.), a function of improving the scratch resistance is provided. In addition, the first resin particles are also provided with a function of imparting a favorable boiling resistance.

It is necessary for the Tg of the first resin particles to be 50° C. or higher; however, 70° C. or higher is preferable, 100° C. or higher is more preferable, and it is even more preferable that the upper limit be 150° C. or lower. Since it is possible to form a protective layer with excellent scratch resistance by the Tg of the first resin particles being 50° C. or higher, it is possible to improve the scratch resistance of the image where the protective layer is formed. In addition, since stickiness of the protective layer which is caused by the second resin particles is further reduced when the Tg of the first resin particles is set to 100° C. or higher, it is possible to form the protective layer with excellent boiling resistance, which is favorable in a case of using a soft wrapping film which is used for wrapping of food or the like which will be described below as the recording medium. In addition, since it is possible to suppress cracks or the like from being generated when drying the protective layer or to promote film-forming of the resin by the Tg of the first resin particles being 150° C. or lower, it is possible to obtain an image with favorable scratch resistance.

In particular, when forming the first protective layer which contains the first resin particles where Tg is 100° C. or higher on the uppermost surface in a case of laminating the first protective layer and the second protective layer, the boiling resistance function due to the second protective layer and the boiling resistance function due to the first protective layer act synergistically and the boiling resistance effect is even more remarkable. Here, the boiling resistance refers to the heating resistance of the image when the recording medium where the image is formed is placed in warm water. Here, the protective layer which includes the first resin particles has excellent boiling resistance due to the point that it is possible to suppress attachment to other images in the warm water. In addition, the protective layer which includes the second resin particles has excellent boiling resistance due to the point that it is possible to suppress peeling of the image in warm water by having properties such as being easily film-formed and excellent in adhesion.

It is possible to use an acrylic-based resin, a fluorene-based resin, a urethane-based resin, an olefin-based resin, a rosin-modified resin, a terpene-based resin, an ester-based resin, an amide-based resin, an epoxy-based resin, a vinyl chloride-based resin, a vinyl chloride-vinyl acetate copolymer, an ethylene vinyl acetate-based resin, or the like as the resin which configures the first resin particles. It is possible to use these resins as one type individually or in a combination of two or more types. From the point of view that it is possible to further improve the scratch resistance of the protective layer, it is preferable to include at least one of an acrylic-based resin and an ester-based resin from among these resins as the resin which configures the first resin particles.

The acrylic-based resin refers to a polymer which is obtained by using at least one type of (meth)acrylic acid, (meth)acrylic acid ester, acrylonitrile, cyanoacrylate, and acrylamide as a monomer (also referred to below as an "acrylic-based monomer").

The acrylic-based resin may be a homopolymer of an acrylic-based monomer or may be a copolymer of monomers other than an acrylic-based monomer (for example, olefin, styrene, vinyl acetate, vinyl chloride, vinyl alcohol, vinyl ether, vinylpyrrolidone, vinylpyridine, vinylcarbazole, vinylimidazole, vinylidene chloride, and the like). Here, the copolymer described above may take any form out of a random copolymer, a block copolymer, an alternating copolymer, or a graft copolymer. In the present specification, "(meth)acryl" means at least one of acryl, or methacryl which corresponds thereto.

In the above description, from the point of view that it is possible to further improve the scratch resistance of the protective layer, it is preferable that the acrylic-based resin be at least any one of a (meth)acrylic-based resin and a styrene-(meth)acrylic acid copolymer-based resin, more preferably at least any one of an acrylic-based resin and a styrene-acrylic acid copolymer-based resin, and even more preferably a styrene-acrylic acid copolymer-based resin. In addition, it is more preferable that the acrylic-based resin be an emulsion type.

Commercial products may be used for the resin emulsion which includes an acrylic-based resin and examples thereof include Mowinyl 972 (Tg: 101° C.) and 7180 (Tg: 53° C.) (the above are all product names, manufactured by Nippon Synthetic Chem Industry Co., Ltd.), Joncryl 530 (Tg: 75° C.), 538 (Tg: 64° C.), 1908 (Tg: 98° C.), 1925 (Tg: 75° C.), and 1992 (Tg: 78° C.) (the above are all product names, manufactured by BASF Ltd.), and the like. Here, the numeric values in the brackets are the glass transition temperatures (Tg).

The ester-based resin is a polymer which is obtained by polycondensating a polyol and polycarboxylic acid. It is possible to synthesize the ester-based resin using a method which is known in the art. It is more preferable that the ester-based resin be an emulsion type. Commercial products may be used for the resin emulsion which includes an ester-based resin and examples thereof include Elitel KA-5034 (Tg: 67° C.), KA-5071S (Tg: 67° C.), KZA-1734 (Tg: 66° C.), KZA-6034 (Tg: 72° C.), and KZA-3556 (Tg: 80° C.) (the above are all product names, manufactured by Unitika Ltd.), and the like. Here, the numeric values in the brackets are the glass transition temperatures (Tg).

It is preferable that the content of the first resin particles be set to 1 mass % to 20 mass % with respect to the total mass of the first clear ink composition and more preferably 3 mass % to 10 mass %. By the content of the first resin particles being 1 mass % or more, the scratch resistance of the protective layer becomes even more favorable. In addition, by the content of the first resin particles being 20 mass % or less, there is a tendency for the discharge property of the first clear ink composition from the recording head to be favorable.

Water

The first clear ink composition contains water. Water is a medium which is the main part of the first clear ink composition and a component which is evaporated and scattered by drying. It is preferable that the water be water where ionic impurities are removed as much as possible such as pure water or ultra-pure water such as ion-exchanged water, ultrafiltration water, reverse osmosis water, or distilled water. In addition, since it is possible to suppress the generation of mold or bacteria in a case where the ink is stored for long periods, it is favorable to use water which is sterilized by ultraviolet irradiation, hydrogen peroxide addition, or the like.

The first clear ink composition is a so-called water-based ink which includes water as a main solvent (which contains 50 mass % or more water). There is an advantage in that the water-based ink is good for the environment since bad odors are suppressed and 50 mass % or more of the composition thereof is water.

Wax

The first clear ink composition may contain wax. Since the wax is provided with a function which adds smoothness and glossiness to the protective layer, it is possible to reduce peeling, scratching, or the like of the protective layer.

It is possible to use plant and animal-based waxes such as carnauba wax, candeli wax, beeswax, rice wax, and lanolin; petroleum-based waxes such as paraffin wax, microcrystalline wax, polyethylene wax, polyethylene oxide wax, and petrolatum; mineral-based waxes such as montan wax and ozocerite; synthesized waxes such as carbon wax, Hoechst wax, polyolefin wax, and stearic acid amide; natural or synthesized wax emulsions such as α-olefin maleic anhydride copolymers, mixed wax, or the like individually or by mixing a plurality of types as the components which configure the wax. From the point of view of having a more excellent effect of improving the fixing property with respect to a soft wrapping film which will be described below, it is preferable to use a polyolefin wax (in particular, polyethylene wax or polypropylene wax) and paraffin wax from among the above.

It is possible to use commercial products as is as the wax and examples thereof include Nopcoat PEM-17 (product name, manufactured by San Nopco Ltd.), Chemipearl W4005 (product name, manufactured by Mitsui Chemicals, Inc.), AQUACER 515, 539, and 593 (the above are all product names, manufactured by BYK Japan KK), and the like.

From the point of view of suppressing decreases in performance due to the wax being excessively dissolved in the heating process or the drying process described above, it is preferable to use wax with a melting point of 50° C. or higher to 200° C. or lower, more preferably with a melting point of 70° C. or higher to 180° C. or lower, and even more preferably with a melting point of 100° C. or higher to 180° C. or lower.

It is preferable that the content of the wax be 0.1 mass % to 10 mass % in terms of solid content with respect to the total mass of the first clear ink composition. When the content of the wax is within the range described above, it is possible to favorably exhibit the function of the wax described above.

Organic Solvent

The first clear ink composition may include an organic solvent. The organic solvent is not particularly limited; however, examples thereof include alkyl polyols, pyrrolidone derivatives, glycol ethers, and the like. These organic solvents may be used as one type individually or may be used in a combination of two or more types.

Examples of alkyl polyols include propylene glycol, dipropylene glycol, 1,2-butanediol, 1,2-pentanediol, 1,2-hexanediol, 1,2-heptanediol, 1,3-butylene glycol, 3-methyl-1,3-butanediol, 2-ethyl-2-methyl-1,3-propanediol, 2-methyl-1,3-propanediol, 2-methyl-2-propyl-1,3-propanediol, 2,2-dimethyl-1,3-propanediol, 2-methylpentane-2,4-diol, 3-methyl-1,5-pentanediol, and the like. The alkyl polyols have a function which improves the wettability of ink with respect to the recording medium or suppresses the solidifying and drying of ink.

In a case where the alkyl polyols are contained, it is possible to set the content thereof to 1 mass % to 40 mass % with respect to the total mass of the first clear ink composition.

Examples of pyrrolidone derivatives include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. It is possible for the pyrrolidone derivatives to act as a favorable dissolving agent for the resin component. In a case where the pyrrolidone derivatives are contained, it is possible to set the content thereof to 0.5 mass % to 30 mass % with respect to the total mass of the first clear ink composition.

Examples of glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, and the like. It is possible to use these as one type individually or in a mixture of two or more types. It is possible for the glycol ethers to control the wettability or the permeation speed of ink with respect to the recording medium.

In a case where the glycol ethers are contained, it is possible to set the content thereof to 0.05 mass % to 6 mass % with respect to the total mass of the first ink composition.

It is preferable that the first clear ink composition substantially not contain a water-soluble organic solvent with a standard boiling point of 280° C. or higher. This is because there are cases where dryness of the ink is greatly decreased and the fixing property of the image is decreased by including a water-soluble organic solvent where the standard boiling point is 280° C. or higher. As a result, there are cases where the fixing property of the image decreases when performing recording with respect to a soft wrapping film which will be described below. Examples of a water-soluble organic solvent with a standard boiling point of 280° C. or higher include glycerine (the standard boiling point is 290° C.). In the invention, "water-soluble" refers to being provided with a property where the solubility with respect to 100 g of water at 20° C. is 0.1 g or more.

Surfactant

The first clear ink composition may contain a surfactant. The surfactant is provided with a function of reducing surface tension and improving the wettability with a recording medium. It is possible to preferably use, for example, an acetylene glycol-based surfactant, a silicone-based surfactant, or a fluorine-based surfactant from among surfactants.

The acetylene glycol-based surfactant is not particularly limited; however, examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (the above are all product names, manufactured by Air Products and Chemicals. Inc.), Olefin B, Y, P, A, STG, SPC, E1004, E1010, PD-001, PD-002W, PD-003, PD-004, EXP. 4001, EXP.4036, EXP. 4051, AF-103, AF-104, AK-02, SK-14, and AE-3 (the above are all product names, manufactured by Nissin Chemical Industry Co., Ltd.), Acetylenol E00, EOOP, E40, and E100 (the above are all product names, manufactured by Kawaken Fine Chemicals Co., Ltd.).

The silicone-based surfactant is not particularly limited; however, examples thereof include a polysiloxane-based compound. The polysiloxane-based compound is not particularly limited; however, examples thereof include polyether-modified organosiloxane. Examples of commercial products of the polyether-modified organosiloxane include BYK-306, BYK-307, BYK-333, BYK-341, BYK-345, BYK-346, and BYK-348 (the above are all product names, manufactured by BYK KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are all product names, manufactured by Shin-Etsu Chemical Co., Ltd.).

It is preferable to use a fluorine-modified polymer as the fluorine-based surfactant and specific examples thereof include BYK-340 (manufactured by BYK Japan KK).

In a case where the surfactant is contained, it is preferable that the content be 0.1 mass % to 1.5 mass % with respect to the total mass of the first clear ink composition.

Other Components

The first clear ink composition may contain pH adjusting agents, preservatives and fungicides, anti-rust agents, and the like as necessary.

Examples of pH adjusting agents include potassium dihydrogen phosphate, hydrogen disodium phosphate, sodium hydroxide, lithium hydroxide, potassium hydroxide, ammonia, diethanolamine, triethanolamine, triisopropanolamine, potassium carbonate, sodium carbonate, sodium bicarbonate, and the like.

Examples of preservatives and fungicides include sodium benzoate, pentachlorophenol sodium, 2-pyridinethiol-1-oxide sodium, sodium sorbate, sodium dehydroacetate, 1,2-dibenzisothiazolin-3-on, and the like. Examples of commercial products thereof include Proxel XL2 and Proxel GXL (the above are product names, manufactured by Nitto Denko Avecia Inc.), Denicide CSA, NS-500W (the above are product names, manufactured by Nagase ChemteX Corp.), and the like.

Examples of anti-rust agents include benzotriazole and the like.

2.1.2. Second Clear Ink Composition

The second clear ink composition contains second resin particles and substantially does not contain a coloring material. The second clear ink composition is able to be used to form the protective layer and is also able to be used to form the adhesive layer. In a case of using the second clear ink composition to form the protective layer, it is possible to say that the second clear ink composition is a clear ink composition for forming a protective layer. In addition, in a case of using the second clear ink composition to form the adhesive layer, it is possible to say that the second clear ink composition is a clear ink composition for forming an adhesive layer.

Second Resin Particles

The second resin particles are resin particles where the glass transition temperature (Tg) is less than 50° C. Since the second resin particles have a sufficiently low glass transition temperature which is less than 50° C., the second resin particles are easily film-formed and provide a function of improving the adhesion, boiling resistance, and solvent resistance.

It is necessary for the Tg of the second resin particles to be less than 50° C.; however, 40° C. or lower is preferable and 30° C. or lower is even more preferable. In addition, it is preferable that the lower limit be −40° C. or higher, −30° C. or higher is more preferable, and −20° C. or higher is even more preferable. Since it is possible to form a protective layer which has excellent adhesion due to the Tg of the second resin particles being less than 50° C., it is possible to improve adhesion of an image where the protective layer is formed. In addition, in a case of using the second clear ink composition to form the adhesive layer, due to the Tg of the second resin particles being less than 50° C., it is possible to improve the adhesion between the recording surface of the recording medium and the image, boiling resistance, and solvent resistance. In addition, since it is possible to maintain the tackiness of the protective layer within a favorable range due to the Tg of the second resin particles being −40° C. or higher, the effect of improving the scratch resistance according to the first resin particles described above is favorably exhibited.

In addition, in order to sufficiently film-form a layer which is formed by the second clear ink composition, it is preferable that the Tg of the second resin particles be 40° C. or more lower than the heating temperature in the first heating process and 50° or more lower is preferable. Due to this, it is possible to improve the adhesion of recorded matter, boiling resistance, and solvent resistance.

Furthermore, it is preferable that the difference between the Tg of the first resin particles and the Tg of the second resin particles be 30° C. or higher, more preferably 40° C. or higher, and even more preferably 50° C. or higher. Due to this, it is possible to obtain recorded matter which is provided with scratch resistance, adhesion, boiling resistance, and solvent resistance in a well-balanced manner.

It is possible to use an acrylic-based resin, a fluorene-based resin, a urethane-based resin, an olefin-based resin, a rosin-modified resin, a terpene-based resin, an ester-based resin, an amide-based resin, an epoxy-based resin, a vinyl chloride-based resin, a vinyl chloride-vinyl acetate copolymer, an ethylene vinyl acetate-based resin, and the like as the resin which configures the second resin particles. It is possible to use these resins as one type individually or in a combination of two or more types. From the point that it is possible to further improve adhesion of the protective layer or the performance of the adhesive layer, it is preferable that the resin which configures the second resin particles include a urethane-based resin from out of these resins. In particular, it is possible for the urethane-based resin to be favorably used in a case where an anti-fogging agent or an antistatic agent which will be described below is present on a recording surface. That is, the anti-fogging agent, the antistatic agent, and the like have a fat-soluble surfactant (which will be described below) as a main component and are often formed of low molecules with high polarity. In this case, it may be considered that this is because, when using a urethane-based resin which has many polar groups, it is possible to firmly fix the image on the recording surface by making the resin compatible with the anti-fogging agent, the antistatic agent, or the like.

The urethane-based resin is a polymer which is synthesized by reacting polyisocyanate and polyol. It is possible to carry out the synthesis of the urethane-based resin using a method which is known in the art.

Examples of the polyisocyanate include aliphatic isocyanates in a chained form such as tetramethylene diisocyanate, 1,6-hexamethylene diisocyanate, dodecamethylene diisocyanate, trimethyl hexamethylene diisocyanate, and lysine diisocyanate; aliphatic isocyanates which have a cyclic structure such as 1,3-cyclohexylene diisocyanate, 1,4-cyclohexylene diisocyanate, hydrogenated xylylene diisocyanate, isophorone diisocyanate, 4,4'-dicyclohexylmethane diisocyanate, and 3,3'-dimethyl-4,4'-dicyclohexylmethane diisocyanate; and aromatic isocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydro naphthalene diisocyanate, xylylene diisocyanate, and tetramethyl xylylene diisocyanate. When synthesizing the urethane-based resin, the polyisocyanates described above may be used individually or may be used in a combination of two or more types.

Examples of the polyols include polyether polyols, polycarbonate polyols, and the like. Examples of polyether polyols include polyethylene glycol, polypropylene glycol, polytetramethylene glycol, and the like. Examples of polycarbonate polyols include reactions products or the like of diols such as 1,3-propanediol, 1,4-butanediol, 1,6-hexanediol, diethylene glycol, polyethylene glycole, polypropylene glycol, or polytetramethylene glycol, with dialkyl carbonates such as phosgene and dimethyl carbonate or cyclic carbonates such as ethylene carbonate.

It is preferable to use an emulsion type resin for the urethane-based resin. It is possible to use commercial products for the resin emulsion which includes the urethane-based resin and examples thereof include Superflex 740 (Tg: −34° C.) (product name, manufactured by Dai-ichi Kogyo Seiyaku Co., Ltd.), Bondic 1940NE (Tg: less than 5° C.) (product name, manufactured by DIC Corp.), and the like.

It is preferable to set the content of the second resin particles to 1 mass % to 20 mass % with respect to the total mass of the second clear ink composition, more preferably to 3 mass % to 15 mass %, and even more preferably to 3 mass % to 10 mass %. The adhesion of the protective layer and the adhesive layer, the boiling resistance, and the solvent resistance are made more favorable by the content of the second resin particles being 3 mass % or more. In addition, since the discharge property of the second clear ink composition from the recording head is favorable or since it is possible to maintain the tackiness of the protective layer within a favorable range by the content of the second resin particles being 20 mass % or less, the effect of improving the scratch resistance due to the first resin particles described above is favorably exhibited.

Water

The second clear ink composition contains water. Water is a medium which is the main part of the second clear ink composition and a component which is evaporated and scattered by drying. Since description of the water is the same as for the first clear ink composition, description thereof will be omitted.

The second clear ink composition is a so-called water-based ink which includes water as a main solvent (which contains 50 mass % or more water). There is an advantage in that the water-based ink is good for the environment since bad odors are suppressed and 50 mass % or more of the composition thereof is water.

Wax

The second clear ink composition may contain wax. Since the effects, the specific examples, the content ranges, and the like of the wax are the same as shown in the first clear ink composition, description thereof will be omitted.

Organic Solvent

The second clear ink composition may contain an organic solvent. Since the specific examples, the effects, the content ranges, and the like of the organic solvent are the same as the content shown in the first clear ink composition, description thereof will be omitted.

It is preferable that the second clear ink composition substantially not contain a water-soluble organic solvent where the standard boiling point is 280° C. or higher in the same manner as the first clear ink composition. That is, it is preferable to form the protective layer using a clear ink composition which does not contain a water-soluble organic solvent where the standard boiling point is 280° C. or higher. This is because there are cases where dryness of the ink is greatly decreased and the fixing property of the image is decreased by including a water-soluble organic solvent where the standard boiling point is 280° C. or higher.

Surfactant

The second clear ink composition may contain a surfactant. Since the specific examples, the effects, the content ranges, and the like of the surfactant are the same as the content shown in the first clear ink composition, description thereof will be omitted.

Other Components

The second clear ink composition may contain pH adjusting agents, preservatives and fungicides, anti-rust agents, and the like as necessary. Since the specific examples and the like of these components are the same as shown in the first clear ink composition, description thereof will be omitted.

2.1.3. Other Clear Ink Composition

It is possible to perform the protective layer forming process using one type of clear ink composition which contains both resin particles of the first resin particles and the second resin particles (also referred to below as the "other clear ink composition"). However, as described above, in the protective layer forming process, it is preferable to use two or more types of clear ink compositions of the first clear ink composition and the second clear ink composition from the point that the functions provided by the first resin particles and the second resin particles are favorably exhibited.

The other clear ink composition contains the first resin particles and the second resin particles and substantially does not contain a coloring material. Since the first resin particles and the second resin particles which are included in the other clear ink composition are the same as shown in the first clear ink composition and the second clear ink composition described above, description thereof will be omitted.

In addition, since the components which may be included in another clear ink composition are the same as shown in the first clear ink composition and the second clear ink composition described above, description thereof will be omitted.

2.2. Ink Composition Used in Image Recording Process

An ink composition which contains water and a coloring material is used in the image recording process in the ink jet recording method according to the present embodiment. It is possible to use a background ink composition and a color ink composition for such an ink composition. Below, detailed description will be given of the components which are included and the components which may be included in each ink composition.

2.2.1. Background Ink Composition

The background ink composition contains a background coloring material and water. Examples of the background ink composition include a white ink composition or a photoluminescent ink composition.

The white ink composition is an ink which is able to record a color which is referred to as "white" in general and also includes colors with minute traces of other colors. In addition, inks containing such a pigment and referred to and sold as "white colored ink" or "white ink" are included. Furthermore, for example, in a case where ink is recorded on Epson genuine photograph paper <Luster> (manufactured by Seiko Epson Corp.) with 100% duty or more or in an amount which sufficiently covers the surface of the photograph paper, the inks include inks with a brightness ($L^*$) and chromaticity ($a^*$ and $b^*$) showing the ranges of $70 \leq L^* \leq 100$, $-4.5 \leq a^* \leq 2$, and $-6 \leq b^* \leq 2.5$ in a case of being measured by setting measurement conditions as a D50 light source, an observation field of 2°, a density of DIN NB, a white reference as Abs, a filter as No, and a measurement mode as Reflectance using a spectrophotometer Spectrolino (product name, manufactured by Gretag Macbeth Corp.).

A photoluminescent ink composition refers to an ink composition which exhibits photoluminescence when attached to a medium. In addition, for example, the photoluminescence refers to a property which is characterized by the specular glossiness of an obtained image (refer to the Japanese Industrial Standards (JIS) Z8741). For example, types of photoluminescence include photoluminescence such as specular reflection of light, so-called mat-tones, or the like and it is possible to characterize each of these, for example, according to the different levels of specular glossiness.

Background Coloring Material

Examples of the background coloring material include white coloring materials, photoluminescent pigments, and the like.

Examples of the white coloring material include metal oxides, barium sulfate, calcium carbonate, and the like. Examples of metal oxides include titanium dioxide, zinc oxide, silica, alumina, magnesium oxide, and the like. In addition, the white coloring material includes particles which have a hollow structure, the particles which have a hollow structure are not particularly limited, and it is possible to use particles which are known in the art. For example, it is possible to preferably use particles described in the specification of U.S. Pat. No. 4,880,465A and the like as the particles which have a hollow structure. From the point of view that the whiteness and the scratch resistance are favorable, it is preferable to use titanium dioxide as the white coloring material from among the above.

In a case of using the white coloring material, the content (solid content) of the white coloring material is preferably 1% or more to 20% or less with respect to the total mass of the white ink composition and more preferably 5% or more to 15% or less. When the content of the white coloring material exceeds the range described above, there are cases where nozzle clogging of the ink jet recording apparatus or the like occurs. On the other hand, when the content of the white coloring material is less than the range described above, there is a tendency for the color density such as the whiteness to be insufficient.

The volume-based average particle diameter of the white coloring material (referred to below as the "average particle diameter") is preferably 30 nm or more to 600 nm or less and more preferably 200 nm or more to 400 nm or less. When the average particle diameter of the white coloring material exceeds these ranges, there are times when dispersion stability is lost due to the particles precipitating or the like and nozzle clogging or the like may occur when applied to an ink jet recording apparatus. On the other hand, when the average particle diameter of the white coloring material is less than these ranges, there is a tendency for the whiteness to be insufficient.

It is possible to measure the average particle diameter of the white coloring material using a particle size distribution measuring apparatus employing a laser diffraction scattering method as the measuring principle. Examples of the particle size distribution measuring apparatus include a particle distribution meter employing a dynamic light scattering method as the measuring principle (for example, "Microtrac UPA" manufactured by Nikkiso Co., Ltd.).

The photoluminescent pigment is not particularly limited as long as it is possible to exhibit photoluminescence when attached to a medium; however, examples thereof include one type or an alloy of two or more types (also referred to as metal pigments) which are selected from a group formed of aluminum, silver, gold, platinum, nickel, chromium, tin, zinc, indium, titanium, and copper; or a pearl pigment which has pearl luster. Representative examples of the pearl pigment include pigments having pearl luster or interference luster such as titanium dioxide-coated mica, fish scale guanine, or bismuth acid chloride. In addition, a surface treatment for suppressing reaction with water may be carried out on the photoluminescent pigment. It is possible to form an image which has excellent photoluminescence due to the ink containing a photoluminescent pigment.

In a case of using a photoluminescent pigment, it is preferable that the content of the photoluminescent pigment be 0.5 mass % to 30 mass % with respect to the total mass of the photoluminescent ink composition and 1 mass % to 15 mass % is more preferable. When the content of the photoluminescent pigment is within the range described above, it is possible to make the discharge stability from the nozzles of the ink jet recording apparatus and the storage stability of the photoluminescent ink composition excellent.

Water

The background ink composition contains water. Water is a medium which is the main part of the background ink composition and a component which is evaporated and scattered by drying. Since description of the water is the same as for the first clear ink composition, description thereof will be omitted.

The background ink composition is a so-called water-based ink which includes water as a main solvent (which contains 50 mass % or more water). There is an advantage in that the water-based ink is good for the environment since bad odors are suppressed and 50 mass % or more of the composition thereof is water.

Organic Solvent

The background ink composition may contain an organic solvent. The organic solvent is not particularly limited; however, examples thereof include alkyl polyols, pyrrolidone derivatives, glycol ethers, and the like. These organic solvents may be used as one type individually or may be used in a combination of two or more types. Here, since the specific examples, the effects, the content ranges, and the like of each of the organic solvents are the same as the content shown in the first clear ink composition, description thereof will be omitted.

It is preferable that the background ink composition substantially not contain a water-soluble organic solvent where the standard boiling point is 280° C. or higher. This is because there are cases where dryness of the ink is greatly decreased and the fixing property of the image is decreased by including a water-soluble organic solvent where the standard boiling point is 280° C. or higher.

Surfactant

The background ink composition may contain a surfactant. The surfactant is provided with a function of reducing surface tension and improving the wettability with a recording medium. It is possible to preferably use, for example, an acetylene glycol-based surfactant, a silicone-based surfactant, or a fluorine-based surfactant from among surfactants. These surfactants may be used as one type individually or may be used in a mixture of two or more types. Since the specific examples, the effects, the content ranges, and the like of each of the surfactants are the same as the content shown in the first clear ink composition, description thereof will be omitted.

Resin Particles

The background ink composition may contain at least one of the first resin particles and the second resin particles described above. It is not possible to obtain an effect as good as when a protective layer or an adhesive layer is provided; however, it is possible to improve the scratch resistance and adhesion of the image. Here, in a case of recording a color image on a background image, the background image is present at a position which is closer to the surface of the recording medium. In this case, from the point that it is possible to further improve the adhesion of the image and the recording medium, it is more preferable that the background ink composition contain the second resin particles.

Wax

The background ink composition may contain wax. Since the effects, the specific examples, the content ranges, and the like of the wax are the same as shown in the first clear ink composition, description thereof will be omitted.

Other Components

The background ink composition may contain pH adjusting agents, preservatives and fungicides, anti-rust agents, and the like as necessary. Since the specific examples and the like of these components are the same as shown in the first clear ink composition, description thereof will be omitted.

2.2.2. Color Ink Composition

The color ink composition contains a colored coloring material and water.

Coloring Material

The color ink composition contains a colored coloring material. The colored coloring material refers to a coloring material other than the background coloring material described above. Examples of the colored coloring material include dyes, pigments, and the like.

It is possible to favorably use dyes and pigments which are described in US2010/0086690A, US2005/0235870, WO2011/027842A, and the like. Out of dyes and pigments, it is more preferable to include a pigment. From the point of view of the storage stability such as the light resistance, weather resistance, gas resistance, and the like, it is preferable that the pigment be an organic pigment.

In particular, azo pigments such as insoluble azo pigments, condensed azo pigments, azo lakes, and chelate azo pigments; polycyclic pigments such as phthalocyanine pigments, perylene and perynone pigments, anthraquinone pigments, quinacridone pigments, dioxane pigments, thioindigo pigments, isoindolinone pigments, and quinophthalone pigments; dye chelates, dye lakes, nitro pigments, nitroso pigments, aniline black, daylight fluorescent pigments, carbon black, and the like, are used for the pigment. It is possible to use the pigment described above as one type individually or in a mixture of two or more types.

In addition, for example, it is possible to use various types of dyes which are used for a normal ink jet recording such as direct dyes, acid dyes, food dyes, basic dyes, reactive dyes, disperse dyes, vat dyes, soluble vat dyes, and reaction disperse dyes, for the dye.

The content of the colored coloring material is preferably 1 mass % to 20 mass % with respect to the total mass of the color ink composition and more preferably 1 mass % to 15 mass %.

Resin Dispersant

In a case of using a pigment as a coloring material, it is preferable that the pigment be able to be dispersed and held in water in a stable manner for application to an ink composition. Examples of the method include a method for dispersing using a resin dispersant such as a water-soluble resin and/or a water dispersible resin (below, the pigment which is treated by this method may be referred to as a "resin dispersed pigment"), a method for dispersing using a dispersant (below, the pigment which is treated by this method may be referred to as a "dispersant dispersed pigment"), a method for chemically and physically introducing a hydrophilic functional group onto a pigment particle surface and able to disperse and/or dissolve in water without the resin or the dispersant (below, the pigment which is treated by this method may be referred to as a "surface treated pigment"), and the like.

It is possible to use any of the resin dispersed pigment, the dispersant dispersed pigment, and the surface treated pigment for the color ink composition and it is also possible to use these in a form where a plurality of types are mixed as necessary; however, it is preferable that the resin dispersed pigment be contained.

Examples of the resin dispersant which is used for the resin dispersed pigment include polyvinyl alcohols, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-metacrylic acid-acrylic acid ester copolymers, styrene-α-methyl styrene-acrylic acid copolymers, styrene-α-methyl styrene-acrylic acid ester copolymers, styrene-maleic acid copolymers, styrene-maleic anhydride copolymers, vinylnaphthalene-aclylic acid copolymers, vinylnaphthalene-maleic acid copolymers, vinyl acetate-maleic acid ester copolymers, vinyl acetate-crotonic acid copolymers, vinyl acetate-acrylic acid copolymers, and the like and salts thereof. Among these, copolymers of a monomer which has a hydrophobic functional group and a monomer which has a hydrophilic functional group and polymers formed of monomers which have both the hydrophobic functional group and the hydrophilic functional group are preferable. As a form of the copolymer, it is possible to use in any form of a random copolymer, a block copolymer, an alternating copolymer, and a graft copolymer.

It is possible to appropriately select the content ratio of the resin dispersant according to the pigment which is to be dispersed; however, with respect to 100 parts by mass of the content of the pigment in the color ink composition, 5 parts by mass or more to 200 parts by mass or less is preferable and 30 parts by mass or more to 120 parts by mass or less is more preferable.

Water

The color ink composition contains water. Water is a medium which is the main part of the background ink composition and a component which is evaporated and scattered by drying. Since description of the water is the same as for the first clear ink composition, description thereof will be omitted.

The color ink composition is a so-called water-based ink which includes water as a main solvent (which contains 50 mass % or more water). There is an advantage in that the water-based ink is good for the environment since bad odors are suppressed and 50 mass % or more of the composition thereof is water.

Organic Solvent

The color ink composition may contain an organic solvent. The organic solvent is not particularly limited; however, examples thereof include alkyl polyols, pyrrolidone derivatives, glycol ethers, and the like. These organic solvents may be used as one type individually or may be used in a combination of two or more types. Here, since the specific examples, the effects, the content ranges, and the like of each of the organic solvents are the same as the content shown in the first clear ink composition, description thereof will be omitted.

It is preferable that the color ink composition substantially not contain a water-soluble organic solvent where the standard boiling point is 280° C. or higher in the same manner as the background ink composition. That is, it is preferable that the image be recorded using an ink composition which does not contain a water-soluble organic solvent where the standard boiling point is 280° C. or higher. This is because there are cases where dryness of the ink is greatly decreased and the fixing property of the image is decreased by including a water-soluble organic solvent where the standard boiling point is 280° C. or higher.

Surfactant

The color ink composition may contain a surfactant. The surfactant is provided with a function of reducing surface tension and improving the wettability with a recording medium. It is possible to preferably use, for example, an acetylene glycol-based surfactant, a silicone-based surfactant, or a fluorine-based surfactant from among surfactants. These surfactants may be used as one type individually or may be used in a mixture of two or more types. Since the specific examples, the effects, the content ranges, and the like of each of the surfactants are the same as the content shown in the first clear ink composition, description thereof will be omitted.

Resin Particles

The color ink composition may contain at least one of the first resin particles and the second resin particles described above in the same manner as the background ink composition. It is not possible to obtain an effect as good as when a protective layer or an adhesive layer is provided; however, it is possible to improve the scratch resistance and adhesion of the image. In particular, in a case of forming a color image on a background image, since the color image is easily subjected to external friction due to the color image being present in an upper part compared to the background image, it is more preferable that the color ink composition contain the first resin particles.

Wax

The color ink composition may contain wax. Since the effects, the specific examples, the content ranges, and the like of the wax are the same as shown in the first clear ink composition, description thereof will be omitted.

Other Components

The color ink composition may contain pH adjusting agents, preservatives and fungicides, anti-rust agents, and the like as necessary. Since the specific examples and the like of these components are the same as shown in the first clear ink composition, description thereof will be omitted.

2.3. Method for Preparing Ink

Each of the ink compositions described above (the clear ink composition, the color ink composition, and the background ink composition described above) is obtained by mixing the components described above in an arbitrary order and removing impurities by filtering as necessary. As the mixing method of each of the components, a method for sequentially adding materials to a container which is provided with a stirring apparatus such as a mechanical stirrer or a magnetic stirrer and carrying out stirring and mixing is favorably used. As the filtering method, it is possible to perform centrifugal filtration, filter filtration, and the like as necessary.

2.4. Physical Properties of Ink

From the point of view of the balance between image quality and reliability as an ink jet ink, it is preferable that the surface tension at 20° C. of each of the ink compositions described above (the clear ink composition, the color ink composition, and the background ink composition described above) be 15 mN/m to 50 mN/m and 20 mN/m to 40 mN/m is more preferable. Here, it is possible to measure the surface tension by confirming the surface tension when wetting a platinum plate with the ink composition in a 20° C. environment, for example, using Automatic surface tensiometer CBVP-Z (product name, manufactured by Kyowa Interface Science Co., LTD.).

In addition, from the same point of view, it is preferable that viscosity of each of the ink compositions described above at 20° C. be 2 mPa·s or more to 15 mPa·s or less and 2 mPa·s or more to 10 mPa·s or less is more preferable. Here, it is possible to measure the viscosity in a 20° C. environment, for example, using a Rheometer MCR-300 (product name, manufactured by Physica Corp.).

3. Ink Jet Recording Apparatus

Description will be given of one example of an image recording apparatus, which is able to carry out the method for recording an image according to the present embodiment, with reference to the diagrams. Here, the image recording apparatus which is able to be used for the method for recording an image according to the present embodiment is not limited to the following aspects.

Figure 10:
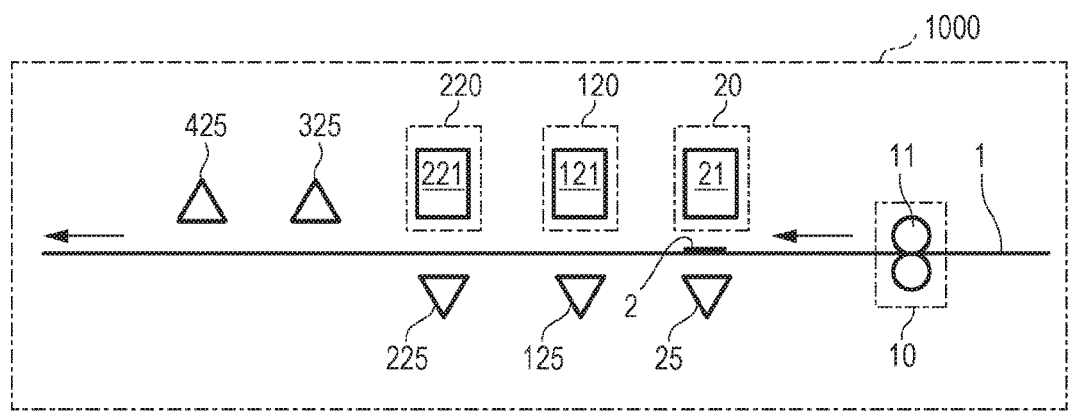
FIG. 10 is a diagram which schematically shows an ink jet recording apparatus which is used in the ink jet recording method according to the present embodiment.

FIG. 10 is a schematic diagram of one example of the ink jet recording apparatus which is used for the ink jet recording method according to the present embodiment.

An ink jet recording apparatus 1000 which is one example of the present embodiment is provided with a transport unit 10 which transports a recording medium 1, an adhesive layer forming unit 20 which records an adhesive layer using the second clear ink composition described above, an adhesive layer drying unit 25 which is provided at a position which opposes the adhesive layer forming unit 20, an image recording unit 120 which records an image using the ink compositions described above, an image drying unit 125 which is provided at a position which opposes the image recording unit 120, the protective layer forming unit 220 which forms a protective layer which covers an image using the clear ink compositions described above, a protective layer drying unit 225 which is provided at a position which opposes the protective layer forming unit 220, an overall heating unit 325 which heats a recording surface, and an overall drying unit 425 which heats and ventilates the recording surface.

For the ink jet recording apparatus according to the present embodiment, it is possible to use either of an ink jet recording apparatus which is provided with a serial type recording head and an ink jet recording apparatus which is provided with a line type recording head.

3.1. Transport Unit

It is possible to configure the transport unit 10, for example, by a roller 11. The transport unit 10 may have a plurality of rollers 11. The transport unit 10 is provided on the upstream side of the adhesive layer forming unit 20 in the direction in which the recording medium 1 is transported (shown by an arrow in the diagram) in the example shown in the diagram; however, without being limited thereto, the position at which the unit is provided or the number thereof is arbitrary as long as it is possible to transport the recording medium 1. The transport unit 10 may be provided with a paper feeding roll, a paper feeding tray, a paper ejecting roll, a paper ejecting tray, various types of platens, and the like.

The recording medium 1 which is transported by the transport unit 10 is transported to the position where the adhesive layer is recorded on the recording surface by the adhesive layer forming unit 20.

Here, FIG. 1 shows a case where the recording medium 1 is a continuous body; however, even when the recording medium 1 is a single sheet, it is possible to perform transportation of the recording medium by appropriately configuring the transport unit 10.

3.2. Adhesion Forming Layer Unit

The adhesive layer forming unit 20 is one example of a unit for carrying out the adhesive layer forming process described above. The adhesive layer forming unit 20 records an adhesive layer 2 using the second clear ink composition described above with respect to the recording surface of the recording medium 1. The adhesive layer forming unit 20 is provided with a recording head 21 which is provided with nozzles which discharge the second clear ink composition.

Examples of methods for discharging ink such as the second clear ink composition from nozzles of the recording head include the following. In detail, examples thereof include a method for applying an intense electric field between acceleration electrodes which are placed in nozzles and in the front of the nozzles, continuously discharging ink in liquid droplet form from the nozzles, and recording by sending a recording information signal to deflecting electrodes while liquid droplets of ink fly between the deflecting electrodes, or a method for discharging liquid droplets of ink in correspondence with the recording information signal without deflecting (an electrostatic suction method), a method for forcibly discharging liquid droplets of ink by adding pressure to ink with a small pump and mechanically vibrating the nozzles with a quartz oscillator or the like, a method for discharging and recording with liquid droplets of ink by adding pressure to ink with a piezoelectric element at the same time as a recording information signal (a piezo method), a method for discharging and recording with liquid droplets of ink by heating and foaming the ink with minute electrodes according to a recording information signal (a thermal jet method), and the like.

3.3. Adhesive Layer Drying Unit

The adhesive layer drying unit 25 is one example of a unit for performing the second drying process described above and is used for drying the adhesive layer which is formed on the recording surface. In the example in FIG. 10, the adhesive layer drying unit 25 is provided at a position which opposes the adhesive layer forming unit 20; however, without being limited thereto, the adhesive layer drying unit 25 may be provided at any position as long as it is possible to dry the adhesive layer before recording the image. Since the details of the adhesive layer drying unit 25 are as described in the second drying process, description thereof will be omitted.

3.4. Image Recording Unit

The image recording unit 120 is one example of a unit for carrying out the image recording process described above. The image recording unit 120 records an image using the ink composition described above with respect to the recording surface of the recording medium 1. The image recording unit 120 is provided with a recording head 121 which is provided with nozzles which discharge ink compositions. Since the discharging method of the recording head 121 is the same as the example described for the adhesive layer forming unit 20, description thereof will be omitted.

In a case of forming an image using the background ink composition and the color ink composition described above, the image recording unit 120 may discharge both inks from different nozzles of the recording head 121 and may be provided with a recording head which discharges the background ink composition and a recording head which discharges the color ink composition.

In a case where the image recording unit 120 is provided with a recording head which discharges the background ink composition and a recording head which discharges the color ink composition, it is possible to provide a recording head (recording unit) which discharges the background ink composition on the upstream side and a recording head (recording unit) which discharges the color ink composition on the downstream side thereof.

3.5. Image Drying Unit

The image drying unit 125 is one example of a unit for carrying out the second drying process described above and is used for drying an image. In the example in FIG. 10, the image drying unit 125 is provided at a position which opposes the image recording unit 120; however, without being limited thereto, the image drying unit 125 may be provided at any position as long as it is possible to dry the image before forming the protective layer. Since the details of the image drying unit 125 are as described in the second drying process, description thereof will be omitted.

In a case where the image recording unit 120 is provided with a recording head which discharges the background ink composition and a recording head which discharges the color ink composition, the image drying unit 125 may be provided with a drying unit which dries the background image which is recorded using the background ink composition and a drying unit which dries the color image which is recorded using the color ink composition.

3.6. Protective Layer Forming Unit

The protective layer forming unit 220 is one example of a unit for carrying out the protective layer forming process described above. The protective layer forming unit 220 forms a protective layer using the clear ink composition described above with respect to the image. The protective layer forming unit 220 is provided with a recording head 221 which is provided with nozzles which discharge the clear ink composition. Since the discharging method of the recording head 221 is the same as the example described for the adhesive layer forming unit 20, description thereof will be omitted.

In a case of forming the protective layer using the first clear ink composition and the second clear ink composition described above, the protective layer forming unit 220 may discharge both inks from different nozzles of the recording head 121 and may be provided with a recording head which discharges the first clear ink composition and a recording head which discharges the second clear ink composition.

In a case where the protective layer forming unit 220 is provided with a recording head which discharges the first clear ink composition and a recording head which discharges the second clear ink composition, it is possible to provide the recording head (recording unit) which discharges the second clear ink composition on the upstream side and the recording head (recording unit) which discharges the first clear ink composition on the downstream side thereof.

3.7. Protective Layer Drying Unit

The protective layer drying unit 225 is one example of a unit for carrying out the second drying process described above and is used for drying the protective layer. In the example in FIG. 10, the protective layer drying unit 225 is provided at a position which opposes the protective layer forming unit 220; however, without being limited thereto, the protective layer drying unit 225 may be provided at any position as long as it is possible to dry the protective layer before the overall heating process which will be described below. Since the details of the protective layer drying unit 225 are as described in the second drying process, description thereof will be omitted.

In a case where the protective layer forming unit 220 is provided with the recording head which discharges the first clear ink composition and the recording head which discharges the second clear ink composition, the protective layer drying unit 225 may be provided with a drying unit which dries a first protective layer which is recorded using the first clear ink composition and a drying unit which dries a second protective layer which is recorded using the second clear ink composition.

In the present embodiment, a case where the adhesive layer forming unit 20, the image recording unit 120 which will be described below, and the protective layer forming unit 220 which will be described below use different recording heads is shown; however, each unit may use a single recording head in common without being limited thereto. In this case, the unit is used for performing the second drying process described above. It is possible to have the adhesive layer drying unit 25, the image drying unit 125, and the protective layer drying unit 225 in common.

3.8. Overall Heating Unit

The overall heating unit 325 is one example of a unit for carrying out the first heating process described above and is used for heating the adhesive layer, the image, and the protective layer. It is possible to install the overall heating unit 325, for example, on the downstream side of the protective layer forming unit 220 as shown in FIG. 10. Since the details of the overall heating unit 325 are as described in the first heating process described above, description thereof will be omitted.

3.9. Overall Drying Unit

The overall drying unit 425 is one example of a unit for carrying out the first drying process described above and is used for drying the adhesive layer, the image, and the protective layer. It is possible to install the overall drying unit 425, for example, on the downstream side of the overall heating unit 325 as shown in FIG. 10. Since the details of the overall drying unit 425 are as described in the first drying process described above, description thereof will be omitted.

4. Recording Medium

The ink jet recording method according to the present embodiment is performed using a recording medium having low absorbency or non-absorbency to ink. The recording medium having low absorbency or non-absorbency to ink refers to a recording medium which has a property of not absorbing at all or hardly absorbing an ink composition. Quantitatively, the recording medium having low absorbency or non-absorbency to ink refers to a "recording medium where the quantity of water absorption from the start of contact to 30 msecu$^{1/2}$ is 10 mL/m$^2$ or less according to the Bristow method". The Bristow method is the method which is the most widespread as a method for measuring the quantity of liquid absorption in a short time and is also adopted by the Japan Technical Association of Pulp and Paper (JAPAN TAPPI). The details of the testing method are described in "Paper and Cardboard-Liquid Absorbency Testing Method-Bristow method" which is the specification No. 51 in "JAPAN TAPPI Paper Pulp Testing Methods 2000". With respect to this, a recording medium with ink absorbency refers to a recording medium which does not have low absorbency or non-absorbency to ink.

Examples of the recording medium with non-absorbency to ink include a recording medium where plastic is coated on a substrate such as a plastic film or paper which does not have an ink absorbing layer, a recording medium bonded with a plastic film, and the like. Examples of the plastic referred to here include polyvinyl chloride, polyethylene terephthalate, polycarbonate, polystyrene, polyurethane, polyethylene, polypropylene, and the like.

In addition, examples of the recording medium with low absorbency to ink include a recording medium where a coating layer for receiving ink is provided on the surface, examples of the recording medium where the substrate is paper include actual printing paper such as art paper, coated paper, and mat paper, and in a case where the substrate is a plastic film, examples thereof include a recording medium where a hydrophilic polymer is coated on the surface of polyvinyl chloride, polyethylene terephthalate, polycarbonate, polystyrene, polyurethane, polyethylene, polypropylene, and the like, a recording medium where particles such as silica and titanium are coated along with a binder.

It is possible to favorably use the ink jet recording method according to the present embodiment with respect to a soft wrapping film. The soft wrapping film is one aspect of the recording medium with non-absorbency to ink described above. In more detail, the soft wrapping film is a very flexible film material which is used for wrapping or the like for food wrapping, toiletries, and cosmetics, and is a film material where a material, an antioxidant, and the like which have an anti-fogging property or an antistatic property are present on the film surface and which has a thickness in a range of 5 to 70 μm (preferably 10 to 50 μm). In a case of recording the ink composition on the film, ink is difficult to fix compared to a plastic film with a normal thickness and even when the ink is fixed, it is not possible for the ink to handle the flexibility of the film and peeling easily occurs. According to the ink jet recording method according to the present embodiment, since it is possible to cover the image using the protective layer which is excellent in adhesion and scratch resistance, it is possible to record an image which is excellent in adhesion and scratch resistance even with respect to a soft wrapping film. In addition, since the soft wrapping film is often used as wrapping or the like for food wrapping or cosmetics, it is likely to be placed in an environment where alcohol or the like is attached. Even in such a case, since it is possible to obtain an image which is excellent in solvent resistance by forming a protective layer according to the ink jet recording method according to the present embodiment, the ink jet recording method according to the present embodiment is more favorable for a soft wrapping film.

An anionic, non-ionic, or cationic surfactant or a vinyl-based or acryl-based polymer is often used for a material which has an anti-fogging property or an antistatic property; representative examples of the surfactant include a fatty acid or aliphatic derivative-based surfactant (fat-soluble surfactant) of fatty acid esters such as glycerine fatty acid ester, polyglyceryl fatty acid ester, and sorbitan fatty acid ester, fatty acid amides such as oleic amide and stearic acid amide, ethylene oxide adducts thereof, and the like; representative examples of the vinyl polymers include a vinyl alcohol and a vinyl chloride polymer; and representative examples of the acryl polymers include an acryl polymer or the like which has ethylene oxide or a polar group (a hydroxyl group, a carboxyl group, and the like). Examples described in Patent Documents include a method for using glycerol monofatty acid ester and organic phosphite together (JP-A-58-79042), a method for using an anti-fogging agent thereof and a fluorine-containing compound together (JP-A-3-215562), in addition to a method for using hindered amine-based compounds together (JP-A-4-272946), a method for using an aliphatic alcohol where the number of carbon atoms is 6 to 30 or an aliphatic amine where the number of carbon atoms is 6 to 30 (JP-A-9-31242), a method for using a phosphate-based compound (JP-A-2008-115218), and the like.

Representative examples of antioxidants include phenol-based antioxidants such as dibutyl hydroxytoluene, thioether-based antioxidants such as dilauryl thiopropionate, and phosphate ester-based antioxidants. In more detail, examples include 3,5-di-t-butyl-4-hydroxy benzyl phosphonate-diethyl ester, N,N'-hexamethylene bis(3,5-di-t-butyl-4-hydroxy-hydrocinnamide), triethylene glycol-bis 3-(3-t-butyl-5-methyl-4-hydroxyphenyl)propionate], pentaerythrityl tetrakis[3-(3,5-di-t-butyl-4-hydroxyphenyl)propionate], tetrakis[methylene-3(3',5'-di-t-butyl-4'-hydroxyphenyl)propionate)methan, 1,1,3-tris(2-methyl-4-hydroxy-5-t-butylphenyl)butan, 1,3,5-trimethyl-2,4,6-tris(3,5-di-t-butyl-4-hydroxybenzyl)benzene, bis[3,3'-bis-(4'-hydroxy-3'-t-butylphenyl)butylic acid]glycol ester, 1,3,5-tris(3'5'-di-t-butyl-4'-hydroxybenzyl)-s-triazine2,4,6-(1H,3H,5H)trion, 1,6-hexanediol-bis(3-(3,5-di-t-butyl-4-hydroxyphenyl)propionate, and the like.

It is possible to use a material which includes at least one type of resin which is selected from an olefin-based resin (polyethylene, polypropylene, and the like), an ester-based resin (polyester and the like), a vinyl chloride-based resin (polyvinyl chloride and the like), and an amide-based resin (polyamide and the like) for the material which configures a recording surface of a soft wrapping film. It is possible to use a film substrate where these resins are processed in a film or sheet form as a film substrate which includes the recording surface of a soft wrapping film. In the case of a film or a sheet which uses resins, it is possible to use any of an unstretched film, a stretched film which is stretched in one axis direction or in two axis directions, or the like and it is preferable to use the film which is stretched in two axis directions. In addition, use is possible in a laminated state where a film or a sheet formed of various types of these resins are bonded as necessary.

Description will be given of favorable embodiments of the second embodiment according to the invention below. The embodiments described below describe examples of the invention. In addition, the invention is not limited to the below embodiments and also includes various types of modifications which are carried out within a range which does not depart from the gist of the invention.

1. Ink Jet Recording Method

The ink jet recording method according to one embodiment of the invention includes forming an adhesive layer by discharging a second clear ink composition which contains second resin particles where a glass transition temperature is less than 50° C. and substantially does not contain a coloring material on a recording surface of a recording medium having low absorbency or non-absorbency to ink, recording an image on the adhesive layer by discharging an ink composition which contains water and a coloring material, and forming a protective layer, which contains first resin particles where a glass transition temperature is 50° C. or higher and substantially does not contain a coloring material, on the image. Due to this, it is possible to obtain recorded matter where an image is recorded on a recording surface of a recording medium.

Detailed description will be given below of each process in the ink jet recording method according to the present embodiment.

1.1. Adhesive Layer (Lower Coating Layer) Forming Process

The ink jet recording method according to the present embodiment is provided with an adhesive layer forming process. The adhesive layer forming process forms an adhesive layer on the recording surface of the recording medium having low absorbency or non-absorbency to ink by discharging a second clear ink composition which contains second resin particles where the glass transition temperature is less than 50° C. and substantially does not contain a coloring material. That is, the adhesive layer forming process forms an adhesive layer in advance in the region in which at least the image which will be described below is recorded. Here, there are cases where the adhesive layer according to the present embodiment is referred to as a "lower coating layer" since the adhesive layer is provided between the recording surface of the recording medium and the image.

The second resin particles which are included in the adhesive layer have an excellent film-forming property and provide tackiness since the glass transition temperature (Tg) thereof is less than 50° C. Therefore, by providing the adhesive layer which contains the second resin particles between the recording medium and the recording surface, it is possible to improve the adhesion between the recording surface of the recording medium and the image.

Figure 11:
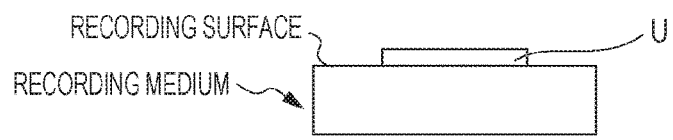
FIG. 11 is a diagram which schematically shows a side surface of a recording medium where an adhesive layer is formed by the adhesive layer forming process of the ink jet recording method according to the present embodiment.

FIG. 11 is a diagram which schematically shows a side surface of a recording medium where an adhesive layer U is formed. As shown in FIG. 11, by performing the adhesive layer forming process before the image recording process, it is possible to form the adhesive layer U in advance in the region in which the image is formed. FIG. 11 shows a state where one adhesive layer U is formed in a region of a part of a recording medium; however, without being limited thereto, the adhesive layer U may be formed on the entire surface of the recording surface of the recording medium, or two or more adhesive layers U may be formed on the recording surface of the recording medium (that is, the two or more adhesive layers U are not continuous on the recording surface).

It is preferable that the weight where the second resin particles, which are included in each unit area of the adhesive layer, be 0.01 mg/cm$^2$ or more to 0.5 mg/cm$^2$ or less in terms of solid content and 0.05 mg/cm$^2$ or more to 0.2 mg/cm$^2$ or less is more preferable. By being within these ranges, adhesion of the image which is recorded by the image recording process which will be described below further improves.

1.2. Image Recording Process

The ink jet recording method according to the present embodiment is provided with an image recording process. The image recording process records an image on the adhesive layer described above by discharging an ink composition which contains water and a coloring material.

Figure 12:
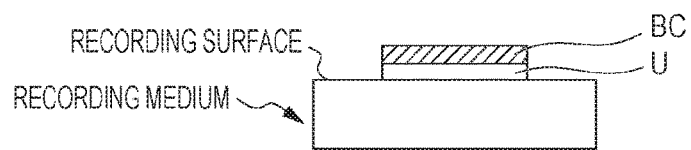
FIG. 12 is a diagram which schematically shows a side surface of a recording medium where the image is recorded on the adhesive layer by the image recording process of the ink jet recording method according to the present embodiment.
Figure 13:
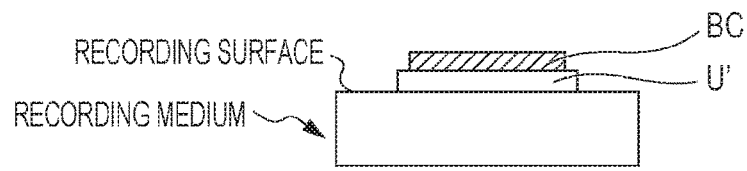
FIG. 13 is a diagram which schematically shows a side surface of a recording medium where the image is recorded on the adhesive layer by the image recording process of the ink jet recording method according to the present embodiment.

FIG. 12 is a diagram which schematically shows a side surface of the recording medium where an image BC is recorded. As shown in FIG. 12, the image BC is recorded in a region at least a part on the adhesive layer by the image recording process. In FIG. 12, forming is carried out such that the region in which the adhesive layer is formed and the region in which the image is recorded match when viewing the recording surface of the recording medium in plan view; however, the invention is not limited thereto. For example, the adhesive layer may be provided with a structure such as the adhesive layer U' shown in FIG. 13. The adhesive layer U' shown in FIG. 13 is obtained by being formed such that the area of the adhesive layer U' is larger than the image BC when viewing the recording surface in plan view and recording the image BC in a part in the region in which the adhesive layer U' is formed. In other words, the image BC in FIG. 13 is recorded within the region in which the adhesive layer U' is formed when viewing the recording surface of the recording medium in plan view and is recorded so as to be smaller than the area of the adhesive layer within the region.

From the point that the recording is sped up by shortening the drying time of the second clear ink composition which is used for forming the adhesive layer, it is preferable to form the adhesive layer U in FIG. 12 described above. On the other hand, from the point of view that the scratch resistance and adhesion of the image are further improved, it is preferable to form the adhesive layer U' in FIG. 13 described above.

It is possible to use at least one of the background ink composition which contains a background coloring material as a coloring material and the color ink composition which contains a colored coloring material as a coloring material for the ink composition which is used in the recording an image.

Here, the recording medium itself may be colored, semi-transparent, or transparent. In such a case, it is possible to use the background ink composition for recording a concealment layer which conceals the color of the recording medium itself. For example, when recording a color image using a color ink composition, there is an advantage in that it is possible to improve a coloring property of the color image when a background image is recorded in advance in the region in which the color image is to be recorded. From this point of view, it is preferable that the image recording process include a background image recording process which records a background image on the recording surface of the recording medium by discharging a background ink composition from a recording head and a color image recording process which records a color image on the background image by discharging a color ink composition from a recording head.

Figure 14:
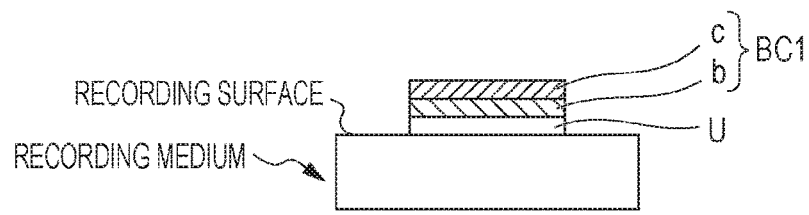
FIG. 14 is a diagram which schematically shows a side surface of a recording medium where the image is formed by the image recording process of the ink jet recording method according to the present embodiment.

FIG. 14 is a diagram which schematically shows a side surface of the recording medium where the image BC1 formed of a background image b which is recorded on the adhesive layer U and a color image c which is recorded on the background image b is recorded. As shown in FIG. 14, the image BC1 is recorded in a region of at least a part of the recording surface of the recording medium by the image recording process. FIG. 14 shows that the color image c is recorded so as to cover the entire upper surface of the background image b; however, without being limited thereto, the color image c may be recorded on a part of the upper surface of the background image b, or two or more color images c may be recorded on the upper surface of the background image b (that is, the two or more color images c are not continuous on the upper surface of the background image b).

In a case of carrying out the background image recording process and the color image recording process, it is preferable that the weight of the background coloring material which is included in each unit area of the recorded background image be 0.05 mg/cm$^2$ or more to 0.5 mg/cm$^2$ or less, and 0.1 mg/cm$^2$ or more to 0.3 mg/cm$^2$ or less is more preferable. Since it is possible to reduce the influence of the color of the recording medium or to suppress the transmission of a color image in a case of using a transparent film by setting the weight of the background coloring material to 0.05 mg/cm$^2$ or more, there are cases where it is possible to further improve the coloring property of the color image which is recorded on a background image. Here, since it is not possible to expect an improvement in the effect of concealing the color of the recording medium itself when the weight of the background coloring material exceeds 0.5 mg/cm$^2$, 0.5 mg/cm$^2$ or less is preferable from the point of view of saving ink.

1.3. Protective Layer (Upper Coating Layer) Forming Process

The ink jet recording method according to the present embodiment is provided with a protective layer forming process. The protective layer forming process forms a protective layer, which contains first resin particles where a glass transition temperature is 50° C. or higher and substantially does not contain a coloring material, on the image. Here, there are cases where the protective layer according to the present embodiment is referred to as an "upper coating layer" since the protective layer is provided on an image.

In this manner, since it is possible to reduce contact between the image and the solvent by providing the protective layer on the image, it is possible to improve resistance with respect to the solvent of the image (for example, an organic solvent such as alcohol, or the like), that is, the solvent resistance. In addition, details will be described below; however, the first resin particles out of the components which are included in the protective layer have an excellent effect which improves the boiling resistance of the protective layer or an effect which improves the scratch resistance of the protective layer since the glass transition temperature (Tg) thereof is 50° C. or higher. Furthermore, details will be described below; however, in a case where the protective layer contains the second resin particles, the second resin particles have an excellent effect which improve adhesion between the protective layer and an image, boiling resistance, and solvent resistance since the Tg of the second resin particles is less than 50° C. In this manner, by providing a protective layer which contains both resin particles where the Tg is 50° C. or higher and resin particles where the Tg is less than 50° C. on the image, it is possible to obtain an image where the balance between the scratch resistance and adhesion is favorable in addition to having favorable solvent resistance and boiling resistance.

Since the ink jet recording method according to the present embodiment is able to obtain an effect of scratch resistance according to the protective layer while obtaining an effect of adhesion for the image by an adhesive layer by interposing the image between the adhesive layer and the protective layer, it is possible to satisfy both of adhesion and scratch resistance of the image at a high level.

Figure 15:
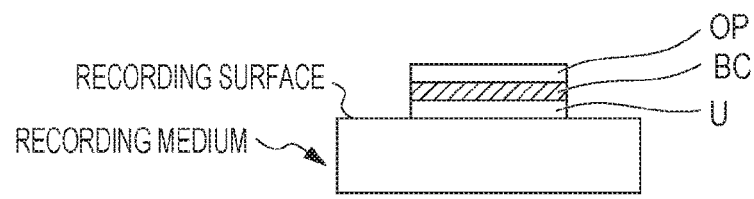
FIG. 15 is a diagram which schematically shows a side surface of a recording medium where the protective layer is formed by the protective layer forming process of the ink jet recording method according to the present embodiment.
Figure 16:
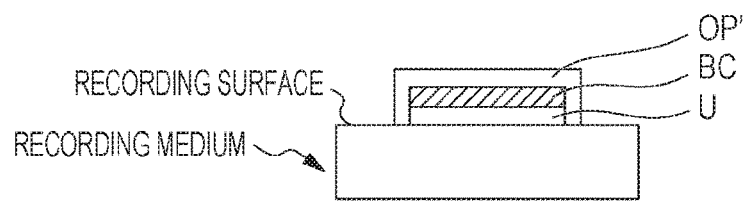
FIG. 16 is a diagram which schematically shows a side surface of a recording medium where the protective layer is formed by the protective layer forming process of the ink jet recording method according to the present embodiment.

FIG. 15 is a diagram which schematically shows a side surface of a recording medium where a protective layer OP is formed on the image BC. The protective layer OP is formed so as to cover at least the upper surface of the image BC by forming a protective layer. FIG. 15 shows where the protective layer OP is formed so as to cover the entire upper surface of the image BC; however, the invention is not limited thereto. For example, as shown in FIG. 16, it is possible to form a protective layer OP' so as to continuously cover a surface of the image BC (that is an upper surface and a side surface of the image BC) and the recording surface of the recording medium where the image BC is not recorded. In this manner, the adhesion and scratch resistance of the image BC with respect to the recording medium are further improved.

Figure 17:
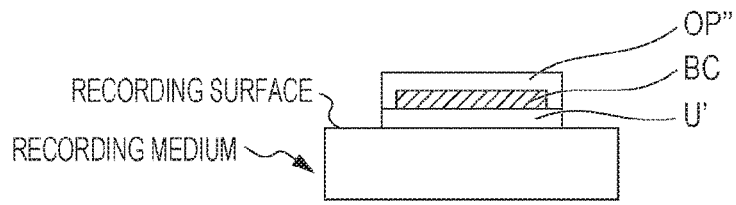
FIG. 17 is a diagram which schematically shows a side surface of a recording medium where a protective layer is formed by the protective layer forming process of the ink jet recording method according to the present embodiment.

As shown in FIG. 17, in a case where the image BC is formed within the region in which the adhesive layer U' is formed and is recorded so as to be smaller than an area of the adhesive layer U' within the range when viewing the recording surface of the recording medium in plan view, it is preferable that the protective layer OP' is formed so as to cover the surface of the image BC (that is, the upper surface and the side surface of the image BC) and the upper surface of the adhesive layer U' when viewing the recording surface of the recording medium in plan view. Due to this, since the image BC is surrounded by the adhesive layer U' and the protective layer OP', the adhesion and scratch resistance are more excellent. In addition, since the upper surface of the adhesive layer U' is covered by the protective layer OP', it is possible to suppress a decrease in the boiling resistance due to the exposed portion of the adhesive layer U'.

It is essential that the protective layer contain the first resin particles and substantially not contain a coloring material; however, from the point of further improving the boiling resistance or scratch resistance, it is preferable that the second resin particles also be contained. In this case, in the protective forming layer process, it is possible to use one type of clear ink composition which contains first resin particles and second resin particles and substantially does not contain a coloring material and it is also possible to perform the protective layer forming process using at least two types of clear ink compositions of a first clear ink composition which contains the first resin particles and substantially does not contain a coloring material and a second clear ink composition which contains the second resin particles and substantially does not contain a coloring material.

In a case of using one type of clear ink composition which contains first resin particles and second resin particles and substantially does not contain a coloring material, the first resin particles and the second resin particles are present in a mixed state in ink droplets which are discharged from a recording head. That is, the protective layer OP1 where the first resin particles and the second resin particles are uniformly dispersed is formed on the image plane.

On the other hand, in a case of using two types of clear ink compositions of a first clear ink composition and a second clear ink composition, it is possible to form protective layers in at least the following two patterns. The first is the protective layer OP2 which is formed by ink droplets formed of the first clear ink composition and ink droplets formed of the second clear ink composition being arranged on the same plane. The second is a protective layer OP3 which is formed by the first protective layer formed of the first clear ink composition and the second protective layer formed of the second clear ink composition being laminated.

While the effects provided by each of the resin particles are exhibited in a case where the first resin particles and the second resin particles are present on the same plane (the protective layer OP1 and the protective layer OP2 described above), the functions thereof have a tendency to decrease compared to a case of being used individually. The tendency is more remarkable when the first resin particles and the second resin particles are more uniformly mixed on the same plane. Here, in comparison with the protective layer OP2, since the protective layer OP1 is formed by the first resin particles and the second resin particles being uniformly mixed, the functions of each of the resin particles decrease. From these points, it is preferable to perform the protective layer forming process using two or more types of clear ink compositions of the first clear ink composition and the second clear ink composition.

In addition, since the protective layer OP3 has a laminated structure of the first protective layer and the second protective layer, the functions of the resin particles which are included in each layer do not easily decrease. Therefore, in a case of forming the protective layer OP3, the functions of each of the resin particles are favorably exhibited. In addition, by setting the protective layer as a laminated structure, the effect of suppressing permeation of the solvent is further improved in comparison with the case of forming a protective layer with the same film thickness as this as a single layer. The details behind this mechanism are not yet clear; however, it is considered to be due to it being possible to block permeation of a solvent between layers. For this reason, it is more preferable to adopt the protective layer OP3 which has a laminated structure of the first protective layer and the second protective layer for the protective layer according to the present embodiment.

As described above, the protective layer OP3 is obtained by laminating the first protective layer and the second protective layer. In detail, the first protective layer which contains the first resin particles is obtained by a first protective layer forming process which discharges the first clear ink composition from a recording head. The second protective layer which contains the second resin particles is obtained by a second protective layer forming process which discharges a second clear ink composition from a recording head.

In a case of forming the protective layer OP3, it is preferable that the first protective layer forming process form the first protective layer on the second protective layer which is obtained by the second protective layer forming process. In other words, the first protective layer forming process is performed after the second protective layer forming process. In this manner, since it is definitely possible to improve adhesion of the first protective layer and the second resin particles which are included in the second protective layer easily permeate inside the image, the adhesion between the image and the recording medium also improves. Furthermore, by the first protective layer being present on the uppermost surface, the exposure of the second protective layer, which has higher tackiness in comparison with the first protective layer, on the upper surface of the image decreases. Due to this, the scratch resistance function according to the first protective layer is more favorably exhibited and the scratch resistance of the image is excellent. In this manner, it is possible to exhibit the functions of scratch resistance and adhesion provided by the protective layer to a high standard and with excellent balance. In addition, details will be described below; however, by forming the first protective layer on the second protective layer, the function of boiling resistance provided by the first resin particles and the function of boiling resistance provided by the second resin particles act synergistically and the function of boiling resistance is more excellent.

When forming the protective layer OP3, in a case where a weight where the first resin particles, which are included in each unit area of the first protective layer, are converted into a solid content is set as A (mg/cm$^2$) and a weight where the second resin particles, which are included in each unit area of the second protective layer, are converted into a solid content is set as B (mg/cm$^2$), it is preferable that a relationship of B/A<1 (that is, B<A) be satisfied and it is more preferable that a relationship of 0.2≤B/A<1 be satisfied. By the weight ratio of both of the resin particles being B<A, the function where the scratch resistance is improved by the first resin particles is more favorably exhibited. In addition, by being within a range of 0.2≤B/A<1, there is a tendency for the balance between the scratch resistance and the adhesion to be favorable.

Figure 18:
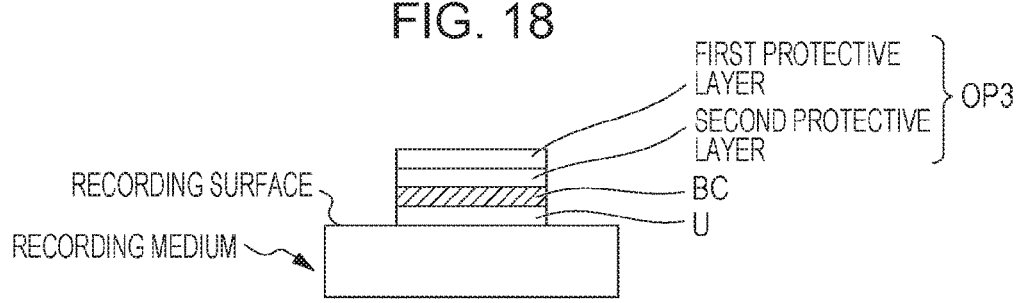
FIG. 18 is a diagram which schematically shows a side surface of a recording medium where the protective layer is formed by the protective layer forming process of the ink jet recording method according to the present embodiment.

FIG. 18 is a diagram which schematically shows a side surface of a recording medium where the protective layer OP3 is formed on the image BC. As shown in FIG. 18, by performing the second protective layer forming step and the first protective layer forming step in this order, the protective layer OP3 where the second protective layer and the first protective layer are laminated in this order on an upper surface of an image is obtained.

Figure 19:
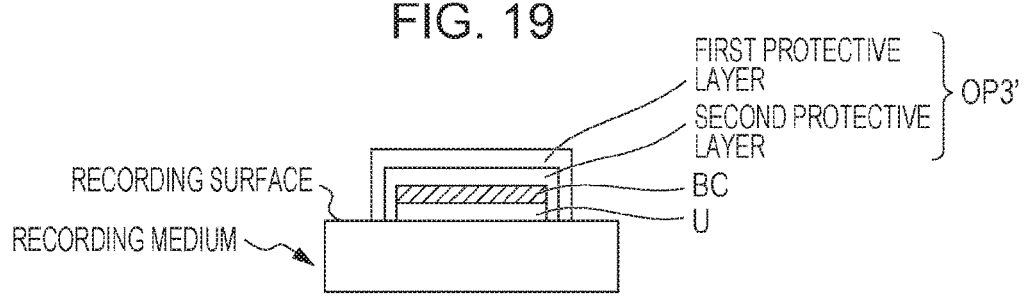
FIG. 19 is a diagram which schematically shows a side surface of a recording medium where the protective layer is formed by the protective layer forming process of the ink jet recording method according to the present embodiment.

FIG. 18 shows the first protective layer and the second protective layer formed so as to cover the entire upper surface of the image BC; however, the invention is not limited thereto. For example, the first protective layer and the second protective layer may be obtained by forming the first protective layer so as to cover at least the surface of the second protective surface (that is, the upper surface and the side surface of the second protective layer) after forming the second protective layer so as to cover at least the surface of the image BC (that is, the upper surface and the side surface of the second protective layer). Due to this, there are cases where the scratch resistance and adhesion of the image are further improved compared to only covering the upper surface of the image BC. Specific examples of such an aspect include the protective layer OP3' shown in FIG. 19. The protective layer OP3' is obtained by forming the first protective layer so as to continuously cover the surface of the second protective layer (that is, the upper surface and the side surface of the second protective layer) and the recording surface of the recording medium where the adhesive layer U, the image BC, and the second protective layer are not formed after forming the second protective layer so as to continuously cover the surface of the image BC (that is, the upper surface and the side surface of the image BC), the side surface of the adhesive layer U, and the recording surface of the recording medium where the adhesive layer U and the image BC are not recorded.

Figure 20:
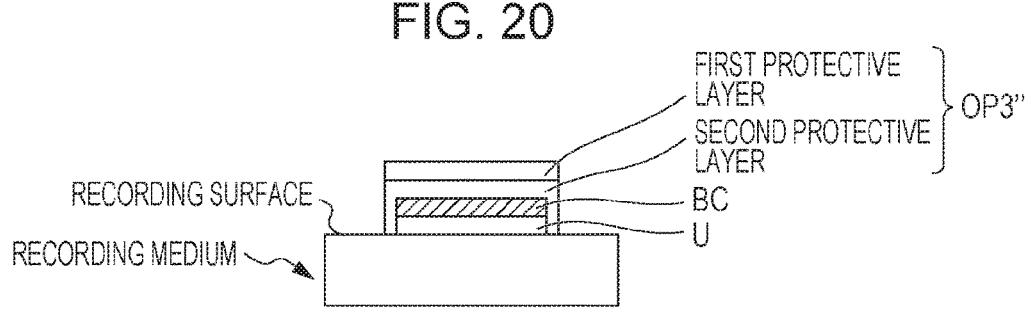
FIG. 20 is a diagram which schematically shows a side surface of a recording medium where the protective layer is formed by the protective layer forming process of the ink jet recording method according to the present embodiment.
Figure 21:
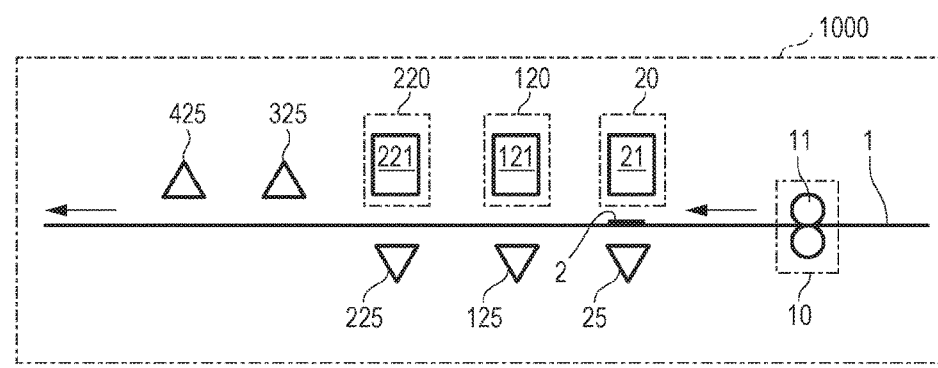
FIG. 21 is a diagram which schematically shows an ink jet recording apparatus which is used in the ink jet recording method according to the present embodiment.

From the point of view that it is possible to improve the forming speed of the first protective layer while having excellent functions such as scratch resistance, adhesion, and solvent resistance, the protective layer may be provided with a structure such as the protective layer OP3" shown in FIG. 20. The protective layer OP3" shown in FIG. 20 is obtained by forming the first protective layer only on the upper surface of the second protective layer after forming the second protective layer so as to continuously cover the surface of the image BC (that is, the upper surface and the side surface of the image BC), the side surface of the adhesive layer U, and the recording surface of the recording medium where the adhesive layer U and the image BC are not recorded. According to the protective layer OP3", since the second protective layer with excellent adhesion is provided up to the side surface of the image, adhesion of the image improves. In addition, by the first protective layer being provided on the upper surface of the second protective layer, the scratch resistance of the image is sufficiently improved even when the first protective layer is not provided on the side surface of the second protective layer. Furthermore, by not providing the first protective layer up to the side surface of the second protective layer, it is possible to shorten the discharging time or drying time of the first clear ink composition.

In a case where the weight of a coloring material which is included in each unit area of an image is set as P (mg/cm$^2$) and a weight where the first resin particles, which are included in each unit area of the protective layer, are converted into a solid content is set as A (mg/cm$^2$), it is preferable that a relationship of $0.2 \leq A/P$ be satisfied and it is more preferable that a relationship of $0.2 \leq A/P \leq 1$ be satisfied. Since it is possible to sufficiently cover the coloring material with the first resin particles by satisfying the relationship of $0.2 \leq A/P$, it is possible to improve the scratch resistance of the image. In addition, by satisfying the relationship of $A/P \leq 1$, there are cases where it is possible to suppress decreases in the coloring property of the image due to an excess of the first resin particles.

In a case where the weight of a coloring material which is included in each unit area of an image is set as P (mg/cm$^2$) and a weight where the second resin particles, which are included in each unit area of the protective layer, are converted into a solid content is set as B (mg/cm$^2$), it is preferable that a relationship of $0.1 \leq B/P$ be satisfied and it is more preferable that a relationship of $0.1 \leq B/P \leq 0.7$ be satisfied. Since it is possible to sufficiently cover the coloring material with the second resin particles by satisfying the relationship of $0.1 \leq B/P$, it is possible to improve the scratch resistance of the image. In addition, by satisfying the relationship of $B/P \leq 0.7$, there are cases where it is possible to suppress decreases in the coloring property of the image due to an excess of the second resin particles.

1.4. First Heating Process

The ink jet recording method according to the present embodiment may be provided with a first heating process. The first heating process is performed after the protective layer forming process described above and heats the recording surface at the temperature of the glass transition temperature of the first resin particles or higher.

By performing the first heating process, the film-forming of the adhesive layer, the image and the protective layer is promoted. Furthermore, due to the first resin particles and the second resin particles which are included in the protective layer dissolving, the dissolved resin particles easily permeate into the image or the mixing of the dissolved resin particles with the resin, which is included in the image in some cases, is promoted. As a result, it is possible to improve adhesion between the adhesive layer and the recording surface, adhesion between the adhesive layer and the image, adhesion between the image and the protective layer, and the like.

It is necessary to perform heating of the recording surface in the first heating process at the glass transition temperature of the first resin particles or higher; however, the heating is preferably performed at 80° C. or higher and more preferably performed at 80° C. or higher to 150° C. or lower. Since the dissolving of the resin particles is promoted by heating the recording surface at the glass transition temperature of the first resin particles or higher, it is possible to improve adhesion of each layer (the adhesive layer, the image, and the protective layer, with the same applying below). In addition, by heating the recording surface at 150° C. or lower, it is possible to suppress generation of cracks due to the drying of each layer proceeding excessively.

In the invention, the heating temperature of the recording surface refers to the surface temperature of the recording surface and is able to be measured, for example, with a non-contact thermometer. Examples of non-contact thermometers include an infrared thermography apparatus H2640/H2630 (product name, manufactured by NEC Avio Infrared Technologies Co., Ltd.) and PT-2LD (product name, manufactured by Optex Co., Ltd.).

One second or more to ten seconds or less is preferable as the heating time and one second or more to five seconds or less is more preferable. By the heating time being within the range described above, it is possible to sufficiently promote the film-forming and mixing of the resin (the resin particles).

It is preferable that heating in the first heating process be carried out without ventilation. When ventilation is performed before the film-forming of the resin (the resin particles) proceeds, the evaporation of a solvent which is included in the protective layer or the image proceeds excessively and an effect of improving the fluidity of the resin with a liquid medium is not easily obtained. As a result, since permeation or mixing of the resin which is included in the protective layer and the image does not easily occur, there is a tendency for the adhesion of each of the layers to decrease. From this point of view, it is preferable to perform the first heating process using a heating unit without ventilation such as a print heater mechanism which heats by bringing a heating source into contact with the recording medium, or a mechanism which irradiates infrared rays, microwaves (electromagnetic waves which have a very large wavelength of approximately 2,450 MHz), or the like.

1.5. First Drying Process

The ink jet recording method according to the present embodiment may be provided with a first drying process. The first drying process is performed after the first heating process described above and performs ventilation while heating the recording surface at the heating temperature of the recording surface in the first heating process or less. Due to this, it is possible to dry each layer by evaporating the liquid medium (water, an organic solvent, and the like) which is included in each layer.

"Ventilation" in the present embodiment also includes blowing air to each layer which is provided on the recording surface and also includes allowing air to pass over the surface of the recording surface without directly blowing air to each layer (that is, generating an air current in the vicinity of the surface of the recording surface).

Since ventilation is performed in the first drying process, it is possible to effectively evaporate (volatilize) the liquid medium which is included in each layer. Here, in a case of performing the drying of each layer only with the first heating process described above without ventilation without performing the first drying process, the liquid medium which is evaporated in the vicinity of the surface of each layer is stored and dryness is remarkably decreased. Therefore, it is preferable to perform the first drying process with ventilation after the first heating process. When the first drying process is performed after the first heating process, since the liquid medium is removed after each layer forms a favorable film, the dryness of each layer is excellent while the adhesion of each layer is excellent.

The first drying process is preferably performed when the heating temperature of the recording surface in the first drying process is the heating temperature of the recording surface in the first heating process or less and the first drying process is more preferably performed at less than the heating temperature of the recording surface during the first heating process. By setting the temperature to the heating temperature during the first heating process or less, it is possible to suppress the resin from flowing after the film-forming.

It is necessary for the heating temperature of the recording surface in the first drying process to be the heating temperature of the recording surface in the first heating process or less (preferably less than the heating temperature of the recording surface during the first heating process); however, it is possible to set the temperature to 60° C. or higher and it is also possible to set the temperature to 60° C. or higher to 150° C. or lower. The dryness of each of the layers becomes more favorable by setting the temperature to 60° C. or higher and it is possible to suppress the generation of cracks in each layer by setting the temperature to 150° C. or lower.

The first drying process may be performed by ventilation with heating (that is, warm air) or may be performed by combining the same heating unit for the recording surface as the first heating process with the ventilation unit. Examples of the ventilation unit include drying apparatuses which are known in the art such as dryers. In this manner, in the first drying process, the unit is not particularly limited as long as it is possible to perform ventilation while keeping the temperature of the recording surface within the range described above.

It is preferable that the drying time in the first drying process (that is, the time for carrying out ventilation and heating) be two times or more the heating time in the first heating process, three times or more is more preferable, and three times or more to thirty times or less is even more preferable. In this manner, since evaporation of the liquid medium is sufficiently performed by setting the drying time of the first drying process to two times the heating time of the first heating process or more, it is possible to obtain an image with excellent scratch resistance. In addition, by setting the drying time to 30 times or less, it is possible to shorten the drying time while sufficiently evaporating the liquid medium.

It is preferable to perform ventilation in the first drying process with an air speed of 6 m/sec or more and it is more preferable to perform the ventilation with an air speed of 6 m/sec or more to 50 m/sec or less. It is possible to improve the evaporation speed of the liquid medium by performing drying at an air speed of 6 m/sec or more and it is possible to prevent disturbances in the protective layer or the image due to the air while maintaining the dryness by performing the ventilation at 50 m/sec or less.

1.6. Second Drying Process

The ink jet recording method according to the present embodiment may be provided with a second drying process. The second drying process is performed when carrying out the adhesive layer forming process, the image recording process, and the protective layer forming process and performs ventilation while heating the recording surface at less than the heating temperature of the recording surface in the first drying process. In more detail, the second drying process is performed before the first heating process and the first drying process described above and is able to be performed at at least one timing out of before discharging, during discharging, or after discharging each ink. In this manner, by performing the second drying process, it is possible to dry the adhesive layer, the image, and the protective layer to a certain extent.

In the second drying process, since drying is performed when forming (recording) each layer, it is possible to suppress the ink droplets which form the layers from flowing. Due to this, since it is possible to keep the ink droplets at the place of attachment, it is possible to suppress the generation of printing unevenness or the like. In addition, in the second drying process, since it is possible to form the next layer after drying the previously formed layer to a certain extent, it is possible to suppress bleeding of the image caused by the components which are included in each layer being excessively mixed.

It is preferable that the heating temperature of the recording surface in the second drying process be less than the heating temperature of the recording surface in the first drying process. That is, the heating temperature of the recording surface in the second drying process is also less than the heating temperature of the recording surface in the first heating process. Due to this, since it is possible to suppress evaporation of the liquid medium or film-forming from proceeding excessively, it is possible to secure the fluidity of the resin particles during the first heating process.

From the point of view of suppressing the drying from proceeding excessively, it is preferable that the heating temperature of the recording surface in the second drying process be less than the heating temperature of the recording surface during the first drying process. In more detail, it is possible to set the heating temperature in the second drying process to 35° C. or higher to 80° C. or lower, more preferably 35° C. or higher to 60° C. or lower.

The second drying process may be performed by ventilation with heating (that is, warm air) or may be performed by combining the ventilation unit with the same heating unit for the recording surface as the first heating process. Examples of the ventilation unit include drying apparatuses which are known in the art such as dryers. In this manner, in the second drying process, the unit is not particularly limited as long as it is possible to perform ventilation while keeping the temperature of the recording surface within the range described above.

It is sufficient if the drying time in the second drying process (that is, the time for carrying out ventilation and heating) is set such that the drying rate of each layer is in a range which will be described below without being particularly limited. Here, it is possible to calculate the drying rate in the present embodiment based on the weight of a layer formed of the ink droplets which are attached on the recording surface at a specific time in a case where the weight of the ink droplets which are discharged in order to form a certain layer is set to 100% and the weight when the drying of the layer formed of the ink droplets which are attached on the recording surface is finished is set to 0%.

It is preferable that the second drying process be performed such that all of the drying rates of each layer are within a range of 30 mass % to 80 mass %, more preferably so as to be 35 mass % to 75 mass %, and even more preferably 40 mass % to 70 mass %. By setting the drying rate of each layer to 30 mass % or more, it is possible to suppress the ink droplets from flowing and the components which are included in the previously formed layer and the subsequently formed layer from being excessively mixed.

It is preferable to perform the ventilation in the second drying process at less than the air speed in the first drying process and for example, it is possible to set an air speed of 2 m/sec or more to 5 m/sec or less. Since it is possible to suppress the evaporation of the liquid medium from proceeding excessively in the second drying process by setting an air speed of less than the air speed in the first drying, it is possible for the adhesion between the layers to be favorable.

2. Ink

2.1. Clear Ink Composition

It is preferable that the adhesive layer forming process and the protective layer forming process in the ink jet recording method according to the present embodiment be performed using a clear ink composition which substantially does not contain a coloring material. Since the clear ink composition substantially does not contain a coloring material, the clear ink composition is a liquid which is colorless and transparent or colorless and semi-transparent. Examples of such a clear ink composition include the first clear ink composition which contains the first resin particles and substantially does not contain a coloring material and the second clear ink composition which contains the second resin particles and substantially does not contain a coloring material.

As described above, the second clear ink composition is used for the adhesive layer forming process. In addition, it is preferable to use two types of inks which are the first clear ink composition and the second clear ink composition for the adhesive layer forming process.

Detailed description will be given below of components which are included and which may be included in each clear ink composition.

2.1.1. First Clear Ink Composition

The first clear ink composition contains first resin particles and substantially does not contain a coloring material. In a case where the first clear ink composition is used for forming the protective layer, the first clear ink composition may be referred to as an ink composition for forming a protective layer.

First Resin Particles

The first resin particles are resin particles where a glass transition temperature (Tg) is 50° C. or higher. Since the first resin particles have a glass transition temperature of 50° C. or higher which is sufficiently higher than room temperature (25° C.), a function of improving the scratch resistance is provided. In addition, the first resin particles are also provided with a function of imparting a favorable boiling resistance.

It is necessary for the Tg of the first resin particles to be 50° C. or higher; however, 70° C. or higher is preferable, 100° C. or higher is more preferable, and it is even more preferable that the upper limit be 150° C. or lower. Since it is possible to form a protective layer with excellent scratch resistance by the Tg of the first resin particles being 50° C. or higher, it is possible to improve the scratch resistance of the image where the protective layer is formed. In addition, since stickiness of the protective layer which is caused by the second resin particles is further reduced when the Tg of the first resin particles is set to 100° C. or higher, it is possible to form the protective layer with excellent boiling resistance, which is favorable in a case of using a soft wrapping film which is used for wrapping of food or the like which will be described below as the recording medium. In addition, since it is possible to suppress cracks or the like from being generated when drying the protective layer or to promote film-forming of the resin by the Tg of the first resin particles being 150° C. or lower, it is possible to obtain an image with favorable scratch resistance.

In particular, when forming the first protective layer which contains the first resin particles where Tg is 100° C. or higher on the uppermost surface in a case of laminating the first protective layer and the second protective layer, the boiling resistance function due to the second protective layer and the boiling resistance function due to the first protective layer act synergistically and the boiling resistance effect is even more remarkable. Here, the boiling resistance refers to the heating resistance of the image when the recording medium where the image is formed is placed in warm water. Here, the protective layer which includes the first resin particles has excellent boiling resistance due to the point that it is possible to suppress attachment to other images in the warm water. In addition, the protective layer which includes the second resin particles has excellent boiling resistance due to the point that it is possible to suppress peeling of the image in warm water by having properties such as being easily film-formed and excellent in adhesion.

It is possible to use an acrylic-based resin, a fluorene-based resin, a urethane-based resin, an olefin-based resin, a rosin-modified resin, a terpene-based resin, an ester-based resin, an amide-based resin, an epoxy-based resin, a vinyl chloride-based resin, a vinyl chloride-vinyl acetate copolymer, an ethylene vinyl acetate-based resin, or the like as the resin which configures the first resin particles. It is possible to use these resins as one type individually or in a combination of two or more types. From the point of view that it is possible to further improve the scratch resistance of the protective layer, it is preferable to include at least one of an acrylic-based resin and an ester-based resin from among these resins as the resin which configures the first resin particles.

The acrylic-based resin refers to a polymer which is obtained by using at least one type of (meth)acrylic acid, (meth)acrylic ester, acrylonitrile, cyanoacrylate, and acrylamide as a monomer (also referred to below as an "acrylic-based monomer").

The acrylic-based resin may be a homopolymer of an acrylic-based monomer or may be a copolymer of monomers other than an acrylic-based monomer (for example, olefin, styrene, vinyl acetate, vinyl chloride, vinyl alcohol, vinyl ether, vinylpyrrolidone, vinylpyridine, vinylcarbazole, vinylimidazole, vinylidene chloride, and the like). Here, the copolymer described above may take any form out of a random copolymer, a block copolymer, an alternating copolymer, or a graft copolymer. In the present specification, "(meth)acryl" means at least one of acryl, or methacryl which corresponds thereto.

In the above description, from the point of view that it is possible to further improve the scratch resistance of the protective layer, it is preferable that the acrylic-based resin be at least any one of a (meth)acrylic-based resin and a styrene-(meth)acrylic acid copolymer-based resin, more preferably at least any one of an acrylic-based resin and a styrene-acrylic acid copolymer-based resin, and even more preferably a styrene-acrylic acid copolymer-based resin. In addition, it is more preferable that the acrylic-based resin be an emulsion type.

Commercial products may be used for the resin emulsion which includes an acrylic-based resin and examples thereof include Mowinyl 972 (Tg: 101° C.) and 7180 (Tg: 53° C.) (the above are all product names, manufactured by Nippon Synthetic Chem Industry Co., Ltd.), Joncryl 530 (Tg: 75° C.), 538 (Tg: 64° C.), 1908 (Tg: 98° C.), 1925 (Tg: 75° C.), and 1992 (Tg: 78° C.) (the above are all product names, manufactured by BASF Japan Ltd.), and the like. Here, the numeric values in the brackets are the glass transition temperatures (Tg).

The ester-based resin is a polymer which is obtained by polycondensating a polyol and polycarboxylic acid. It is possible to synthesize the ester-based resin using a method which is known in the art. It is more preferable that the ester-based resin be an emulsion type. Commercial products may be used for the resin emulsion which includes an ester-based resin and examples thereof include Elitel KA-5034 (Tg: 67° C.), KA-5071S (Tg: 67° C.), KZA-1734 (Tg: 66° C.), KZA-6034 (Tg: 72° C.), and KZA-3556 (Tg: 80° C.) (the above are all product names, manufactured by Unitika Ltd.), and the like. Here, the numeric values in the brackets are the glass transition temperatures (Tg).

It is preferable that the content of the first resin particles be set to 1 mass % to 20 mass % with respect to the total mass of the first clear ink composition and more preferably 3 mass % to 10 mass %. By the content of the first resin particles being 1 mass % or more, the scratch resistance of the protective layer becomes even more favorable. In addition, by the content of the first resin particles being 20 mass % or less, there is a tendency for the discharge property of the first clear ink composition from the recording head to be favorable.

Water

The first clear ink composition contains water. Water is a medium which is the main part of the first clear ink composition and a component which is evaporated and scattered by drying. It is preferable that the water be water where ionic impurities are removed as much as possible such as pure water or ultra-pure water such as ion-exchanged water, ultrafiltration water, reverse osmosis water, or distilled water. In addition, since it is possible to suppress the generation of mold or bacteria in a case where the ink is stored for long periods, it is favorable to use water which is sterilized by ultraviolet irradiation, hydrogen peroxide addition, or the like.

The first clear ink composition is a so-called water-based ink which includes water as a main solvent (which contains 50 mass % or more water). There is an advantage in that the water-based ink is good for the environment since bad odors are suppressed and 50 mass % or more of the composition thereof is water.

Wax

The first clear ink composition may contain wax. Since the wax is provided with a function which adds smoothness and glossiness to the protective layer, it is possible to reduce peeling, scratching, or the like of the protective layer.

It is possible to use plant and animal-based waxes such as carnauba wax, candeli wax, beeswax, rice wax, and lanolin; petroleum-based waxes such as paraffin wax, microcrystalline wax, polyethylene wax, polyethylene oxide wax, and petrolatum; mineral-based waxes such as montan wax and ozocerite; synthesized waxes such as carbon wax, Hoechst wax, polyolefin wax, and stearic acid amide; natural or synthesized wax emulsions such as α-olefin maleic anhydride copolymers, mixed wax, or the like individually or by mixing a plurality of types as the components which configure the wax. From the point of view of having a more excellent effect of improving the fixing property with respect to a soft wrapping film which will be described below, it is preferable to use a polyolefin wax (in particular, polyethylene wax or polypropylene wax) and paraffin wax from among the above.

It is possible to use commercial products as is as the wax and examples thereof include Nopcoat PEM-17 (product name, manufactured by San Nopco Ltd.), Chemipearl W4005 (product name, manufactured by Mitsui Chemicals, Inc.), AQUACER 515, 539, and 593 (the above are all product names, manufactured by BYK Japan KK), and the like.

From the point of view of suppressing decreases in performance due to the wax being excessively dissolved in the heating process or the drying process described above, it is preferable to use wax with a melting point of 50° C. or higher to 200° C. or lower, more preferably with a melting point of 70° C. or higher to 180° C. or lower, and even more preferably with a melting point of 100° C. or higher to 180° C. or lower.

It is preferable that the content of the wax be 0.1 mass % to 10 mass % in terms of solid content with respect to the total mass of the first clear ink composition. When the content of the wax is within the range described above, it is possible to favorably exhibit the function of the wax described above.

Organic Solvent

The first clear ink composition may include an organic solvent. The organic solvent is not particularly limited; however, examples thereof include alkyl polyols, pyrrolidone derivatives, glycol ethers, and the like. These organic solvents may be used as one type individually or may be used in a combination of two or more types.

Examples of alkyl polyols include propylene glycol, dipropylene glycol, 1,2-butanediol, 1,2-pentanediol, 1,2-hexanediol, 1,2-heptanediol, 1,3-butylene glycol, 3-methyl-1,3-butanediol, 2-ethyl-2-methyl-1,3-propanediol, 2-methyl-1,3-propanediol, 2-methyl-2-propyl-1,3-propanediol, 2,2-dimethyl-1,3-propanediol, 2-methylpentane-2,4-diol, 3-methyl-1,5-pentanediol, and the like. The alkyl polyols have a function which improves the wettability of ink with respect to the recording medium or suppresses the solidifying and drying of ink.

In a case where the alkyl polyols are contained, it is possible to set the content thereof to 1 mass % to 40 mass % with respect to the total mass of the first clear ink composition.

Examples of pyrrolidone derivatives include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. It is possible for the pyrrolidone derivatives to act as a favorable dissolving agent for the resin component. In a case where the pyrrolidone derivatives are contained, it is possible to set the content thereof to 0.5 mass % to 30 mass % with respect to the total mass of the first clear ink composition.

Examples of glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, and the like. It is possible to use these as one type individually or in a mixture of two or more types. It is possible for the glycol ethers to control the wettability or the permeation speed of ink with respect to the recording medium.

In a case where the glycol ethers are contained, it is possible to set the content thereof to 0.05 mass % to 6 mass % with respect to the total mass of the first clear ink composition.

It is preferable that the first clear ink composition substantially not contain a water-soluble organic solvent with a standard boiling point of 280° C. or higher. This is because there are cases where dryness of the ink is greatly decreased and the fixing property of the image is decreased by including a water-soluble organic solvent where the standard boiling point is 280° C. or higher. As a result, there are cases where the fixing property of the image decreases when performing recording with respect to a soft wrapping film which will be described below. Examples of a water-soluble organic solvent with a standard boiling point of 280° C. or higher include glycerine (the standard boiling point is 290° C.). In the invention, "water-soluble" refers to being provided with a property where the solubility with respect to 100 g of water at 20° C. is 0.1 g or more.

Surfactant

The first clear ink composition may contain a surfactant. The surfactant is provided with a function of reducing surface tension and improving the wettability with a recording medium. It is possible to preferably use, for example, an acetylene glycol-based surfactant, a silicone-based surfactant, or a fluorine-based surfactant from among surfactants.

The acetylene glycol-based surfactant is not particularly limited; however, examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (the above are all product names, manufactured by Air Products and Chemicals. Inc.), OlefinB, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (the above are all product names, manufactured by Nissin Chemical Industry Co., Ltd.), AcetylenolE00, E00P, E40, and E100 (the above are all product names, manufactured by Kawaken Fine Chemicals Co., Ltd.).

The silicone-based surfactant is not particularly limited; however, examples thereof include a polysiloxane-based compound. The polysiloxane-based compound is not particularly limited; however, examples thereof include polyether-modified organosiloxane. Examples of commercial products of the polyether-modified organosiloxane include BYK-306, BYK-307, BYK-333, BYK-341, BYK-345, BYK-346, and BYK-348 (the above are all product names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are all product names, manufactured by Shin-Etsu Chemical Co., Ltd.).

It is preferable to use a fluorine-modified polymer as the fluorine-based surfactant and specific examples thereof include BYK-340 (manufactured by BYK Japan KK).

In a case where the surfactant is contained, it is preferable that the content be 0.1 mass % to 1.5 mass % with respect to the total mass of the first clear ink composition.

Other Components

The first clear ink composition may contain pH adjusting agents, preservatives, fungicides, anti-rust agents, and the like as necessary.

Examples of pH adjusting agents include potassium dihydrogen phosphate, hydrogen disodium phosphate, sodium hydroxide, lithium hydroxide, potassium hydroxide, ammonia, diethanolamine, triethanolamine, triisopropanolamine, potassium carbonate, sodium carbonate, sodium bicarbonate, and the like.

Examples of preservatives and fungicides include sodium benzoate, pentachlorophenol sodium, 2-pyridinethiol-1-oxide sodium, sodium sorbate, sodium dehydroacetate, 1,2-dibenzisothiazolin-3-on, and the like. Examples of commercial products thereof include ProxelXL2 and ProxelGXL (the above are product names, manufactured by Nitto Denko Avecia Inc.), DenicideCSA, NS-500W (the above are product names, manufactured by Nagase ChemteX Corp.), and the like.

Examples of anti-rust agents include benzotriazole and the like.

2.1.2. Second Clear Ink Composition

The second clear ink composition contains second resin particles and substantially does not contain a coloring material. The second clear ink composition is able to be used to form the protective layer and is also able to be used to form the adhesive layer. In a case of using the second clear ink composition to form the protective layer, it is possible to say that the second clear ink composition is a clear ink composition for forming a protective layer. In addition, in a case of using the second clear ink composition to form the adhesive layer, it is possible to say that the second clear ink composition is a clear ink composition for forming an adhesive layer.

Second Resin Particles

The second resin particles are resin particles where the glass transition temperature (Tg) is less than 50° C. Since the second resin particles have a sufficiently low glass transition temperature which is less than 50° C., the second resin particles are easily film-formed and provide a function of improving the adhesion, boiling resistance, and solvent resistance.

It is necessary for the Tg of the second resin particles to be less than 50° C.; however, 40° C. or lower is preferable and 30° C. or lower is even more preferable. In addition, it is preferable that the lower limit be −40° C. or higher, −30° C. or higher is more preferable, and −20° C. or higher is even more preferable. Since it is possible to form a protective layer which has excellent adhesion due to the Tg of the second resin particles being less than 50° C., it is possible to improve adhesion of an image where the protective layer is formed. In addition, in a case of using the second clear ink composition to form the adhesive layer, due to the Tg of the second resin particles being less than 50° C., it is possible to improve the adhesion between the recording surface of the recording medium and the image, boiling resistance, and solvent resistance. In addition, since it is possible to maintain the tackiness of the protective layer within a favorable range due to the Tg of the second resin particles being −40°

C. or higher, the effect of improving the scratch resistance according to the first resin particles described above is favorably exhibited.

In addition, in order to sufficiently film-form a layer which is formed by the second clear ink composition, it is preferable that the Tg of the second resin particles be 40° C. or more lower than the heating temperature in the first heating and 50° or more lower is preferable. Due to this, it is possible to improve the adhesion of recorded matter, boiling resistance, and solvent resistance.

Furthermore, it is preferable that the difference between the Tg of the first resin particles and the Tg of the second resin particles be 20° C. or higher, more preferably 30° C. or higher, and even more preferably 40° C. or higher. Due to this, it is possible to obtain recorded matter which is provided with scratch resistance, adhesion, boiling resistance, and solvent resistance in a well-balanced manner.

It is possible to use an acrylic-based resin, a fluorene-based resin, a urethane-based resin, an olefin-based resin, a rosin-modified resin, a terpene-based resin, an ester-based resin, an amide-based resin, an epoxy-based resin, a vinyl chloride-based resin, a vinyl chloride-vinyl acetate copolymer, an ethylene vinyl acetate-based resin, and the like as the resin which configures the second resin particles. It is possible to use these resins as one type individually or in a combination of two or more types. From the point that it is possible to further improve adhesion of the protective layer or the performance of the adhesive layer, it is preferable that the resin which configures the second resin particles include a urethane-based resin. In particular, it is possible for the urethane-based resin to be favorably used in a case where an anti-fogging agent or an antistatic agent which will be described below is present on a recording surface. That is, the anti-fogging agent, the antistatic agent, and the like have a fat-soluble surfactant (which will be described below) as a main component and are often formed of low molecules with high polarity. In this case, it may be considered that this is because, when using a urethane-based resin which has many polar groups, the resin which configures the second resin particles are able to directly contact the recording medium itself having low absorbency or non-absorbency to ink which is the recording surface by making the resin compatible with the anti-fogging agent, the antistatic agent, or the like and, as a result, it is possible to firmly fix the image on the recording surface.

The urethane-based resin is a polymer which is synthesized by reacting polyisocyanate and polyol. It is possible to carry out the synthesis of the urethane-based resin using a method which is known in the art.

Examples of the polyisocyanate include aliphatic isocyanates in a chained form such as tetramethylene diisocyanate, 1,6-hexamethylene diisocyanate, dodecamethylene diisocyanate, trimethyl hexamethylene diisocyanate, and lysine diisocyanate; aliphatic isocyanates which have a cyclic structure such as 1,3-cyclohexylene diisocyanate, 1,4-cyclohexylene diisocyanate, hydrogenated xylylene diisocyanate, isophorone diisocyanate, 4,4'-dicyclohexylmethane diisocyanate, and –3,3'-dimethyl-4,4'-dicyclohexylmethane diisocyanate; and aromatic isocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydro naphthalene diisocyanate, xylylene diisocyanate, and tetramethyl xylylene diisocyanate. When synthesizing the urethane-based resin, the polyisocyanates described above may be used individually or may be used in a combination of two or more types.

Examples of the polyols include polyether polyols, polycarbonate polyols, and the like. Examples of polyether polyols include polyethylene glycol, polypropylene glycol, polytetramethylene glycol, and the like. Examples of polycarbonate polyols include reactions products or the like of diols such as 1,3-propanediol, 1,4-butanediol, 1,6-hexanediol, diethylene glycol, polyethylene glycol, polypropylene glycol, or polytetramethylene glycol, with dialkyl carbonates such as phosgene and dimethyl carbonate or cyclic carbonates such as ethylene carbonate.

It is preferable to use an emulsion type resin for the urethane-based resin. It is possible to use commercial products for the resin emulsion which includes the urethane-based resin and examples thereof include Superflex 740 (Tg: −34° C.) (product name, manufactured by Dai-ichi Kogyo Seiyaku Co., Ltd.), Bondic1940NE (Tg: less than 5° C.) (product name, manufactured by DIC Corp.), TakerackW-6061 (Tg: 25° C.) (product name, manufactured by Mitsui Chemicals, Inc.), and the like.

It is preferable to set the content of the second resin particles to 1 mass % to 20 mass % with respect to the total mass of the second clear ink composition, more preferably to 3 mass % to 15 mass %, and even more preferably to 3 mass % to 10 mass %. The adhesion of the protective layer and the adhesive layer, the boiling resistance, and the solvent resistance are made more favorable by the content of the second resin particles being 3 mass % or more. In addition, since the discharge property of the second clear ink composition from the recording head is favorable or since it is possible to maintain the tackiness of the protective layer within a favorable range by the content of the second resin particles being 20 mass % or less, the effect of improving the scratch resistance due to the first resin particles described above is favorably exhibited.

Water

The second clear ink composition contains water. Water is a medium which is the main part of the second clear ink composition and a component which is evaporated and scattered by drying. Since description of the water is the same as for the first clear ink composition, description thereof will be omitted.

The second clear ink composition is a so-called water-based ink which includes water as a main solvent (which contains 50 mass % or more water). There is an advantage in that the water-based ink is good for the environment since bad odors are suppressed and 50 mass % or more of the composition thereof is water.

Wax

The second clear ink composition may contain wax. Since the effects, the specific examples, the content ranges, and the like of the wax are the same as shown in the first clear ink composition, description thereof will be omitted.

Organic Solvent

The second clear ink composition may contain an organic solvent. Since the specific examples, the effects, the content ranges, and the like of the organic solvent are the same as the content shown in the first clear ink composition, description thereof will be omitted.

It is preferable that the second clear ink composition substantially not contain a water-soluble organic solvent where the standard boiling point is 280° C. or higher in the same manner as the first clear ink composition. That is, it is preferable to form the protective layer using a clear ink composition which does not contain a water-soluble organic solvent where the standard boiling point is 280° C. or higher. This is because there are cases where dryness of the ink is greatly decreased and the fixing property of the image is decreased by including a water-soluble organic solvent where the standard boiling point is 280° C. or higher.

Surfactant

The second clear ink composition may contain a surfactant. Since the specific examples, the effects, the content ranges, and the like of the surfactant are the same as the content shown in the first clear ink composition, description thereof will be omitted.

Other Components

The second clear ink composition may contain pH adjusting agents, preservatives, fungicides, anti-rust agents, and the like as necessary. Since the specific examples and the like of these components are the same as shown in the first clear ink composition, description thereof will be omitted.

2.1.3. Other Clear Ink Composition

It is possible to perform the protective layer forming process using one type of clear ink composition which contains both resin particles of the first resin particles and the second resin particles (also referred to below as "other clear ink composition"). However, as described above, in the protective layer forming process, it is preferable to use two or more types of clear ink compositions of the first clear ink composition and the second clear ink composition from the point that the functions provided by the first resin particles and the second resin particles are favorably exhibited.

The other clear ink composition contains the first resin particles and the second resin particles and substantially does not contain a coloring material. Since the first resin particles and the second resin particles which are included in the other clear ink composition are the same as shown in the first clear ink composition and the second clear ink composition described above, description thereof will be omitted.

In addition, since the components which may be included in another clear ink composition are the same as shown in the first clear ink composition and the second clear ink composition described above, description thereof will be omitted.

2.2. Ink Composition Used in Image Recording Process

An ink composition which contains water and a coloring material is used in the image recording process in the ink jet recording method according to the present embodiment. It is possible to use a background ink composition and a color ink composition for such an ink composition. Below, detailed description will be given of the components which are included and the components which may be included in each ink composition.

2.2.1. Background Ink Composition

The background ink composition contains a background coloring material and water. Examples of the background ink composition include a white ink composition or a photoluminescent ink composition.

The white ink composition is an ink which is able to record a color which is referred to as "white" in general and also includes colors with minute traces of other colors. In addition, inks containing such a pigment and referred to and sold as "white colored ink" or "white ink" are included. Furthermore, for example, in a case where ink is recorded on Epson genuine photograph paper <Luster> (manufactured by Seiko Epson Corp.) with 100% duty or more or in an amount which sufficiently covers the surface of the photograph paper, the inks include inks with a brightness (L*) and chromaticity (a* and b*) showing the ranges of $70 \leq L^* \leq 100$, $-4.5 \leq a^* \leq 2$, and $-6 \leq b^* \leq 2.5$ in a case of being measured by setting measurement conditions as a D50 light source, an observation field of 2°, a density of DIN NB, a white reference as Abs, a filter as No, and a measurement mode as Reflectance using a spectrophotometer Spectrolino (product name, manufactured by Gretag Macbeth Corp.).

A photoluminescent ink composition refers to an ink composition which exhibits photoluminescence when attached to a medium. In addition, for example, the photoluminescence refers to a property which is characterized by the specular glossiness of an obtained image (refer to the Japanese Industrial Standards (JIS) Z8741). For example, types of photoluminescence include photoluminescence such as specular reflection, so-called mat-tones, or the like and it is possible to characterize each of these, for example, according to the different levels of specular glossiness.

Background Coloring Material

Examples of the background coloring material include white coloring materials, photoluminescent pigments, and the like.

Examples of the white coloring material include metal oxides, barium sulfate, calcium carbonate, and the like. Examples of metal oxides include titanium dioxide, zinc oxide, silica, alumina, magnesium oxide, and the like. In addition, the white coloring material includes particles which have a hollow structure, the particles which have a hollow structure are not particularly limited, and it is possible to use particles which are known in the art. It is possible to preferably use particles described in the specification of U.S. Pat. No. 4,880,465A and the like as the particles which have a hollow structure. From the point of view that the whiteness and the scratch resistance are favorable, it is preferable to use titanium dioxide as the white coloring material from among the above.

In a case of using the white coloring material, the content (solid content) of the white coloring material is preferably 1% or more to 20% or less with respect to the total mass of the white ink composition and more preferably 5% or more to 15% or less. When the content of the white coloring material exceeds the range described above, there are cases where nozzle clogging of the ink jet recording apparatus or the like occurs. On the other hand, when the content of the white coloring material is less than the range described above, there is a tendency for the color density such as the whiteness to be insufficient.

The volume-based average particle diameter of the white coloring material (referred to below as the "average particle diameter") is preferably 30 nm or more to 600 nm or less and more preferably 200 nm or more to 400 nm or less. When the average particle diameter of the white coloring material exceeds these ranges, there are times when dispersion stability is lost due to the particles precipitating or the like and nozzle clogging or the like may occur when applied to an ink jet recording apparatus. On the other hand, when the average particle diameter of the white coloring material is less than these ranges, there is a tendency for the whiteness to be insufficient.

It is possible to measure the average particle diameter of the white coloring material using a particle size distribution measuring apparatus employing a laser diffraction scattering method as the measuring principle. Examples of the particle size distribution measuring apparatus include a particle distribution meter employing a dynamic light scattering method as the measuring principle (for example, "Microtrac UPA" manufactured by Nikkiso Co., Ltd.).

The photoluminescent pigment is not particularly limited as long as it is possible to exhibit photoluminescence when attached to a medium; however, examples thereof include one type or an alloy of two or more types (also referred to as metal pigments) which are selected from a group formed of aluminum, silver, gold, platinum, nickel, chromium, tin, zinc, indium, titanium, and copper; or a pearl pigment which has pearl luster. Representative examples of the pearl pigment include pigments having pearl luster or interference luster such as titanium dioxide-coated mica, fish scale guanine, or bismuth acid chloride. In addition, a surface treatment for suppressing reaction with water may be carried out on the photoluminescent pigment. It is possible to form an image which has excellent photoluminescence due to the ink containing a photoluminescent pigment.

In a case of using a photoluminescent pigment, it is preferable that the content of the photoluminescent pigment be 0.5 mass % to 30 mass % with respect to the total mass of the photoluminescent ink composition and 1 mass % to 15 mass % is more preferable. When the content of the photoluminescent pigment is within the range described above, it is possible to make the discharge stability from the nozzles of the ink jet recording apparatus and the storage stability of the photoluminescent ink composition excellent.

Water

The background ink composition contains water. Water is a medium which is the main part of the background ink composition and a component which is evaporated and scattered by drying. Since description of the water is the same as for the first clear ink composition, description thereof will be omitted.

The background ink composition is a so-called water-based ink which includes water as a main solvent (which contains 50 mass % or more water). There is an advantage in that the water-based ink is good for the environment since bad odors are suppressed and 50 mass % or more of the composition thereof is water.

Organic Solvent

The background ink composition may contain an organic solvent. The organic solvent is not particularly limited; however, examples thereof include alkyl polyols, pyrrolidone derivatives, glycol ethers, and the like. These organic solvents may be used as one type individually or may be used in a combination of two or more types. Here, since the specific examples, the effects, the content ranges, and the like of each of the organic solvents are the same as the content shown in the first clear ink composition, description thereof will be omitted.

It is preferable that the background ink composition substantially not contain a water-soluble organic solvent where the standard boiling point is 280° C. or higher. This is because there are cases where dryness of the ink is greatly decreased and the fixing property of the image is decreased by including a water-soluble organic solvent where the standard boiling point is 280° C. or higher.

Surfactant

The background ink composition may contain a surfactant. The surfactant is provided with a function of reducing surface tension and improving the wettability with a recording medium. It is possible to preferably use, for example, an acetylene glycol-based surfactant, a silicone-based surfactant, or a fluorine-based surfactant from among surfactants. These surfactants may be used as one type individually or may be used in a mixture of two or more types. Since the specific examples, the effects, the content ranges, and the like of each of the surfactants are the same as the content shown in the first clear ink composition, description thereof will be omitted.

Resin Particles

The background ink composition may contain at least one of the first resin particles and the second resin particles described above. It is not possible to obtain an effect as good as when a protective layer or an adhesive layer is provided; however, it is possible to improve the scratch resistance and adhesion of the image. Here, in a case of recording a color image on a background image, the background image is present at a position which is closer to the surface of the recording medium. In this case, from the point that it is possible to further improve the adhesion of the image and the recording medium, it is more preferable that the background ink composition contain the second resin particles.

Wax

The background ink composition may contain wax. Since the effects, the specific examples, the content ranges, and the like of the wax are the same as shown in the first clear ink composition, description thereof will be omitted.

Other Components

The background ink composition may contain pH adjusting agents, preservatives, fungicides, anti-rust agents, and the like as necessary. Since the specific examples and the like of these components are the same as shown in the first clear ink composition, description thereof will be omitted.

2.2.2. Color Ink Composition

The color ink composition contains a colored coloring material and water.

Coloring Material

The color ink composition contains a colored coloring material. The colored coloring material refers to a coloring material other than the background coloring material described above. Examples of the colored coloring material include dyes, pigments, and the like.

It is possible to favorably use dyes and pigments which are described in US2010/0086690A, US2005/0235870A, WO2011/027842A, and the like. Out of dyes and pigments, it is more preferable to include a pigment. From the point of view of the storage stability such as the light resistance, weather resistance, gas resistance, and the like, it is preferable that the pigment be an organic pigment.

In particular, azo pigments such as insoluble azo pigments, condensed azo pigments, azo lakes, and chelate azo pigments; polycyclic pigments such as phthalocyanine pigments, perylene and perynone pigments, anthraquinone pigments, quinacridone pigments, dioxane pigments, thioindigo pigments, isoindolinone pigments, and quinophthalone pigments; dye chelates, dye lakes, nitro pigments, nitroso pigments, aniline black, daylight fluorescent pigments, carbon black, and the like, are used for the pigment. It is possible to use the pigment described above as one type individually or in a mixture of two or more types.

In addition, for example, it is possible to use various types of dyes which are used for a normal ink jet recording such as direct dyes, acid dyes, food dyes, basic dyes, reactive dyes, disperse dyes, vat dyes, soluble vat dyes, and reaction disperse dyes, for the dye.

The content of the colored coloring material is preferably 1 mass % to 20 mass % with respect to the total mass of the color ink composition and more preferably 1 mass % to 15 mass %.

Resin Dispersant

In a case of using a pigment as a coloring material, it is preferable that the pigment be able to be dispersed and held in water in a stable manner for application to an ink composition. Examples of the method include a method for dispersing using a resin dispersant such as a water-soluble resin and/or a water dispersible resin (below, the pigment which is treated by this method may be referred to as a "resin dispersed pigment"), a method for dispersing using a dispersant (below, the pigment which is treated by this method may be referred to as a "dispersant dispersed pigment"), a method for chemically and physically introducing a hydrophilic functional group onto a pigment particle surface and able to disperse and/or dissolve in water without the resin or the dispersant (below, the pigment which is treated by this method may be referred to as a "surface treated pigment"), and the like.

It is possible to use any of the resin dispersed pigment, the dispersant dispersed pigment, and the surface treated pigment for the color ink composition and it is also possible to use these in a form where a plurality of types are mixed as necessary; however, it is preferable that the resin dispersed pigment be contained.

Examples of the resin dispersant which is used for the resin dispersed pigment include polyvinyl alcohols, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-metacrylic acid-acrylic acid ester copolymers, styrene-α-methyl styrene-acrylic acid copolymers, styrene-α-methyl styrene-acrylic acid ester copolymers, styrene-maleic acid copolymers, styrene-maleic anhydride copolymers, vinylnaphthalene-aclylic acid copolymers, vinylnaphthalene-maleic acid copolymers, vinyl acetate-maleic acid ester copolymers, vinyl acetate-crotonic acid copolymers, vinyl acetate-acrylic acid copolymers, and the like and salts thereof. Among these, copolymers of a monomer which has a hydrophobic functional group and a monomer which has a hydrophilic functional group and polymers formed of monomers which have both the hydrophobic functional group and the hydrophilic functional group are preferable. As a form of the copolymer, it is possible to use in any form of a random copolymer, a block copolymer, an alternating copolymer, and a graft copolymer.

It is possible to appropriately select the content ratio of the resin dispersant according to the pigment which is to be dispersed; however, with respect to 100 parts by mass of the content of the pigment in the color ink composition, 5 parts by mass or more to 200 parts by mass or less is preferable and 30 parts by mass or more to 120 parts by mass or less is more preferable.

Water

The color ink composition contains water. Water is a medium which is the main part of the background ink composition and a component which is evaporated and scattered by drying. Since description of the water is the same as for the first clear ink composition, description thereof will be omitted.

The color ink composition is a so-called water-based ink which includes water as a main solvent (which contains 50 mass % or more water). There is an advantage in that the water-based ink is good for the environment since bad odors are suppressed and 50 mass % or more of the composition thereof is water.

Organic Solvent

The color ink composition may contain an organic solvent. The organic solvent is not particularly limited; however, examples thereof include alkyl polyols, pyrrolidone derivatives, glycol ethers, and the like. These organic solvents may be used as one type individually or may be used in a combination of two or more types. Here, since the effects, the specific examples, the content ranges, and the like of each of the organic solvents are the same as the content shown in the first clear ink composition, description thereof will be omitted.

It is preferable that the color ink composition substantially not contain a water-soluble organic solvent where the standard boiling point is 280° C. or higher in the same manner as the background ink composition. That is, it is preferable that the image be recorded using an ink composition which does not contain a water-soluble organic solvent where the standard boiling point is 280° C. or higher. This is because there are cases where dryness of the ink is greatly decreased and the fixing property of the image is decreased by including a water-soluble organic solvent where the standard boiling point is 280° C. or higher.

Surfactant

The color ink composition may contain a surfactant. The surfactant is provided with a function of reducing surface tension and improving the wettability with a recording medium. It is possible to preferably use, for example, an acetylene glycol-based surfactant, a silicone-based surfactant, or a fluorine-based surfactant from among surfactants. These surfactants may be used as one type individually or may be used in a mixture of two or more types. Since the specific examples, the effects, the content ranges, and the like of each of the surfactants are the same as the content shown in the first clear ink composition, description thereof will be omitted.

Resin Particles

The color ink composition may contain at least one of the first resin particles and the second resin particles described above in the same manner as the background ink composition. It is not possible to obtain an effect as good as when a protective layer or an adhesive layer is provided; however, it is possible to improve the scratch resistance and adhesion of the image. In particular, in a case of forming a color image on a background image, since the color image is easily subjected to external friction due to the color image being present in an upper part compared to the background image, it is more preferable that the color ink composition contain the first resin particles.

Wax

The color ink composition may contain wax. Since the effects, the specific examples, the content ranges, and the like of the wax are the same as shown in the first clear ink composition, description thereof will be omitted.

Other Components

The color ink composition may contain pH adjusting agents, preservatives, fungicides, anti-rust agents, and the like as necessary. Since the specific examples and the like of these components are the same as shown in the first clear ink composition, description thereof will be omitted.

2.3. Method for Preparing Ink

Each of the ink compositions described above (the clear ink composition, the color ink composition, and the background ink composition described above) is obtained by mixing the components described above in an arbitrary order and removing impurities by filtering as necessary. As the mixing method of each of the components, a method for sequentially adding materials to a container which is provided with a stirring apparatus such as a mechanical stirrer or a magnetic stirrer and carrying out stirring and mixing is favorably used. As the filtering method, it is possible to perform centrifugal filtration, filter filtration, and the like as necessary.

2.4. Physical Properties of Ink

From the point of view of the balance between image quality and reliability as an ink jet ink, it is preferable that the surface tension at 20° C. of each of the ink compositions described above (the clear ink composition, the color ink composition, and the background ink composition described above) be 15 mN/m to 50 mN/m and 20 mN/m to 40 mN/m is more preferable. Here, it is possible to measure the surface tension by confirming the surface tension when wetting a platinum plate with the ink composition in a 20° C. environment, for example, using Automatic surface tensiometer CBVP-A (product name, manufactured by Kyowa Interface Science Co., LTD.).

In addition, from the same point of view, it is preferable that viscosity of each of the ink compositions described above at 20° C. be 2 mPa·s or more to 15 mPa*s or less and 2 mPa·s or more to 10 mPa·s or less is more preferable. Here, it is possible to measure the viscosity in a 20° C. environment, for example, using a Rheometer MCR-300 (product name, manufactured by Physica Corp.).

3. Ink Jet Recording Apparatus

Description will be given of one example of an ink jet recording apparatus which is able to carry out the ink jet recording method according to the present embodiment with reference to the diagrams. Here, the ink jet recording apparatus which is able to be used for the ink jet recording method according to the present embodiment is not limited to the following aspects.

FIG. 11 is a schematic diagram of one example of the ink jet recording apparatus which is used for the ink jet recording method according to the present embodiment.

An ink jet recording apparatus 1000 which is one example of the present embodiment is provided with transport unit 10 which transports the recording medium 1, adhesive layer forming unit 20 which records an adhesive layer using the second clear ink composition described above, the adhesive layer drying unit 25 which is provided at a position which opposes the adhesive layer forming unit 20, the image recording unit 120 which records an image using the ink compositions described above, the image drying unit 125 which is provided at a position which opposes the image recording unit 120, the protective layer forming unit 220 which forms a protective layer which covers an image using the clear ink compositions described above, the protective layer drying unit 225 which is provided at a position which opposes the protective layer forming unit 220, the overall heating unit 325 which heats a recording surface, and overall drying unit 425 which heats and ventilates the recording surface.

For the ink jet recording apparatus according to the present embodiment, it is possible to use either of an ink jet recording apparatus which is provided with a serial type recording head and an ink jet recording apparatus which is provided with a line type recording head.

3.1. Transport Unit

It is possible to configure the transport unit 10, for example, by a roller 11. The transport unit 10 may have a plurality of rollers 11. The transport unit 10 is provided on the upstream side of the adhesive layer forming unit 20 in the direction in which the recording medium 1 is transported (shown by an arrow in the diagram) in the example shown in the diagram; however, without being limited thereto, the position at which the unit is provided or the number thereof is arbitrary as long as it is possible to transport the recording medium 1. The transport unit 10 may be provided with a paper feeding roll, a paper feeding tray, a paper ejecting roll, a paper ejecting tray, various types of platens, and the like.

The recording medium 1 which is transported by the transport unit 10 is transported to the position where the adhesive layer is recorded on the recording surface by the adhesive layer forming unit 20.

Here, in FIG. 11, a case where the recording medium 1 is a continuous body is shown; however, even when the recording medium 1 is a single sheet, it is possible to perform transportation of the recording medium by appropriately configuring the transport unit 10.

3.2. Adhesion Layer Forming Unit

The adhesive layer forming unit 20 is one example of a unit for carrying out the adhesive layer forming process described above. The adhesive layer forming unit 20 records an adhesive layer 2 using the second clear ink composition described above with respect to the recording surface of the recording medium 1. The adhesive layer forming unit 20 is provided with a recording head 21 which is provided with nozzles which discharge the second clear ink composition.

Examples of methods for discharging ink such as the second clear ink composition from nozzles of the recording head include the following. In detail, examples thereof include a method for applying an intense electric field between acceleration electrodes which are placed in nozzles and in the front of the nozzles, continuously discharging ink in liquid droplet form from the nozzles, and recording by sending a recording information signal to deflecting electrodes while liquid droplets of ink fly between the deflecting electrodes, or a method for discharging liquid droplets of ink in correspondence with the recording information signal without deflecting (an electrostatic suction method), a method for forcibly discharging liquid droplets of ink by adding pressure to ink with a small pump and mechanically vibrating the nozzles with a quartz oscillator or the like, a method for discharging and recording with liquid droplets of ink by adding pressure to ink with a piezoelectric element at the same time as a recording information signal (a piezo method), a method for discharging and recording with liquid droplets of ink by heating and foaming the ink with minute electrodes according to a recording information signal (a thermal jet method), and the like.

3.3. Adhesive Layer Drying Unit

The adhesive layer drying unit 25 is one example of a unit for performing the second drying process described above and is used for drying the adhesive layer which is formed on the recording surface. In the example in FIG. 11, the adhesive layer drying unit 25 is provided at a position which opposes the adhesive layer forming unit 20; however, without being limited thereto, as long as it is possible to dry the adhesive layer before recording an image, the adhesive layer drying unit 25 may be provided at any position. Since the details of the adhesive layer drying unit 25 are as described in the second drying process, description thereof will be omitted.

3.4. Image Recording Unit

The image recording unit 120 is one example of a unit for carrying out the image recording process described above. The image recording unit 120 records an image using the ink composition described above with respect to the recording surface of the recording medium 1. The image recording unit 120 is provided with a recording head 121 which is provided with nozzles which discharge ink compositions. Since the discharging method of the recording head 121 is the same as the example described for the adhesive layer forming unit 20, description thereof will be omitted.

In a case of forming an image using the background ink composition and the color ink composition described above, the image recording unit 120 may discharge both inks from different nozzles of the recording head 121 and may be provided with a recording head which discharges the background ink composition and a recording head which discharges the color ink composition.

In a case where the image recording unit 120 is provided with a recording head which discharges the background ink composition and a recording head which discharges the color ink composition, it is possible to provide a recording head (recording unit) which discharges the background ink composition on the upstream side and a recording head (recording unit) which discharges the color ink composition on the downstream side thereof.

3.5. Image Drying Unit

The image drying unit 125 is one example of a unit for carrying out the second drying process described above and is used for drying an image. In the example in FIG. 11, the image drying unit 125 is provided at a position which opposes the image recording unit 120; however, without being limited thereto, the image drying unit 125 may be provided at any position as long as it is possible to dry the image before forming the protective layer. Since the details of the image drying unit 125 are as described in the second drying process, description thereof will be omitted.

In a case where the image recording unit 120 is provided with a recording head which discharges the background ink composition and a recording head which discharges the color ink composition, the image drying unit 125 may be provided with a drying unit which dries the background image which is recorded using the background ink composition and a drying unit which dries the color image which is recorded using the color ink composition.

3.6. Protective Layer Forming Unit

The protective layer forming unit 220 is one example of a unit for carrying out the protective layer forming process described above. The protective layer forming unit 220 forms a protective layer using the clear ink composition described above with respect to the image. The protective layer forming unit 220 is provided with a recording head 221 which is provided with nozzles which discharge the clear ink composition. Since the discharging method of the recording head 221 is the same as the example described for the adhesive layer forming unit 20, description thereof will be omitted.

In a case of forming the protective layer using the first clear ink composition and the second clear ink composition described above, the protective layer forming unit 220 may discharge both inks from different nozzles of the recording head 121 and may be provided with a recording head which discharges the first clear ink composition and a recording head which discharges the second clear ink composition.

In a case where the protective layer forming unit 220 is provided with a recording head which discharges the first clear ink composition and a recording head which discharges the second clear ink composition, it is possible to provide the recording head (recording unit) which discharges the second clear ink composition on the upstream side and the recording head (recording unit) which discharges the first clear ink composition on the downstream side thereof.

3.7. Protective Layer Drying Unit

The protective layer drying unit 225 is one example of a unit for carrying out the second drying process described above and is used for drying the protective layer. In the example in FIG. 11, the protective layer drying unit 225 is provided at a position which opposes the protective layer forming unit 220; however, without being limited thereto, the protective layer drying unit 225 may be provided at any position as long as it is possible to dry the protective layer before the overall heating process which will be described below. Since the details of the protective layer drying unit 225 are as described in the second drying process, description thereof will be omitted.

In a case where the protective layer forming unit 220 is provided with a recording head which discharges the first clear ink composition and a recording head which discharges the second clear ink composition, the protective layer drying unit 225 may be provided with a drying unit which dries a first protective layer which is recorded using the first clear ink composition and a drying unit which dries a second protective layer which is recorded using the second clear ink composition.

In the present embodiment, a case where the adhesive layer forming unit 20, the image recording unit 120 which will be described below, and the protective layer forming unit 220 which will be described below use different recording heads is shown; however, each unit may use a single recording head in common without being limited thereto. In this case, the unit is used for performing the second drying process described above. It is possible to have the adhesive layer drying unit 25, the image drying unit 125, and the protective layer drying unit 225 in common.

3.8. Overall Heating Unit

The overall heating unit 325 is one example of a unit for carrying out the first heating process described above and is used for heating the adhesive layer, the image, and the protective layer. It is possible to install the overall heating unit 325, for example, on the downstream side of the protective layer forming unit 220 as shown in FIG. 11. Since the details of the overall heating unit 325 are as described in the first heating process described above, description thereof will be omitted.

3.9. Overall Drying Unit

The overall drying unit 425 is one example of a unit for carrying out the first drying process described above and is used for drying the adhesive layer, the image, and the protective layer. It is possible to install the overall drying unit 425, for example, on the downstream side of the overall heating unit 325 as shown in FIG. 11. Since the details of the overall drying unit 425 are as described in the first drying process described above, description thereof will be omitted.

4. Recording Medium

The ink jet recording method according to the present embodiment is performed using a recording medium having low absorbency or non-absorbency to ink. The recording medium having low absorbency or non-absorbency to ink refers to a recording medium which has a property of not absorbing at all or hardly absorbing an ink composition. Quantitatively, the recording medium having low absorbency or non-absorbency to ink refers to a "recording medium where the quantity of water absorption from the start of contact to 30 msec$^{1/2}$ is 10 mL/m$^2$ or less according to the Bristow method". The Bristow method is the method which is the most widespread as a method for measuring the quantity of liquid absorption in a short time and is also adopted by the Japan Technical Association of Pulp and Paper (JAPAN TAPPI). The details of the testing method are described in "Paper and Cardboard-Liquid Absorbency Testing Method-Bristow method" which is the specification No. 51 in "JAPAN TAPPI Paper Pulp Testing Methods 2000". With respect to this, a recording medium with ink absorbency refers to a recording medium which does not have low absorbency or non-absorbency to ink.

Examples of the recording medium with non-absorbency to ink include a recording medium where plastic is coated on a substrate such as a plastic film or paper which does not have an ink absorbing layer, a recording medium bonded with a plastic film, and the like. Examples of the plastic referred to here include polyvinyl chloride, polyethylene terephthalate, polycarbonate, polystyrene, polyurethane, polyethylene, polypropylene, and the like.

In addition, examples of the recording medium with low absorbency to ink include a recording medium where a coating layer for receiving ink is provided on the surface, examples of the recording medium where the substrate is paper include printing paper such as art paper, coated paper, and mat paper, and in a case where the substrate is a plastic film, examples thereof include a recording medium where a hydrophilic polymer is coated on the surface of polyvinyl chloride, polyethylene terephthalate, polycarbonate, polystyrene, polyurethane, polyethylene, polypropylene, and the like, a recording medium where particles such as silica and titanium are coated along with a binder.

It is possible to favorably use the ink jet recording method according to the present embodiment with respect to a soft wrapping film. The soft wrapping film is one aspect of the recording medium with non-absorbency to ink described above. In more detail, the soft wrapping film is a very flexible film material which is used for wrapping or the like for food wrapping, toiletries, and cosmetics, and is a film material where a material, an antioxidant, and the like which have an anti-fogging property or an antistatic property are present on the film surface and which has a thickness in a range of 5 to 70 μm (preferably 10 to 50 μm). In a case of recording the ink composition on the film, ink is difficult to fix compared to a plastic film with a normal thickness and even when the ink is fixed, it is not possible for the ink to handle the flexibility of the film and peeling easily occurs. According to the ink jet recording method according to the present embodiment, since it is possible to cover the image using the protective layer which is excellent in adhesion and scratch resistance, it is possible to record an image which is excellent in adhesion and scratch resistance even with respect to a soft wrapping film. In addition, since the soft wrapping film is often used as wrapping or the like for food wrapping or cosmetics, it is likely to be placed in an environment where alcohol or the like is attached. Even in such a case, since it is possible to obtain an image which is excellent in solvent resistance by forming a protective layer according to the ink jet recording method according to the present embodiment, the ink jet recording method according to the present embodiment is more favorable for a soft wrapping film.

An anionic, non-ionic, or cationic surfactant or a vinyl-based or acryl-based polymer is often used for a material which has an anti-fogging property or an antistatic property; representative examples of the surfactant include a fatty acid or aliphatic derivative-based surfactant (fat-soluble surfactant) of fatty acid esters such as glycerine fatty acid ester, polyglyceryl fatty acid ester, and sorbitan fatty acid ester, fatty acid amides such as oleic amide and stearic phosphate amide, ethylene oxide adducts thereof, and the like; representative examples of the vinyl polymers include a vinyl alcohol and a vinyl chloride polymer; and representative examples of the acryl polymers include an acryl polymer or the like which has ethylene oxide or a polar group (a hydroxyl group, a carboxyl group, and the like). Examples described in Patent Documents include a method for using glycerine monofatty acid ester and organic phosphite together (JP-A-58-79042), a method for using an anti-fogging agent thereof and a fluorine-containing compound together (JP-A-3-215562), in addition to a method for using hindered amine-based compounds together (JP-A-4-272946), a method for using an aliphatic alcohol where the number of carbon atoms is 6 to 30 or an aliphatic amine where the number of carbon atoms is 6 to 30 (JP-A-9-31242), a method for using a phosphate-based compound (JP-A-2008-115218), and the like.

Representative examples of antioxidants include phenol-based antioxidants such as dibutyl hydroxytoluene, thio-ether-based antioxidants such as dilauryl thiopropionate, and phosphate ester-based antioxidants. In more detail, examples include 3,5-di-t-butyl-4-hydroxy benzyl phosphonate-diethyl ester, N,N'-hexamethylene bis(3,5-di-t-butyl-4-hydroxy-hydrocinnamide), triethylene glycol-bis 3-(3-t-butyl-5-methyl-4-hydroxyphenyl) propionate], pentaerythrityl.tetrakis[3-(3,5-di-t-butyl-4-hydroxyphenyl) propionate], tetrakis[methylene-3(3',5'-di-t-butyl-4'-hydroxyphenyl)propionate)methane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis-(4'-hydroxy-3'-t-butylphenyl)butylic acid]glycol ester, 1,3,5-tris (3'5'-di-t-butyl-4'-hydroxybenzyl)-s-triazine 2,4,6-(1H,3H, 5H)trion, 1,6-hexanediol-bis[3-(3,5-di-t-butyl-4-hydroxyphenyl)propionate, and the like.

It is possible to use a material which includes at least one type of resin which is selected from an olefin-based resin (polyethylene, polypropylene, and the like), an ester-based resin (polyester and the like), a vinyl chloride-based resin (polyvinyl chloride and the like), and an amide-based resin (polyamide and the like) for the material which configures a recording surface of a soft wrapping film. It is possible to use a film substrate where these resins are processed in a film or sheet form as a film substrate which includes the recording surface of a soft wrapping film. In the case of a film or a sheet which uses resins, it is possible to use any of an unstretched film, a stretched film which is stretched in one axis direction or in two axis directions, or the like and it is preferable to use the film which is stretched in two axis directions. In addition, use is possible in a laminated state where a film or a sheet formed of various types of these resins are bonded as necessary.

5. Examples

Below, detailed description will be further given of the first embodiment of the invention using examples; however, the present embodiment is not limited only to these examples.

5.1. Preparation of Ink 5.1.1. Preparation of Clear Ink Composition

Clear ink compositions CL-1 to CL-6 with different material compositions were obtained with the material compositions shown in Table 1. Each clear ink composition was prepared by removing impurities such as dust, coarse particles, and the like by filtering with a membrane filter with a hole diameter of 5 m after adding the materials shown in Table 1 into a container and stirring and mixing for two hours with a magnetic stirrer. Here, all of the numeric values in Table 1 indicate mass % and ion-exchanged water was added such that the total mass of the clear ink compositions was 100 mass %.

5.1.2. Ink Composition

Preparation of Pigment Dispersant

A water-insoluble pigment (a white coloring material) was used as a coloring agent for the background ink composition (a white ink composition) which was used in the examples and the comparative examples. In addition, a water-insoluble pigment (a cyan pigment) was used as a coloring agent for the color ink composition which was used in the examples and the comparative examples. When adding the pigment to the ink composition, a resin dispersed pigment where the pigment was dispersed in advance by a resin dispersant was used. In detail, the pigment dispersant was prepared as below.

Preparation of Background Coloring Material Dispersant

Firstly, 4 parts by mass of acrylic acid-acrylic ester copolymer (weight average molecular weight: 25,000, acid value: 180) as the resin dispersant were added to and dissolved in 75 parts by mass of ion-exchanged water where 1 part by mass of 30% ammonia solution (a neutralizer) was dissolved. A dispersing treatment was performed for 10 hours with a ball mill using zirconia beads by adding 20 parts by mass of titanium oxide (C.I. Pigment White 6) which is a white pigment thereto. After that, the background coloring material dispersant was obtained by removing impurities such as coarse particles, dust, or the like by performing centrifugal filtration using a centrifugal separator and adjusting the concentration of the white pigment so as to be 20 mass %. Regarding the particle diameter of the white pigment, the average particle diameter was 350 nm.

Preparation of Cyan Pigment Dispersant

Firstly, 7.5 parts by mass of acrylic acid-acrylic ester copolymer (weight average molecular weight: 25,000, acid value: 180) as the resin dispersant were added to and dissolved in 76 parts by mass of ion-exchanged water where 1.5 parts by mass of 30% ammonia solution (a neutralizer) were dissolved. A dispersing treatment was performed for 10 hours with a ball mill using zirconia beads by adding 15 parts by mass of (C.I. Pigment Blue 15:3) as a cyan pigment thereto. After that, the cyan pigment dispersant was obtained by removing impurities such as coarse particles, dust, or the like by performing centrifugal filtration using a centrifugal separator and adjusting the concentration of the cyan pigment so as to be 15 mass %. Regarding the particle diameter of the cyan pigment at that time, the average particle diameter was 100 nm.

Preparation of Ink Composition

Background ink compositions BG-1 to BG-4 and cyan ink compositions C1 and C2 were obtained with the material compositions shown in Table 1 using the pigment dispersant which was prepared in the "Preparation of Pigment Dispersant" described above. Each ink composition was prepared by removing impurities such as dust, coarse particles, and the like by filtering with a membrane filter with a hole diameter of 5 m after adding the materials shown in Table 1 into a container and stirring and mixing for two hours with a magnetic stirrer. Here, all of the numeric values in Table 1 indicate mass % and ion-exchanged water was added such that the total mass of the ink compositions was 100 mass %. Here, the numbers in the brackets in the table indicate the solid content of the resin particles.

Here, the materials described in Table 1 other than compound names are as follows.

Titanium oxide (C.I. Pigment White 6)
Cyan pigment (C.I. Pigment Blue 15:3)
Superflex 740 (product name, manufactured by Dai-ichi Kogyo Seiyaku Co., Ltd., polyurethane resin emulsion, Tg: −34° C., a 40% dispersant)
Bondic 1940NE (product name, manufactured by DIC Corp., polyurethane resin emulsion, Tg: less than 5° C., a 50% dispersant)
TakerackW-6061 (product name, manufactured by Mitsui Chemicals, Inc., polyurethane resin emulsion, Tg: 25° C., a 30% dispersant)
JONCRYL 1992 (product name, manufactured by BASF Japan Ltd., styrene-acrylic acid copolymer emulsion, Tg: 78° C., a 43% dispersant)
Mowinyl 972 (product name, manufactured by Nippon Synthetic Chem Industry Co., Ltd., Tg: 101° C., a 50% dispersant)
AQUACER 515 (product name, manufactured by BYK Japan KK, polyethylene wax emulsion, melting point 135° C., a 35% dispersant)
Nopcoat PEM-17 (product name, manufactured by San Nopco Ltd., melting point 103° C., a 40% dispersant)
BYK-348 (product name, manufactured by BYK Japan KK, a silicone-based surfactant)
Surfynol DF-110D (product name, manufactured by Air Products and Chemicals. Inc., an acetylene glycol-based surfactant)

TABLE 1

| Material | Background Ink Composition | | | | Color Ink Composition | | Clear Ink Composition | | | | | |
|---|---|---|---|---|---|---|---|---|---|---|---|---|
| | BG-1 | BG-2 | BG-3 | BG-4 | C-1 | C-2 | CL-1 | CL-2 | CL-3 | CL-4 | CL-5 | CL-6 |
| Background Coloring Material Dispersant (Titanium oxide content: 20 mass %) | 50 | 50 | 50 | 50 | — | — | — | — | — | — | — | — |
| Cyan Pigment Dispersant (Cyan pigment content: 15 mass %) | — | — | — | — | 26.67 | 26.67 | — | — | — | — | — | — |
| Superflex 740 (Polyurethane resin emulsion) Tg: −34° C. <40% dispersant> | 10 (4) | — | — | — | — | — | — | — | 12.5 (5) | — | — | — |
| Bondic 1940NE (Polyurethane resin emulsion) Tg: <5° C. <50% dispersant> | — | 8 (4) | — | — | — | — | — | — | — | — | 10 (4) | — |
| Takerack W-6061 (Polyurethane resin emulsion) Tg: 25° C. <30% dispersant> | — | — | 13.33 (4) | — | — | — | — | — | — | — | 16.67 (5) | 8.33 (2.5) |

TABLE 1-continued

| | Background Ink Composition | | | | Color Ink Composition | | Clear Ink Composition | | | | | |
|---|---|---|---|---|---|---|---|---|---|---|---|---|
| Material | BG-1 | BG-2 | BG-3 | BG-4 | C-1 | C-2 | CL-1 | CL-2 | CL-3 | CL-4 | CL-5 | CL-6 |
| JONCRYL1992 (Styrene-acrylic acid copolymer emulsion) Tg: 78° C. <43% dispersant> | — | — | — | 9.31 (4) | 2.33 (1) | 2.33 (1) | 17.44 (7.5) | — | — | — | — | — |
| Mowinyl 972 (Styrene-acrylic acid copolymers emulsion) Tg: 101° C. <50% dispersant> | — | — | — | — | — | — | — | 15 (7.5) | — | — | — | 5 (2.5) |
| AQUACER 515 (Polyethylene wax emulsion) melting point: 135° C. <35% dispersant> | — | — | — | — | 1.43 (0.5) | 2.86 (1) | 8.57 (3) | 8.57 (3) | — | — | — | — |
| Nopcoat PEM-17 (Polyethylene wax emulsion) melting point: 103° C. <40% dispersant> | 2.5 (1) | 2.5 (1) | 2.5 (1) | 2.5 (1) | — | — | — | — | 5 (2) | 5 (2) | 5 (2) | 5 (2) |
| 1,2-hexanediol (water-soluble organic solvent) boiling point: 224° C. | 3 | 3 | 3 | 3 | 4 | 6 | 5 | 5 | 5 | 5 | 5 | 5 |
| Propylene glycol (water-soluble organic solvent) boiling point: 189° C. | 25 | 10 | — | — | 15 | 7 | — | — | — | — | — | — |
| 1,3-butylene glycol (Water-soluble organic solvent) boiling point: 208° C. | — | — | 5 | 5 | — | — | — | — | — | — | — | — |
| Dipropylene glycol (water-soluble organic solvent) boiling point: 232° C. | — | — | — | 5 | — | — | — | — | — | — | — | — |
| 3-methyl-1,5-pentanediol (water-soluble organic solvent) boiling point: 250° C. | — | 5 | — | — | — | — | 10 | 10 | 10 | 10 | 10 | 10 |
| 2-pyrrolidone (water-soluble organic solvent) boiling point: 245° C. | — | 10 | 10 | 10 | 3 | 20 | 15 | 15 | 15 | 15 | 15 | 15 |
| BYK-348 (Silicon based surfactant) | 0.5 | 0.5 | 0.5 | 0.5 | 0.5 | 0.5 | 0.5 | 0.5 | 0.5 | 0.5 | 0.5 | 0.5 |
| Surfynol DC-110D (Acetylene glycol based surfactant) | 0.3 | 0.3 | 0.3 | 0.3 | 0.3 | 0.3 | 0.3 | 0.3 | 0.3 | 0.3 | 0.3 | 0.3 |
| Triethanolamine (pH adjusting agent) | 0.1 | 0.1 | 0.1 | 0.1 | 0.1 | 0.1 | 0.1 | 0.1 | 0.1 | 0.1 | 0.1 | 0.1 |
| Ethylenediamine tetraacetic acid (Chelating agent) | 0.05 | 0.05 | 0.05 | 0.05 | 0.05 | 0.05 | 0.05 | 0.05 | 0.05 | 0.05 | 0.05 | 0.05 |
| Benzotriazole (anti-rust agents) | 0.02 | 0.02 | 0.02 | 0.02 | 0.02 | 0.02 | 0.02 | 0.02 | 0.02 | 0.02 | 0.02 | 0.02 |
| Ion-exchanged water | Remainder | Remainder | Remainder | Remainder | Remainder | Remainder | Remainder | Remainder | Remainder | Remainder | Remainder | Remainder |
| Total (mass %) | 100 | 100 | 100 | 100 | 100 | 100 | 100 | 100 | 100 | 100 | 100 | 100 |

5.2. Evaluation of Recorded Matter

Recorded matter which was used for each evaluation was manufactured as follows. The recorded matter according to the examples and the comparative examples was obtained by appropriately filling each of the inks which were obtained as described above in an ink jet printer and recording a recording pattern where each layer was laminated on a recording medium in order from the first layer so as to have the layer configuration described in Table 2. Here, the recording of each layer was performed under the conditions of 100% duty with an image resolution of width 720 dpi and height 720 dpi.

A two axis stretched polypropylene film (product name: Pylen film OT, model number: P2111, thickness: 20 μm, manufactured by Toyobo Co., Ltd.) and a nylon film bag (product name: Kyoubijin, model type: X-2030, film thickness: 80 μm, manufactured by Kurilon Inc.) were used as the recording medium (a soft wrapping film).

Ink Jet Printer PX-G930 (product name, manufactured by Seiko Epson Corp., nozzle resolution: 180 dpi) where a heater able to change the temperature was attached inside a paper guiding section was used for the ink jet printer.

In addition, the manufacturing of the recorded matter was performed by combining the following drying and heating conditions. The following drying and heating conditions were applied as follows in order of the second drying process, the first heating process, and the first drying process.

When forming any layer (image) of a white image, a color image, a protective layer, and an adhesive layer, a heater setting inside the printer paper guiding section at the time of recording was also set to a "setting where the temperature of the recording surface is 40° C." and ventilation was carried out by adjusting the air with a temperature of 40° C. with respect to the recorded matter during recording such that the air speed on the recording surface of the recording medium was approximately 2 m/sec to 5 m/sec (equivalent to the second drying process described above).

After finishing the second drying process, heating was performed without ventilation by setting the drying time to 2 minutes and the heating temperature of the recording surface of the recording medium to 90° C. using an infrared heater (equivalent to the first heating process described above).

After finishing the first heating process, the drying process was performed by adjusting the air with a temperature of 90° C. such that the air speed on the recording surface of the recording medium was approximately 6 m/sec to 10 m/sec and carrying out ventilation for 10 minutes (equivalent to the first drying process described above).

5.2.1. Evaluation of Adhesion

After leaving the recorded matter which was obtained as described above for 5 hours in a laboratory in an environment of 20° C. to 25° C./40% RH to 60% RH, a transparent adhesive tape (product name: Toumeibishoku, manufactured by Sumitomo 3M Inc.) was bonded with the recording surface of the recorded matter (the image forming portion). Then, by peeling the bonded tape by hand and confirming ink peeling of the recording surface or the state of the ink transfer to the tape, the adhesion was evaluated based on tape peelability (peeling resistance). The evaluation criteria for the adhesion are as below. In addition, the results are shown in Table 2.

A: Ink peeling of the recording surface or ink transfer to the tape was not visible.

B: There was no ink peeling of the recording surface; however, ink transfer to the tape was slightly visible.

C: A part of the ink of the recording surface was peeled.

D: All of the ink of the recording surface was peeled.

5.2.2. Evaluation of Scratch Resistance

After leaving the recorded matter which was obtained as described above for 5 hours in a laboratory in an environment of 20° C. to 25° C./40% RH to 60% RH, scratch resistance was evaluated using a Japan Society for the Promotion of Science (JSPS) type Color Fastness Rubbing Tester AB-301 (product name, manufactured by Tester Sangyo Co., Ltd.) by confirming the ink peeling state of the recording surface and the ink transfer state to a cotton cloth when rubbing the recording surface of the recorded matter (the image forming portion) 20 times with a load of 200 g with the cotton cloth. The evaluation criteria for the scratch resistance are as below. In addition, the results are shown in Table 2.

A: Ink peeling or ink transfer to the cotton cloth was not visible even when rubbed 20 times.

B: Ink peeling of a part of the recording surface or ink transfer to the cotton cloth was slightly visible after rubbing 20 times.

C: Ink peeling of the recording surface or ink transfer to the cotton cloth was visible after rubbing 20 times.

D: Ink peeling of the recording surface or ink transfer to a cotton cloth was visible before finishing rubbing 20 times.

5.2.3. Evaluation of Solvent Resistance

After leaving the recorded matter which was obtained as described above for 5 hours in a laboratory in an environment of 20° C. to 25° C./40% RH to 60% RH, the solvent resistance of the recorded matter was evaluated by wiping the recording surface of the recorded matter (the image forming portion) 5 times with a Bemcot wiper (product name: BEMCOT M-1, manufactured by Asahi Kasei Fibers Corp.) which was dipped in a 40 mass % ethanol water solution and confirming the ink state in the image region and the ink transfer state to the Bemcot wiper after wiping by visual observation. The evaluation criteria are as below. In addition, the results are shown in Table 2.

A: The external appearance of the image region did not change and ink attachment to the Bemcot wiper was not visible.

B: Slight unevenness in the image region was visible; however, ink attachment to the Bemcot wiper was not visible.

C: Clear unevenness in the image region was visible and ink attachment to the Bemcot wiper was visible.

D: A lot of unevenness in the image region was visible and a lot of ink attachment to the Bemcot wiper was visible.

5.2.4. Evaluation of Boiling Resistance

After leaving the recorded matter which was obtained as described above for 5 hours in a laboratory in an environment of 20° C. to 25° C./40% RH to 60% RH, the recorded matter was introduced into 75° C. warm water (boiling resistance test 1) or 100° C. warm water (boiling resistance test 2) such that the image surface was covered and was left for 1 hour while maintaining the temperature. After being left to stand, the recorded matter was taken out from the warm water and cooled for 10 minutes to room temperature, then the peeling state of the image and the bonding state were confirmed. The evaluation criteria are as below. In addition, the results are shown in Table 2.

A: Peeling of the image and bonding were not visible at all.

B: Partial peeling of the image or slight bonding of the image was visible.

C: Peeling of the image and bonding were visible.

D: Peeling of the image and bonding were remarkable and it was not possible to determine the original image.

5.3. Evaluation Results

The above evaluation results are shown in Table 2.

TABLE 2

|  |  | Examples | | | | | | | | Comparative Examples | |
|---|---|---|---|---|---|---|---|---|---|---|---|
|  |  | 1 | 2 | 3 | 4 | 5 | 6 | 7 | 8 | 1 | 2 |
| Recording Pattern | 1st layer | BG-1 | BG-2 | BG-3 | CL-3 | CL-4 | CL-5 | CL-5 | CL-5 | BG-4 | BG-4 |
|  | 2nd layer | C-1 | C-1 | C-2 | BG-4 | BG-4 | BG-4 | BG-4 | BG-3 | C-2 | C-2 |
|  | 3rd layer | CL-6 | CL-5 | CL-5 | C-2 | C-2 | C-2 | C-2 | C-2 | CL-3 | CL-1 |
|  | 4th layer | — | CL-2 | CL-2 | CL-3 | CL-4 | CL-5 | CL-5 | CL-5 | CL-4 | — |
|  | 5th layer | — | — | — | CL-2 | CL-2 | CL-2 | CL-1 | CL-2 | — | — |
| Evaluation Result | Adhesion | B | A | A | A | A | A | A | A | A | D |
|  | Scratch Resistance | B | A | A | A | A | A | A | A | D | C |
|  | Solvent Resistance | B | B | B | A | A | A | B | A | A | D |
|  | Boiling Resistance Test 1 (75° C.) | B | A | A | A | A | A | B | A | C | B |
|  | Boiling Resistance Test 2 (100° C.) | C | B | B | B | B | B | C | A | D | D |

The evaluation results in Table 2 showed that all of the recorded matter according to the examples was excellent in adhesion, scratch resistance, and solvent resistance.

On the other hand, since the recorded matter according to Comparative Example 1 did not include the first resin particles in the protective layer, it was shown that the scratch resistance decreased. In addition, since the recorded matter according to Comparative Example 2 did not include the second resin particles in the protective layer, it was shown that the solvent resistance thereof decreased.

5. Examples

Below, detailed description will be further given of embodiments of the second embodiment according to the invention using examples; however, the present embodiment is not limited only to these examples.

5.1. Preparation of Ink 5.1.1. Preparation of Clear Ink Composition

First clear ink compositions CL1-1 and CL1-2 and second clear ink compositions CL2-1 to CL2-3 with different material compositions were obtained with the material compositions shown in Table 3. Each clear ink composition was prepared by removing impurities such as dust, coarse particles, and the like by filtering with a membrane filter with a hole diameter of 5 m after adding the materials shown in Table 3 into a container and stirring and mixing for two hours with a magnetic stirrer. Here, all of the numeric values in Table 3 indicate mass % and ion-exchanged water was added such that the total mass of the clear ink compositions was 100 mass %.

5.1.2. Ink Composition

Preparation of Pigment Dispersant

A water-insoluble pigment (a white coloring material) was used as a coloring agent for the background ink composition (a white ink composition) which was used in the examples and the comparative examples. In addition, a water-insoluble pigment (a cyan pigment) was used as a coloring agent for the color ink composition which was used in the examples and the comparative examples. When adding the pigment to the ink composition, a resin dispersed pigment where the pigment was dispersed in advance by a resin dispersant was used. In detail, the pigment dispersant was prepared as below.

Preparation of Background Coloring Material Dispersant

Firstly, 4 parts by mass of acrylic acid-acrylic ester copolymer (weight average molecular weight: 25,000, acid value: 180) as the resin dispersant were added to and dissolved in 75 parts by mass of ion-exchanged water where 1 part by mass of 30% ammonia solution (a neutralizer) was dissolved. A dispersing treatment was performed for 10 hours with a ball mill using zirconia beads by adding 20 parts by mass of titanium oxide (C.I. Pigment White 6) which is a white pigment thereto. After that, the background coloring material dispersant was obtained by removing impurities such as coarse particles, dust, or the like by performing centrifugal filtration using a centrifugal separator and adjusting the concentration of the white pigment so as to be 20 mass %. Regarding the particle diameter of the white pigment, the average particle diameter was 350 nm.

Preparation of Cyan Pigment Dispersant

Firstly, 7.5 parts by mass of acrylic acid-acrylic ester copolymer (weight average molecular weight: 25,000, acid value: 180) as the resin dispersant were added to and dissolved in 76 parts by mass of ion-exchanged water where 1.5 parts by mass of 30% ammonia solution (a neutralizer) were dissolved. A dispersing treatment was performed for 10 hours with a ball mill using zirconia beads by adding 15 parts by mass of (C.I. Pigment Blue 15:3) as a cyan pigment thereto. After that, the cyan pigment dispersant was obtained by removing impurities such as coarse particles, dust, or the like by performing centrifugal filtration using a centrifugal separator and adjusting the concentration of the cyan pigment so as to be 15 mass %. Regarding the particle diameter of the cyan pigment at that time, the average particle diameter was 100 nm.

Preparation of Ink Composition

Background ink compositions BG-1 to BG-4 and cyan ink compositions C1 to C3 were obtained with the material compositions shown in Table 3 using the pigment dispersant which was prepared in the "Preparation of Pigment Dispersant" described above. Each ink composition was prepared by removing impurities such as dust, coarse particles, and the like by filtering with a membrane filter with a hole diameter of 5 m after adding the materials shown in Table 3 into a container and stirring and mixing for two hours with a magnetic stirrer. Here, all of the numeric values in Table 3 indicate mass % and ion-exchanged water was added such that the total mass of the ink compositions was 100 mass %. Here, the numbers in the brackets in the table indicate the solid content of the resin particles.

Here, the materials described in Table 3 other than compound names are as follows.

Titanium oxide (C.I. Pigment White 6)
Cyan pigment (C.I. Pigment Blue 15:3)

Superflex 740 (product name, manufactured by Dai-ichi Kogyo Seiyaku Co., Ltd., polyurethane resin emulsion, Tg: −34° C., a 40% dispersant)

Bondic 1940NE (product name, manufactured by DIC Corp., polyurethane resin emulsion, Tg: less than 5° C., a 50% dispersant)

Takerack W06061 (product name, manufactured by Mitsui Chemicals, Inc., polyurethane resin emulsion, Tg: 25° C., a 30% dispersant)

JONCRYL 1992 (product name, manufactured by BASF Japan Ltd., styrene-acrylic acid copolymer emulsion, Tg: 78° C., a 43% dispersant)

Mowinyl 972 (product name, manufactured by Nippon Synthetic Chem Industry Co., Ltd., Tg: 101° C., a 50% dispersant)

AQUACER 515 (product name, manufactured by BYK Japan KK, polyethylene wax emulsion, melting point 135° C., a 35% dispersant)

Nopcoat PEM-17 (product name, manufactured by San Nopco Ltd., melting point 103° C., a 40% dispersant)

BYK-348 (product name, manufactured by BYK Japan KK, a silicone-based surfactant)

Surfynol DF-110D (product name, manufactured by Air Products and Chemicals. Inc., an acetylene glycol-based surfactant)

TABLE 3

| Material | Background Ink Composition | | | | Color Ink Composition | | | First Clear Ink Composition | | Second Clear Ink Composition | | |
|---|---|---|---|---|---|---|---|---|---|---|---|---|
| | BG-1 | BG-2 | BG-3 | BG-4 | C-1 | C-2 | C-3 | CL1-1 | CL1-2 | CL2-1 | CL2-2 | CL2-3 |
| Background Coloring Material Dispersant (Titanium oxide content: 20 mass %) | 50 | 50 | 50 | 50 | — | — | — | — | — | — | — | — |
| Cyan Pigment Dispersant (Cyan pigment content: 15 mass %) | — | — | — | — | 26.67 | 26.67 | 26.67 | — | — | — | — | — |
| Superflex 740 (Polyurethane resin emulsion) Tg: −34° C. <40% dispersant> | 10 (4) | — | — | — | — | — | — | — | — | 12.5 (5) | — | — |
| Bondic 1940NE (Polyurethane resin emulsion) Tg: <5° C. <50% dispersant> | — | 8 (4) | — | — | — | — | — | — | — | — | 10 (4) | — |
| Takerack W-6061 (Polyurethane resin emulsion) Tg: 25° C. <30% dispersant> | — | — | 13.33 (4) | — | 5 (1.5) | — | — | — | — | — | — | 16.67 (5) |
| JONCRYL1992 (Styrene-acrylic acid copolymer emulsion) Tg: 78° C. <43% dispersant> | — | — | — | 9.31 (4) | — | 2.33 (1) | 2.33 (1) | 17.44 (7.5) | — | — | — | — |
| Mowinyl 972 (Styrene-acrylic acid copolymers emulsion) Tg: 101° C. <50% dispersant> | — | — | — | — | — | — | — | — | 15 (7.5) | — | — | — |
| AQUACER 515 (Polyethylene wax emulsion) melting point: 135° C. <35% dispersant> | — | — | — | — | — | 1.43 (0.5) | 2.86 (1) | 8.57 (3) | 8.57 (3) | — | — | — |
| Nopcoat PEM-17 (Polyethylene wax emulsion) melting point 103° C. <40% dispersant> | 2.5 (1) | 2.5 (1) | 2.5 (1) | 2.5 (1) | — | — | — | — | — | 5 (2) | 5 (2) | 5 (2) |
| 1,2-hexanediol (water-soluble organic solvent) boiling point: 224° C. | 3 | 3 | 3 | 3 | 4 | 4 | 6 | 5 | 5 | 5 | 5 | 5 |
| Propylene glycol (water-soluble organic solvent) boiling point: 189° C. | 25 | 10 | — | — | 15 | 15 | 7 | — | — | — | — | — |
| 1,3-butylene glycol (Water-soluble organic solvent) boiling point: 208° C. | — | 10 | — | 20 | — | — | — | — | — | — | — | — |
| Dipropylene glycol (water-soluble organic solvent) boiling point: 232° C. | — | 5 | — | — | — | — | — | — | — | — | — | — |
| 3-methyl-1,5-pentanediol (water-soluble organic solvent) boiling-point: 250° C. | — | — | 10 | — | — | — | — | 10 | 10 | 10 | 10 | 10 |
| 2-pyrrolidone (water-soluble organic solvent) boiling point: 245° C. | — | — | 15 | 5 | 3 | 3 | 20 | 15 | 15 | 15 | 15 | 15 |

TABLE 3-continued

| Material | Background Ink Composition | | | | Color Ink Composition | | | First Clear Ink Composition | | Second Clear Ink Composition | | |
|---|---|---|---|---|---|---|---|---|---|---|---|---|
| | BG-1 | BG-2 | BG-3 | BG-4 | C-1 | C-2 | C-3 | CL1-1 | CL1-2 | CL2-1 | CL2-2 | CL2-3 |
| Glycerine (water-soluble organic solvent) boiling point: 290° C. | — | — | — | — | — | — | — | — | — | — | — | — |
| BYK-348 (Silicon based surfactant) | 0.5 | 0.5 | 0.5 | 0.5 | 0.5 | 0.5 | 0.5 | 0.5 | 0.5 | 0.5 | 0.5 | 0.5 |
| Surfynol DF-110D (Acetylene glycol based surfactant) | 0.3 | 0.3 | 0.3 | 0.3 | 0.3 | 0.3 | 0.3 | 0.3 | 0.3 | 0.3 | 0.3 | 0.3 |
| Triethanolamine (pH adjusting agent) | 0.1 | 0.1 | 0.1 | 0.1 | 0.1 | 0.1 | 0.1 | 0.1 | 0.1 | 0.1 | 0.1 | 0.1 |
| Ethylenediamine tetraacetic acid(Chelating agent) | 0.05 | 0.05 | 0.05 | 0.05 | 0.05 | 0.05 | 0.05 | 0.05 | 0.05 | 0.05 | 0.05 | 0.05 |
| Benzotriazole (anti-rust agents) | 0.02 | 0.02 | 0.02 | 0.02 | 0.02 | 0.02 | 0.02 | 0.02 | 0.02 | 0.02 | 0.02 | 0.02 |
| Ion-exchanged water | | | | | | | | | | | | |
| Total (mass %) | 100 | 100 | 100 | 100 | 100 | 100 | 100 | 100 | 100 | 100 | 100 | 100 |

5.2. Evaluation of Recorded Matter

Recorded matter which was used for each evaluation was manufactured as follows. The recorded matter according to the examples and the comparative examples was obtained by appropriately filling each of the inks which were obtained as described above in an ink jet printer and recording a recording pattern where each layer was laminated on a recording medium in order from the first layer so as to have the layer configuration described in Table 4. Here, the recording of each layer was performed under the conditions of 100% duty with an image resolution of width 720 dpi and height 720 dpi.

A two axis stretched polypropylene film (product name: Pylen film OT, model number: P2111, thickness: 20 μm, manufactured by Toyobo Co., Ltd.) and a nylon film bag (product name: Kyoubijin, model type: X-2030, film thickness: 80 μm, manufactured by Kurilon Inc.) were used as the recording medium (a soft wrapping film).

Ink Jet Printer PX-G930 (product name, manufactured by Seiko Epson Corp., nozzle resolution: 180 dpi) where a heater able to change the temperature was attached inside a paper guiding section was used for the ink jet printer.

In addition, the manufacturing of the recorded matter was performed by combining the following drying and heating conditions. The following drying and heating conditions were applied as follows in order of the second drying process, the first heating process, and the first drying process.

When forming any layer (image) of a white image, a color image, a protective layer, and an adhesive layer, a heater setting inside the printer paper guiding section at the time of recording was also set to a "setting where the temperature of the recording surface is 40° C." and ventilation was carried out by adjusting the air with a temperature of 40° C. with respect to the recorded matter during recording such that the air speed on the recording surface of the recording medium was approximately 2 m/sec to 5 m/sec (equivalent to the second drying process described above).

After finishing the second drying process, heating was performed without ventilation by setting the drying time to 2 minutes and the heating temperature of the recording surface of the recording medium to 90° C. using an infrared heater (equivalent to the first heating process described above).

After finishing the first heating process, the drying process was performed by adjusting the air with a temperature of 90° C. such that the air speed on the recording surface of the recording medium was approximately 6 m/sec to 10 m/sec and carrying out ventilation for 10 minutes (equivalent to the first drying process described above).

5.2.1. Evaluation of Adhesion

After leaving the recorded matter which was obtained as described above for 5 hours in a laboratory in an environment of 20° C. to 25° C./40% RH to 60% RH, a transparent adhesive tape (product name: Toumeibishoku, manufactured by Sumitomo 3M Inc.) was bonded with the recording surface of the recorded matter (the image forming portion). Then, by peeling the bonded tape by hand and confirming ink peeling of the recording surface or the state of the ink transfer to the tape, the adhesion was evaluated based on tape peelability (peeling resistance). The evaluation criteria for the adhesion are as below. In addition, the results are shown in Table 4.

A: Ink peeling of the recording surface or ink transfer to the tape was not visible.
B: There was no ink peeling of the recording surface; however, ink transfer to the tape was slightly visible.
C: A part of the ink of the recording surface was peeled.
D: All of the ink of the recording surface was peeled.

5.2.2. Evaluation of Scratch Resistance

After leaving the recorded matter which was obtained as described above for 5 hours in a laboratory in an environment of 20° C. to 25° C./40% RH to 60% RH, scratch resistance was evaluated using a Japan Society for the Promotion of Science (JSPS) type Color Fastness Rubbing Tester AB-301 (product name, manufactured by Tester Sangyo Co., Ltd.) by confirming the ink peeling state of the recording surface and the ink transfer state to a cotton cloth when rubbing the recording surface of the recorded matter (the image forming portion) 20 times with a load of 200 g with the cotton cloth. The evaluation criteria for the scratch resistance are as below. In addition, the results are shown in Table 4.

A: Ink peeling or ink transfer to the cotton cloth was not visible even when rubbed 20 times.
B: Ink peeling of a part of the recording surface or ink transfer to the cotton cloth was slightly visible after rubbing 20 times.
C: Ink peeling of the recording surface or ink transfer to the cotton cloth was visible after rubbing 20 times.
D: Ink peeling of the recording surface or ink transfer to the cotton cloth was visible before finishing rubbing 20 times.

5.2.3. Evaluation of Solvent Resistance

After leaving the recorded matter which was obtained as described above for 5 hours in a laboratory in an environment of 20° C. to 25° C./40% RH to 60% RH, the solvent resistance of the recorded matter was evaluated by wiping the recording surface of the recorded matter (the image forming portion) 5 times with a Bemcot wiper (product name: BEMCOT M-1, manufactured by Asahi Kasei Fibers Corp.) which was dipped in a 40 mass % ethanol water solution and confirming the ink state in the image region and the ink transfer state to the Bemcot wiper after wiping by visual observation. The evaluation criteria are as below. In addition, the results are shown in Table 4.

A: The external appearance of the image region did not change and ink attachment to the Bemcot wiper was not visible.
B: Slight unevenness in the image region was visible; however, ink attachment to the Bemcot wiper was not visible.
C: Clear unevenness in the image region was visible and ink attachment to the Bemcot wiper was visible.
D: A lot of unevenness in the image region was visible and a lot of ink attachment to the Bemcot wiper was visible.

5.2.4. Evaluation of Boiling Resistance

After leaving the recorded matter which was obtained as described above for 5 hours in a laboratory in an environment of 20° C. to 25° C./40% RH to 60% RH, the recorded matter was introduced into 75° C. warm water (boiling resistance test 1) or 100° C. warm water (boiling resistance test 2) such that the image surface was covered and was left for 1 hour while maintaining the temperature. After being left to stand, the recorded matter was taken out from the warm water and cooled for 10 minutes to room temperature, then the peeling state of the image and the bonding state were confirmed. The evaluation criteria are as below. In addition, the results are shown in Table 4.

A: Peeling of the image and bonding were not visible at all.
B: Partial peeling of the image or slight bonding of the image was visible.
C: Peeling of the image and bonding were visible.
D: Peeling of the image and bonding were remarkable and it was not possible to determine the original image.

5.3. Evaluation Results

The above evaluation results are shown in Table 4.

The evaluation results in Table 4 showed that all of the recorded matter according to the examples was excellent in adhesion and scratch resistance.

On the other hand, since the recorded matter which was obtained in Comparative Example 1 was not provided with an adhesive layer, it was shown that the adhesion remarkably decreased. Since the recorded matter which was obtained in Comparative Example 2 was not provided with an adhesive layer and was provided with a protective layer which included the second resin particles and did not include the first resin particles, it was shown that the scratch resistance remarkably decreased. Since the recorded matter which was obtained in Comparative Example 3 was not provided with an adhesive layer, it was shown that the scratch resistance and adhesion remarkably decreased. Since the recorded matter which was obtained in Comparative Example 4 was provided with a protective layer which included the second resin particles and did not include the first resin particles, it was shown that the scratch resistance remarkably decreased. Since the recorded matter which was obtained in Comparative Example 5 was provided with an adhesive layer which did not include the second resin particles, it was shown that the adhesion remarkably decreased.

The invention is not limited to the embodiments described above and various types of modifications are possible. For example, the invention includes a configuration which is substantially the same as the configuration described in the embodiments (for example, a configuration where the functions, methods, and results are the same or a configuration where the object and effects are the same). In addition, the invention includes a configuration where a non-essential portion of the configuration described in the embodiments is replaced. In addition, the invention includes a configuration which has the same operational effects as the configuration described in the embodiments or a configuration which is able to achieve the same objects. In addition, the invention includes a configuration where techniques known in the art are added to the configuration described in the embodiments.

What is claimed is:

1. An ink jet recording method comprising:
firstly forming an adhesive layer by discharging a second clear ink composition which contains second resin particles where a glass transition temperature is less than 50° C. and substantially does not contain a color-

TABLE 4

|  |  | Examples | | | | | | | | Comparative Examples | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 | 5 |
| Recording Pattern | 1st layer | CL2-1 | CL2-2 | CL2-3 | CL2-3 | CL2-1 | CL2-2 | CL2-3 | CL2-3 | BG-4 | BG-4 | BG-1 | CL2-1 | CL1-2 |
|  | 2nd layer | BG-1 | BG-2 | BG-3 | BG-3 | BG-4 | BG-4 | BG-4 | BG-4 | C-2 | C-2 | C-2 | BG-1 | BG-1 |
|  | 3rd layer | C-1 | C-2 | C-3 | C-3 | C-3 | C-3 | C-3 | C-2 | CL1-1 | CL2-1 | CL1-2 | C-2 | C-2 |
|  | 4th layer | CL1-1 | CL1-2 | CL1-2 | CL2-3 | CL2-1 | CL2-1 | CL2-3 | CL2-3 | — | — | — | CL2-1 | CL1-2 |
|  | 5th layer | — | — | — | CL1-2 | CL1-2 | CL1-1 | CL1-2 | CL1-1 | — | — | — | — | — |
| Evaluation Result | Scratch Resistance | A | A | A | A | A | A | A | A | C | D | B | D | A |
|  | Boiling Resistance Test 1 (75° C.) | B | A | A | A | A | A | A | B | C | D | B | D | A |
|  | Boiling Resistance Test 2 (100° C.) | C | B | A | A | B | B | B | C | D | D | C | D | A |
|  | Solvent Resistance | B | B | B | A | B | B | B | B | D | D | D | B | B |
|  | Adhesion | A | A | A | A | A | A | A | A | D | C | B | A | D | ing material on a recording surface of a recording medium having low absorbency or non-absorbency to ink;

secondly recording an image on the adhesive layer by discharging an ink composition which contains water and a coloring material; and thirdly forming a protective layer, which contains first resin particles where a glass transition temperature is 50° C. or higher and substantially does not contain a coloring material, on the image.

2. The ink jet recording method according to claim 1, wherein the protective layer further contains the second resin particles.

3. The ink jet recording method according to claim 2, wherein the forming a protective layer includes forming a first protective layer by discharging a first clear ink composition, which contains the first resin particles and substantially does not contain a coloring material, from a recording head, and forming a second protective layer by discharging the second clear ink composition from a recording head, and the first protective layer is formed on the second protective layer.

4. The ink jet recording method according to claim 1, wherein the forming an image is performed by using at least one of a background ink composition which contains a background coloring material as the coloring material and a color ink composition which contains a colored coloring material as the coloring material.

5. The ink jet recording method according to claim 1, wherein the image is recorded inside a region in which the adhesive layer is formed when viewing the recording surface of the recording medium in plan view and is recorded so as to be smaller than an area of the adhesive layer inside the region.

6. The ink jet recording method according to claim 5, wherein the protective layer is formed so as to cover a surface of the image and an upper surface of the adhesive layer when viewing the recording surface of the recording medium in plan view.

7. The ink jet recording method according to claim 1, wherein the adhesive layer, the image, and the protective layer are formed using an ink composition which does not contain a water-soluble organic solvent where a normal boiling point is 280° C. or higher.

8. The ink jet recording method according to claim 1, wherein at least one type which is selected from an anti-fogging agent, an antistatic agent, and an antioxidant is present on the recording surface of the recording medium.

9. The ink jet recording method according to claim 1, wherein a material which configures the recording surface of the recording medium includes at least one type of resin which is selected from an olefin-based resin, an ester-based resin, a vinyl chloride-based resin, and an amide-based resin.

* * * * *